(12) United States Patent
Porter et al.

(10) Patent No.: US 6,212,748 B1
(45) Date of Patent: Apr. 10, 2001

(54) SELF-CONTAINED AND SELF-PROPELLED MACHINE FOR HEAT FUSING POLYOLEFIN PIPES

(75) Inventors: David W. Porter; Arthur H. McElroy, II, both of Tulsa, OK (US)

(73) Assignee: McElroy Manufacturing, Inc., Tulsa, OK (US)

( * ) Notice: Subject to any disclaimer, the term of this patent is extended or adjusted under 35 U.S.C. 154(b) by 0 days.

(21) Appl. No.: 09/162,312

(22) Filed: Sep. 28, 1998

Related U.S. Application Data

(63) Continuation-in-part of application No. 08/934,305, filed on Sep. 19, 1997, now Pat. No. 5,814,182.

(51) Int. Cl.[7] ............................................. B23Q 3/18
(52) U.S. Cl. ........................................... 29/281.5; 269/43
(58) Field of Search .............................. 29/272, 271, 237, 29/281.5; 269/43, 45, 287; 228/49.3, 44.5

(56) References Cited

U.S. PATENT DOCUMENTS

| | | |
|---|---|---|
| 3,552,265 | 1/1971 | Lucas . |
| 3,729,360 | 4/1973 | McElroy . |
| 3,745,641 | 7/1973 | Paolini . |
| 3,846,208 | 11/1974 | McElroy . |
| 4,008,118 | 2/1977 | Wesebaum et al. . |
| 4,227,067 | 10/1980 | McElroy . |
| 4,352,708 | 10/1982 | McElroy . |
| 4,504,047 | * 3/1985 | Jantzen ................................... 269/43 |
| 4,769,889 | * 9/1988 | Landman et al. ...................... 269/43 |
| 4,856,168 | * 8/1989 | Bazinet et al. ......................... 29/272 |
| 4,990,209 | 2/1991 | Rakes . |
| 5,013,376 | * 5/1991 | McElroy et al. ....................... 156/64 |
| 5,206,980 | 5/1993 | Chapman . |
| 5,692,285 | 12/1997 | Weimer et al. . |
| 5,725,724 | * 3/1998 | Andrew et al. ....................... 156/535 |
| 5,727,778 | * 3/1998 | Nodar ..................................... 269/43 |
| 5,743,992 | 4/1998 | Weimer et al. . |
| 5,770,006 | * 6/1998 | Andrew et al. ....................... 156/499 |
| 5,830,312 | * 11/1998 | Weimer et al. ........................ 29/272 |
| 5,843,271 | * 12/1998 | Andrew et al. ....................... 156/499 |

FOREIGN PATENT DOCUMENTS

| | | |
|---|---|---|
| 14 79 185 | 12/1970 | (DE) . |
| 23 09 286 | 10/1973 | (DE) . |
| 23 13 382 | 10/1973 | (DE) . |
| 27 34 910 | 9/1978 | (DE) . |
| 43 37 751 | 9/1994 | (DE) . |
| 195 36 857 | 5/1996 | (DE) . |
| 2 691 666 | 12/1993 | (FR) . |

* cited by examiner

*Primary Examiner*—Robert C. Watson
(74) *Attorney, Agent, or Firm*—Frank J. Catalano

(57) ABSTRACT

Polyolefin pipes are welded end-to-end by a self-propelled, self-contained machine which performs all steps necessary to the process without need for any other machines or equipment. Hydraulically driven parallel tracks are independently controlled for maximum maneuverability. An hydraulically driven, computer controlled, reversible jaw assembly reciprocates the new pipe section relative to the exiting pipe line. A facer for trimming and squaring the pipe ends to be joined and a heater for melting the pipe ends for fusing are umbilically connected to the machine for on-board or remote operation. The computer, also on an umbilical, enables the operator to operate the machine in a normal mode in which the operator manually controls the facing, soaking and fusing processes or an automatic mode in which the fusing process is automatically controlled by the computer. The computer also allows the operator to choose a data logging mode in which the operating pressure, heater temperature and time data are recorded to provide a history for each joint made by the machine.

5 Claims, 33 Drawing Sheets

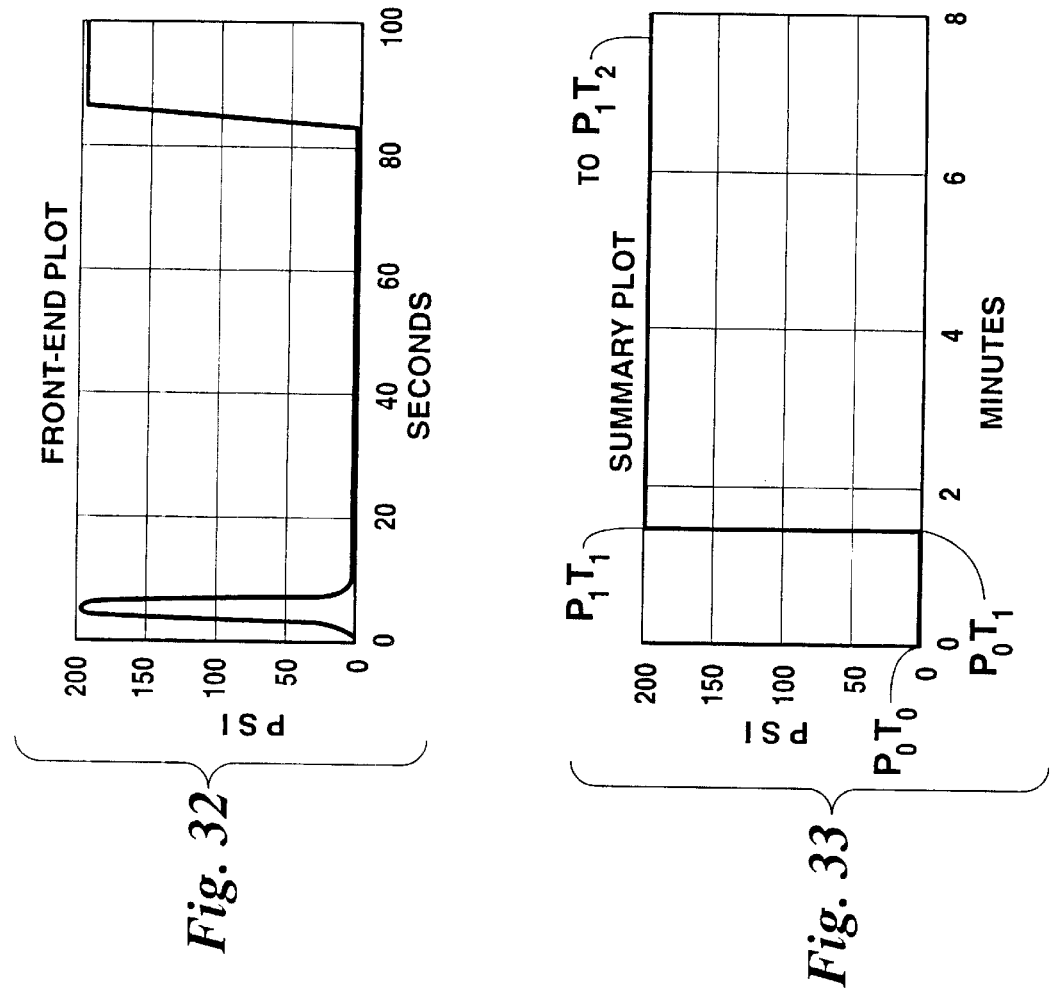
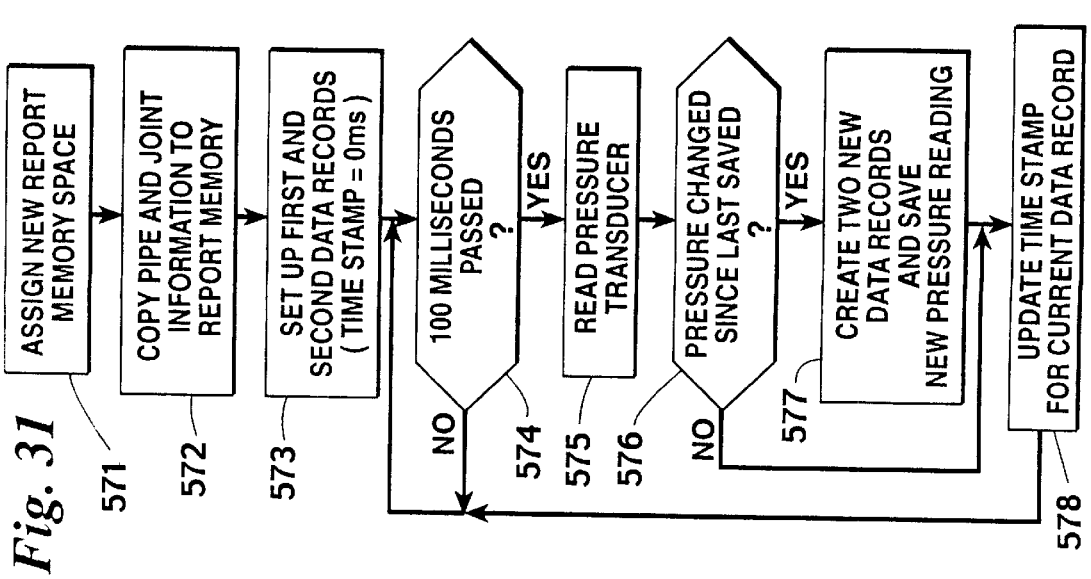

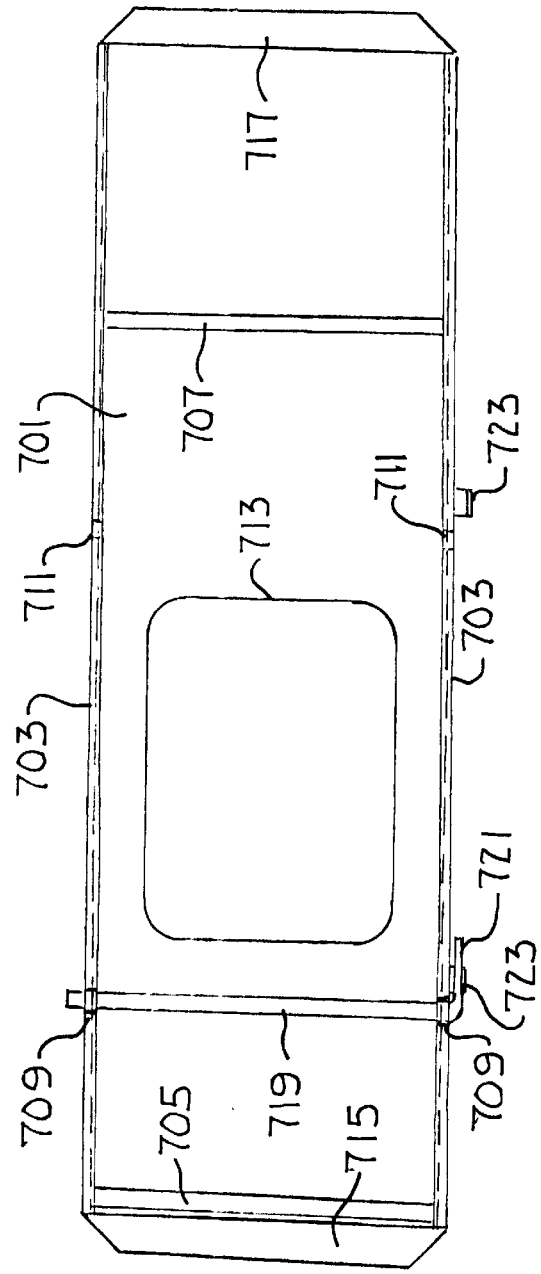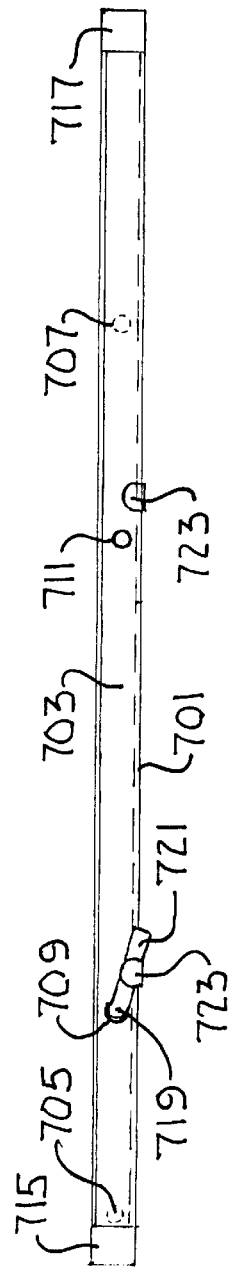
FIG. 36
FIG. 37

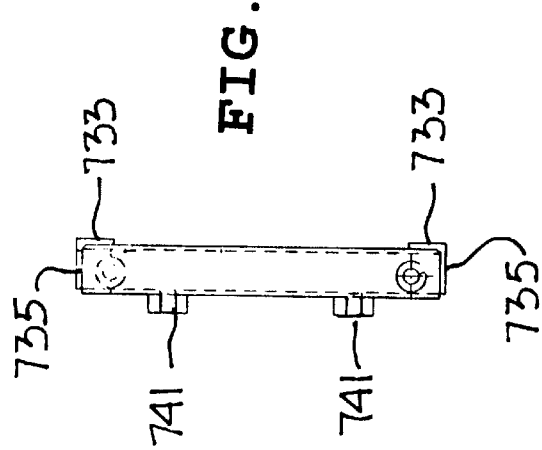
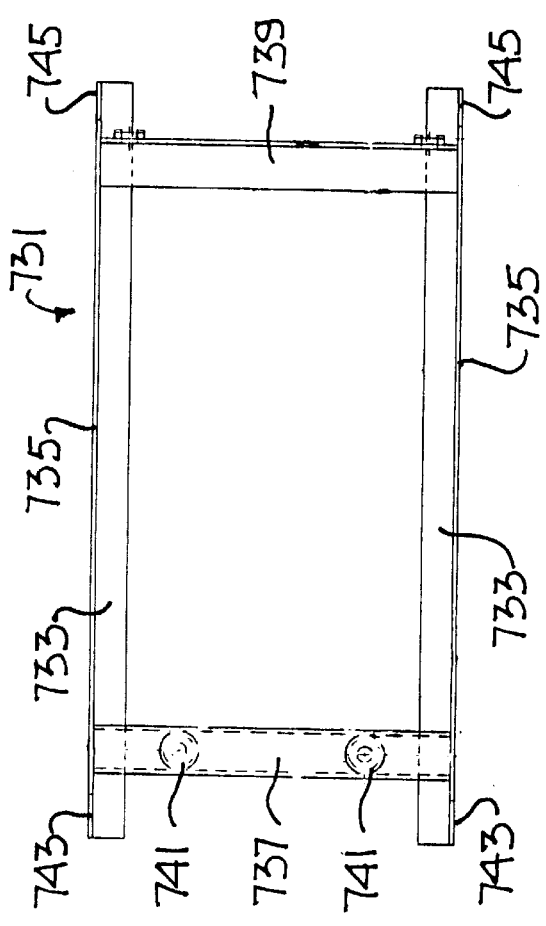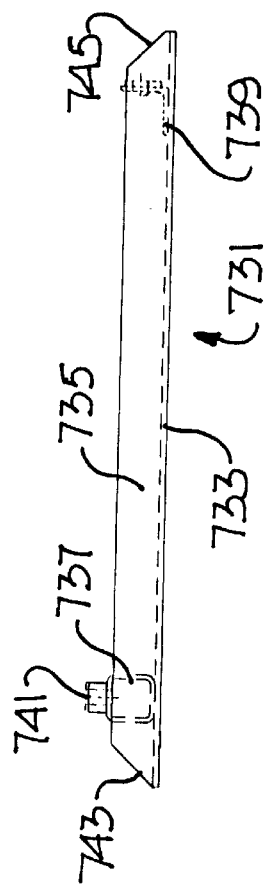

SELF-CONTAINED AND SELF-PROPELLED MACHINE FOR HEAT FUSING POLYOLEFIN PIPES

CROSS REFERENCE TO RELATED APPLICATION

This application is a continuation-in-part of application Ser. No. 08/934,305, SELF-CONTAINED AND SELF-PROPELLED MACHINE AND METHOD FOR HEAT FUSING POLYOLEFIN PIPES, filed Sep. 19, 1997 now U.S. Pat. No. 5,814,182.

BACKGROUND OF THE INVENTION

This invention relates generally to portable machines for fusing polyolefin pipe and more particularly concerns a self-contained and self-propelled machine and method for the end-to-end treatment of two axially aligned pipe ends for the purpose of heat fusing such pipes together.

The principle of heat fusion is to heat two surfaces to a designated temperature and then fuse them together by application of force. The pressure causes flow of the melted materials, which causes mixing and thus fusion. When the polyolefin pipe is heated, the molecular structure is transformed from a crystalline state into an amorphous condition. When fusion pressure is applied, the molecules from each pipe end mix. As the joint cools, the molecules return to their crystalline form, the original interfaces are gone, and the two pipes have become one homogeneous pipe. The joint area becomes stronger than the pipe itself in both tensile and pressure conditions.

The principle operations of this fusion process include clamping the pipe pieces axially to allow all subsequent operations to take place, facing the pipe ends to establish clean parallel mating surfaces perpendicular to the centerline of the pipes, aligning the pipe ends with each other to minimize mismatch or high-low of the pipe walls, heating at a first specified force in a melt pattern that penetrates into the pipe around both pipe ends, joining the melt patterns with a second specified force which must be constant around the interface area and holding the molten joint immobile with a third specified force until adequately cooled.

Presently known portable pipe fusion machines are typically four wheeled cart type machines such as described in U.S. Pat. No. 3,729,360; U.S. Pat. No. 4,352,708 and U.S. Pat. No. 5,013,376. While these machines perform quite well, they require a good deal of labor and additional expensive equipment such as cranes, forklifts, tractors, trucks and the like to load, unload and precisely position the machine on the pipeline. Many machines are damaged during the loading and unloading process. Furthermore, the operators experience stress and fatigue in maneuvering the machines over difficult terrain and conditions.

In addition to the mobility, maneuverability and stability problems of the overall machines, various known machine components also present additional problems. The hydraulic systems are complex and unwieldy and require expenditure of considerable time and labor in preparation for off-cart use. The hydraulics are limited in that they permit selection of only a few operating pressures. The facing operation is complicated because the facer is not easily maneuverable into and out of position between the pipes by one operator when working with the machine off-cart. The facer guide bearings, which are traditionally integral to the body, wear and eventually accuracy in axial registration of the fixed and moving pipes is diminished. This results in undesirable down time of the machine during repair and costly repair to the facer. The jaw assembly necessary to grip and move the pipes during the process requires the front of the cart to be at the free pipe end of the pipe line. The heater is awkward to store for transport and to support on site during periods of non-use.

It is, therefore, an object of this invention to provide a machine, and a method using the machine, for fusing polyolefin pipes which are fully self-contained. Another object of this invention to provide a machine, and a method using the machine, for fusing polyolefin pipes which requires no additional equipment to support operation of the machine. Still another object of this invention to provide a machine, and a method using the machine, for fusing polyolefin pipes which has transport tracks aligned for movement along an axis parallel to the axial pipe alignment within the machine jaws. It is also an object of this invention to provide a machine, and a method using the machine, for fusing polyolefin pipes which is fully self-propelled for forward or reverse movement, left or right movement and pivotal movement about its center. A further object of this invention to provide a machine, and a method using the machine, for fusing polyolefin pipes which is movable along the pipeline from a completed joint to the next joint location. Another object of this invention is to provide a machine, and a method using the machine, for fusing polyolefin pipes which has a tracked undercarriage to increase mobility, stability and maneuverability. Yet another object of this invention is to provide a machine, and a method using the machine, for fusing polyolefin pipes which is easily maneuverable over difficult terrain. It is also an object of this invention to provide a machine, and a method using the machine, for fusing polyolefin pipes which facilitates axial alignment of the machine with the pipeline. A further object of this invention is to provide a machine, and a method using the machine, for fusing polyolefin pipes which has a low center of mass to increase stability. Another object of this invention is to provide a machine, and a method using the machine, for fusing polyolefin pipes which has a jaw assembly easily removed from the machine into remote or in-ditch positions. Yet another object of this invention is to provide a machine, and a method using the machine, for fusing polyolefin pipes which is computer controlled for operation in a variety of modes. Another object of this invention is to provide a machine, and a method using the machine, for fusing polyolefin pipes which is computerized to permit selection of a wide range of operating pressures. Still another object of this invention is to provide a machine, and a method using the machine, for fusing polyolefin pipes which having a facer with wear compensating guide bearings which are easily replaceable in the field.

SUMMARY OF THE INVENTION

In accordance with the invention, a machine and method are provided for end-to-end welding of polyolefin pipes. The machine is self-propelled and self-contained to perform all steps necessary to the welding process without need for any other machines or equipment. A chassis is supported on a pair of independently rotatable parallel tracks so as to permit lineal motion of the chassis in forward or reverse direction, turning motion of the chassis in left or right directions and rotational motion of the chassis about its center.

A jaw assembly mounted on one side of the chassis has a pair of fixed jaws for gripping an end of an existing pipe line and a pair of sliding jaws for gripping an end of free section of pipe to be welded to the existing pipe line. The sliding jaws move in unison on a carriage mounted on parallel guide rods extending on diametrically opposite axes in a horizontal plane in relation to the longitudinal central axis of the pipe line. Preferably, the pipe line and guide rod axes are parallel to the longitudinal axes of the tracks. It is also preferred that the jaw assembly be mounted on a skid that can be secured to the chassis in either a fixed jaw or sliding jaw forward position and that the jaw clamps be reversible so that the operator can access the jaws without reaching over the jaw assembly or the machine regardless of the skid position.

The tracks and the carriage are driven by a power system mounted on the other side of the chassis. Preferably, the power system includes a diesel engine which drives an hydraulic quad pump and a generator. A 12 volt battery, an electrical control box including a microprocessor and supporting electronic devices and a diesel fuel tank are also part of the power system. The tracks are hydraulically driven by two of the quad pump sections and are manually controlled by the operator at a first control station at the rear of the power system. The first control station includes separate track control valves and an operator's instrument panel.

The hydraulic system reservoir is located between the power system and the jaw assembly system on the chassis. An operator pendant and a hydraulic valve system are mounted on the chassis at a second operator's station toward the rear of the jaw assembly side of the chassis. The valve system allows the operator to manually control the hydraulic operation of the motor of a facer which is used to trim the pipe ends to parallel alignment for junction. It is preferred that the facer and the pipe lifts be driven by the same pump section as serves one of the tracks. The pendant allows the operator to electronically control the hydraulic pressure of the sliding carriage, control the operations of the sliding jaws between "apart" and "together" conditions and monitor the carriage pressure and the operation of a heater that is used to melt the pipe ends for fusion throughout the welding process. The pendant includes a microprocessor which preferably enables the operator to operate the machine in a normal mode in which the operator manually controls the facing, soaking and fusing processes or an automatic mode in which the fusing process is automatically controlled by the microprocessor. The pendant microprocessor also allows the operator to choose a data logging mode in which the carriage pressure, heater temperature and time data are recorded to provide a history for each joint made by the machine.

Pipe lifts are provided on the chassis forward and rearward of the jaw assembly to facilitate adjustment of the pipe position in the machine by use of the hydraulic system at the second operator's station. Preferably, the pendant microprocessor includes a calculation algorithm to enable the operator to easily determine the fusing pressure to be applied to the pipe ends being joined. Furthermore, the pendant microprocessor, in cooperation with a rotary encoder and various electrical and hydraulic components, enables the operator to select at least as many as six operating pressures to be applied to the jaw assembly carriage.

The facer is preferably mounted on the machine by use of a removable pivot pin on a facer linkage mounted on the power system side of the machine. The linkage facilitates manual transfer of the facer from a hold position in which the linkage is closed to a use position in which the linkage is open and facer guide brackets are seated on the carriage guide rods with the facer centered on the pipe line axis. The heater is stored in a bag mounted on a frame. The frame is adapted for insertion between the fixed jaws with brackets riding on spacers connecting the fixed jaws during machine transport and for free standing during the welding processes. Furthermore, the skid can be removed from the chassis and placed into the pipe ditch, if desired. The operator pendant, the facer and the heater may be extended away from the machine by umbilicals for use with the jaw assembly in in-ditch or remote operations.

BRIEF DESCRIPTION OF THE DRAWINGS

Other objects and advantages of the invention will become apparent upon reading the following detailed description and upon reference to the drawings in which:

FIG. 31 is a flow diagram illustrating the data logging process of the machine of FIG. 1;

FIG. 32 is a front end plot of a pressure profile during fusion generated in the data logging mode of the machine of FIG. 1;

FIG. 33 is a summary plot of a pressure profile during fusion generated in the data logging mode of the machine of FIG. 1;

FIG. 36 is a top plan view of a modified portion of the machine frame for use with a preferred embodiment of the jaw assembly skid;

FIG. 37 is a side elevation view of the modified portion of the machine frame shown in FIG. 36;

FIG. 38 is a top plan view of a preferred embodiment of the jaw assembly skid;

FIG. 39 is a side elevation view of the skid of FIG. 38;

FIG. 40 is a rear elevation view of the skid of FIG. 38; and

While the invention will be described in connection with a preferred embodiments and methods of operation, it will be understood that it is not intended to limit the invention to those embodiments or methods. On the contrary, it is intended to cover all alternatives, modifications and equivalents as may be included within the spirit and scope of the invention as defined by the appended claims.

DETAILED DESCRIPTION OF THE INVENTION

GENERAL ARRANGEMENT

A preferred embodiment of a fully self-contained and self-propelled welding machine M for on-site alignment, facing, heating and fusion of the ends of two axially aligned polyolefin pipes is illustrated in FIGS. 1 through 5. The welding machine M consists essentially of a machine frame or chassis C mounted on a track drive T and carrying a power supply system P, a jaw assembly J, lift roller assemblies L and hydraulic and electric operating systems Y and E.

The power supply system P has an electrical generator and hydraulic pumps driven by a diesel engine to provide all power required for the transportation and operation of the machine M. The jaw assembly J has fixed and sliding pipe gripping jaws mounted on a skid which can be reversibly loaded on the machine M in forward or reverse alignment. The jaw assembly J aligns the connected and free sections of pipe to be joined and reciprocates the free section of pipe toward and away from the connected section of pipe or the welding process apparata that may be inserted between the pipes. The pipe lift roller assemblies L have V-seats at the front and rear of the chassis C which are hydraulically raised and lowered to maintain the connected and free sections of pipe at a desired level in relation to the machine M and the jaw assembly J. The hydraulic and electric operating systems Y and E consist of a total package of components and connections including microprocessors necessary to allow an operator to control the operation of the power supply system P and the jaw assembly J in the performance of their various functions. A facing assembly F is preferably pivotally mounted on the machine M for insertion of its hydraulically driven facer between the pipe ends to plane their surfaces into proper alignment for fusing to a good joint. A free standing heater H is connect able to the generator for power and is connect able to the electrical operator system E for control and is insertable between the pipe ends to be joined to heat them to a molten or fusible state. The operations of the facer and the heater H are controlled by the hydraulic and electric systems Y and E of the machine M.

TRACK DRIVE

Figure 6:
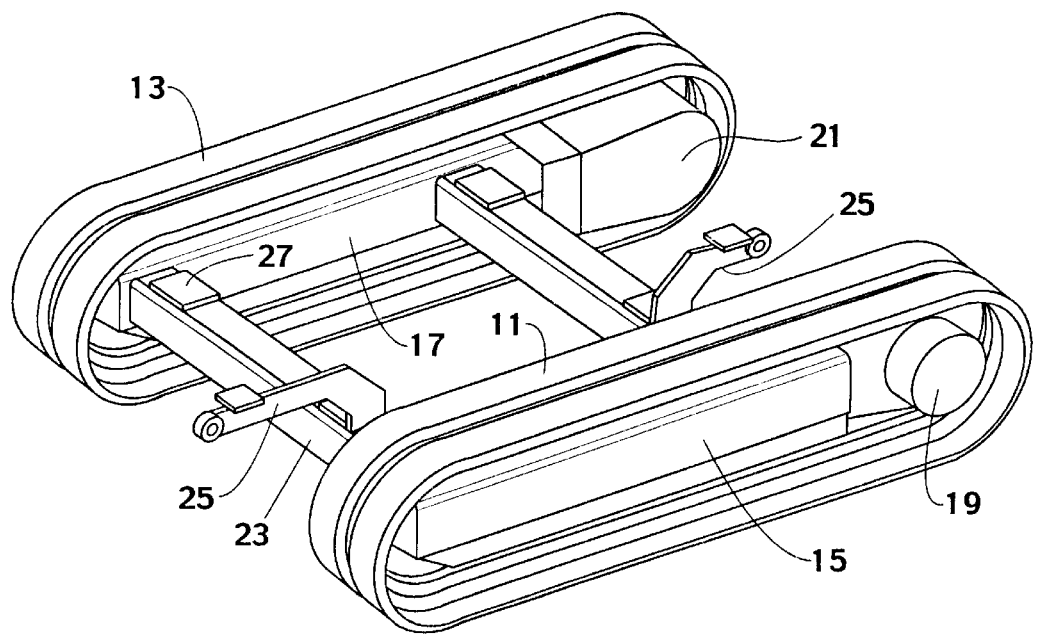
FIG. 6 is a perspective view of the undercarriage and tracks of the machine of FIG. 1.

The track drive T is illustrated in greater detail in FIG. 6 and includes left and right tracks 11 and 13 mounted on track frames 15 and 17 and driven by hydraulic wheel motors 19 and 21. Preferably, the tracks 11 and 13 are made of rubber and travel on roller sprockets and the motors 19 and 21 include parking brakes and dynamic brakes. An adjustable track tension mechanism is also desirable. The HINOWA model PT15G track assembly with anti-cavitation valves, negative brakes and rubber tracks has been found to be quite suitable for the purpose. The track frames 15 and 17 are secured in parallel alignment by an undercarriage assembly 23. Mounting brackets 25 and pads 27 are provided on the undercarriage assembly 23 for purposes hereinafter explained.

HYDRAULIC FLUID RESERVOIR

Figure 7:
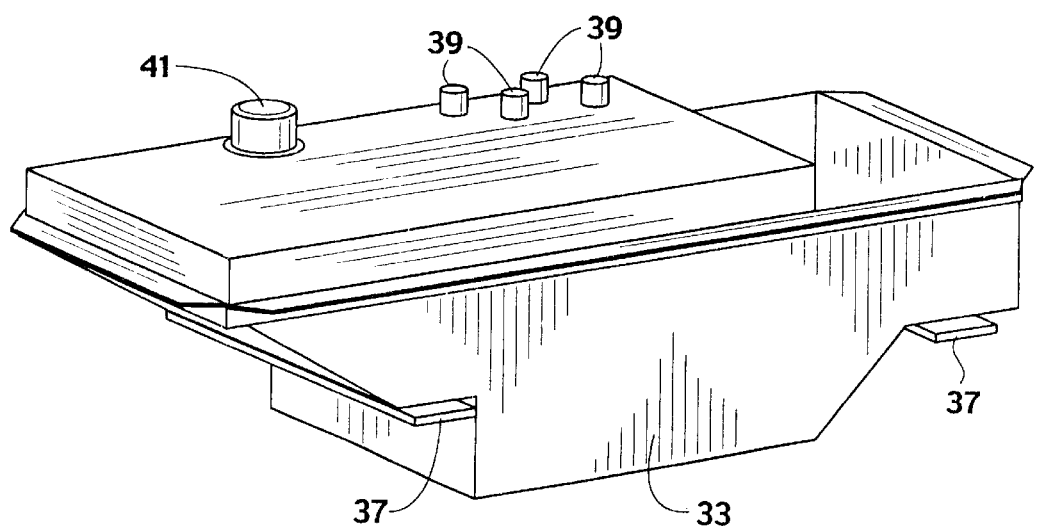
FIG. 7 is a perspective assembly view of a preferred embodiment of the reservoir of the machine of FIG. 1.
Figure 8:
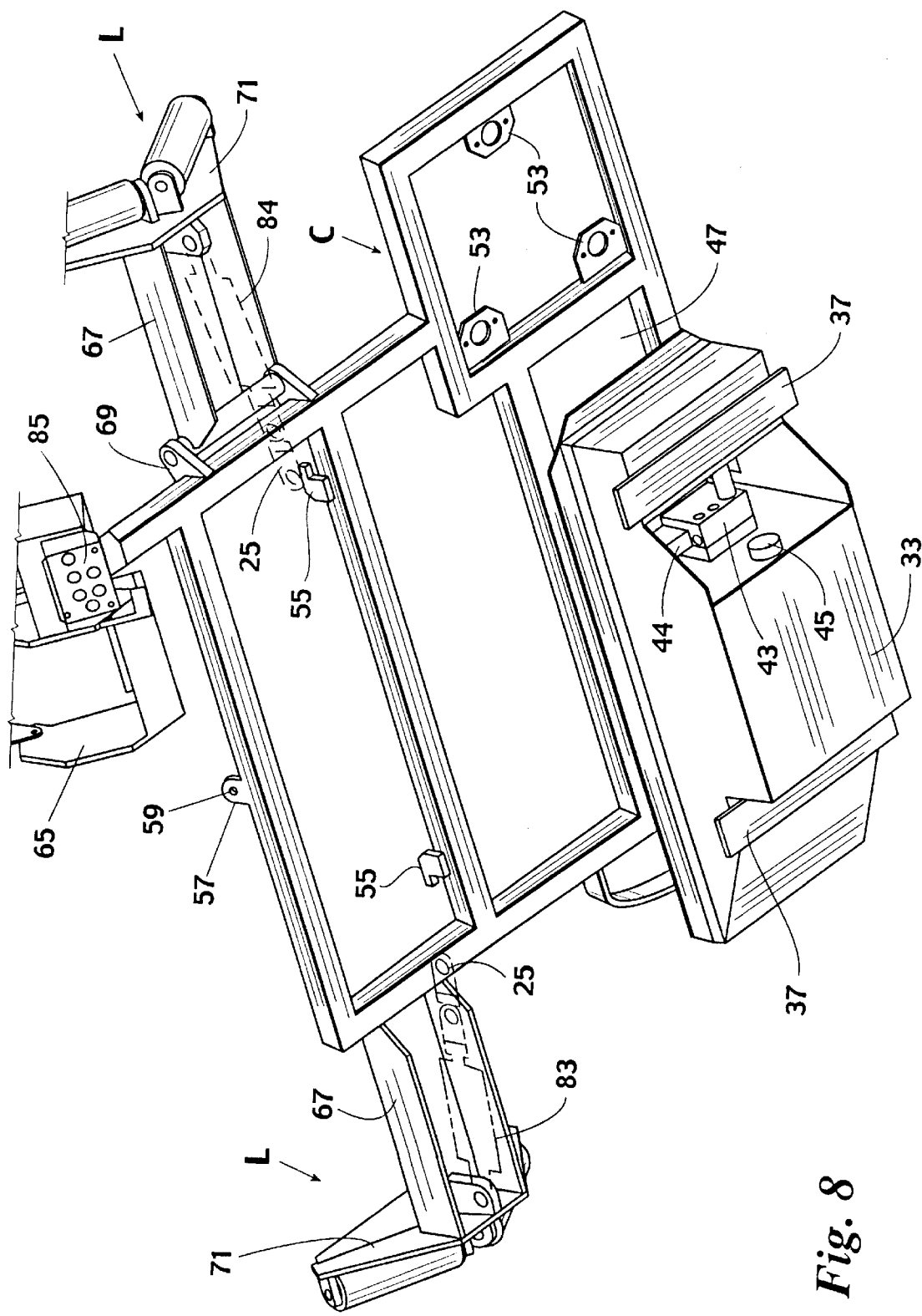
FIG. 8 is a bottom perspective view illustrating a preferred embodiment of the chassis of the machine of FIG. 1.

Looking at FIGS. 7 and 8, the hydraulic fluid reservoir 31 which serves the hydraulic system of the machine M includes a fluid retaining basin 33. Pads 37 are provided on the lower portion of the basin 33 to rest on the undercarriage pads 27 to support the reservoir 31. Hose connections 39 and a refill port 41 are provided in the reservoir 31. A control manifold 43 and an hydraulic system electrical junction box 44 are mounted at the rear of the reservoir 31 above the reservoir drain plug 45.

CHASSIS

Figure 9:
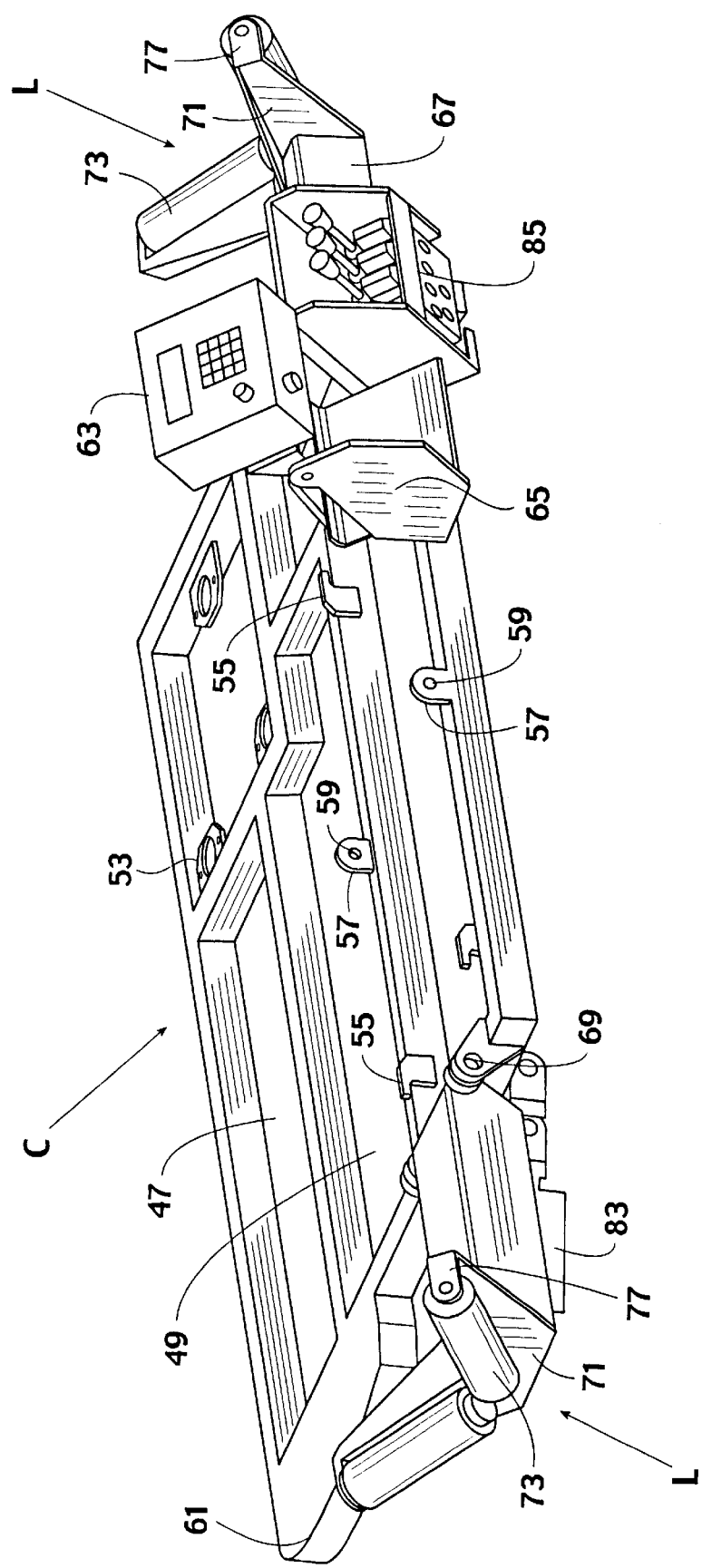
FIG. 9 is a side perspective view of the chassis of FIG. 8.
Figure 10:
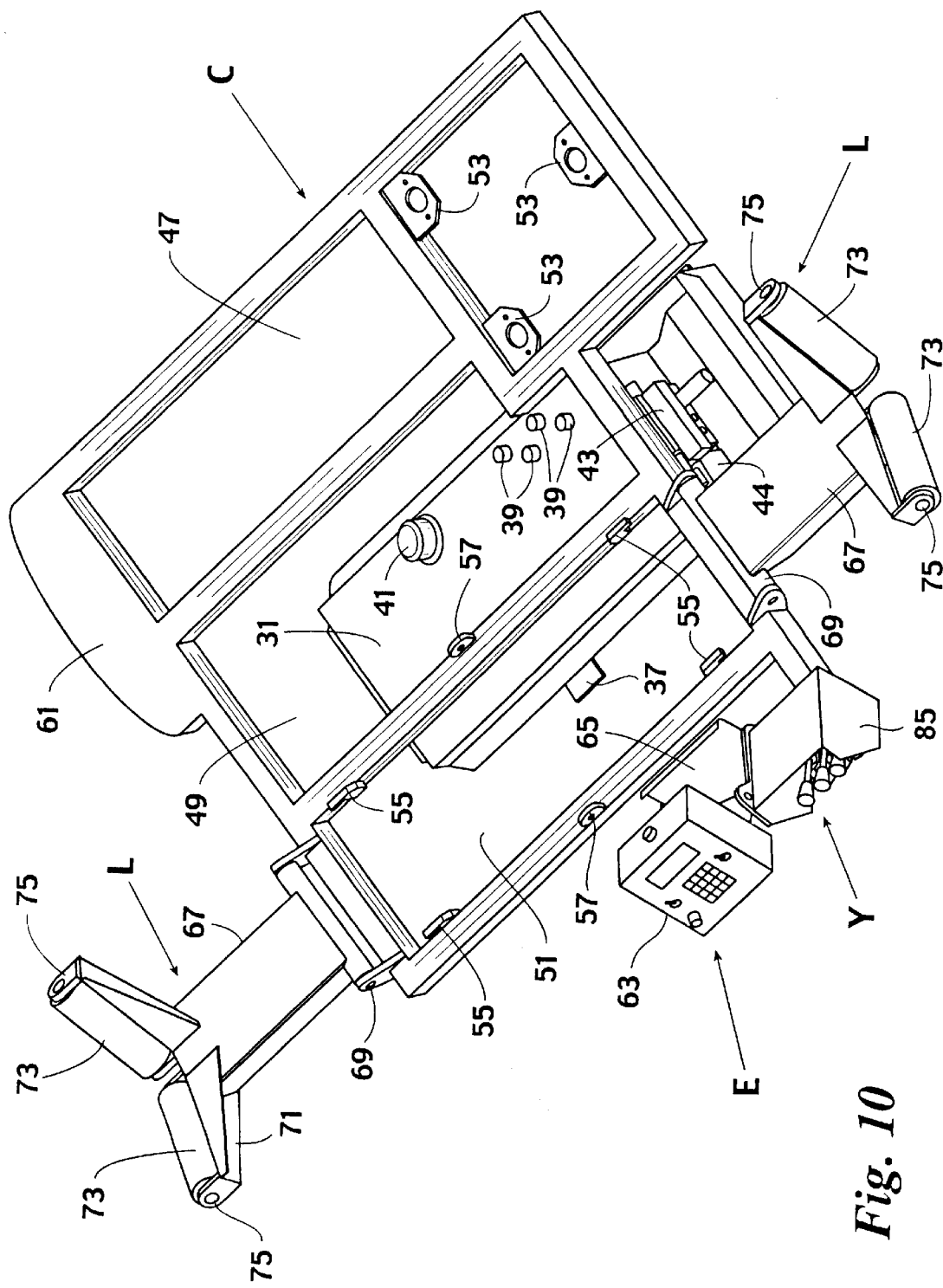
FIG. 10 is a top perspective view of the chassis of FIG. 8.
Figure 11:
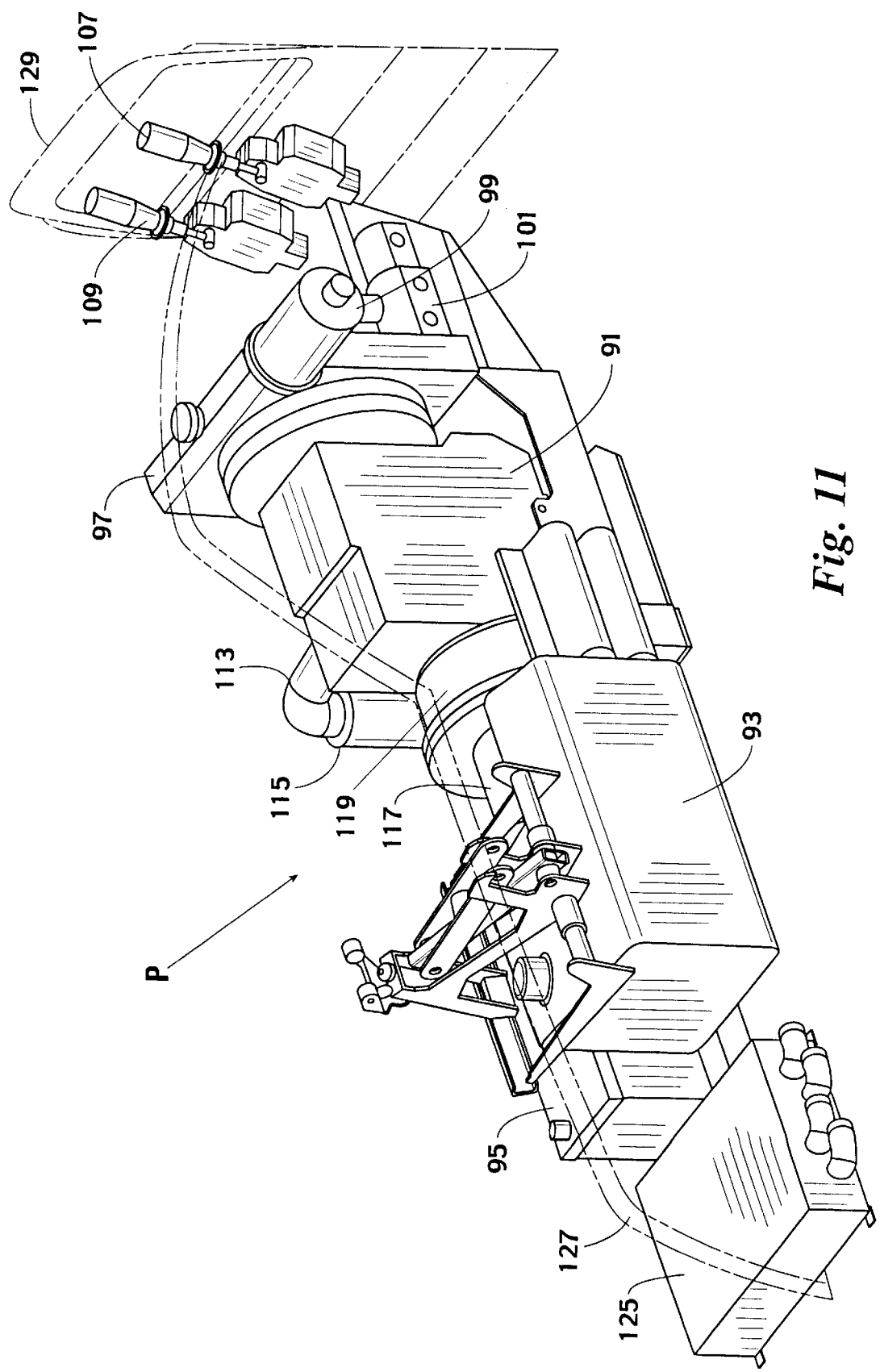
FIG. 11 is a left side perspective view of a preferred embodiment of the power system of the machine of FIG. 1.
Figure 12:
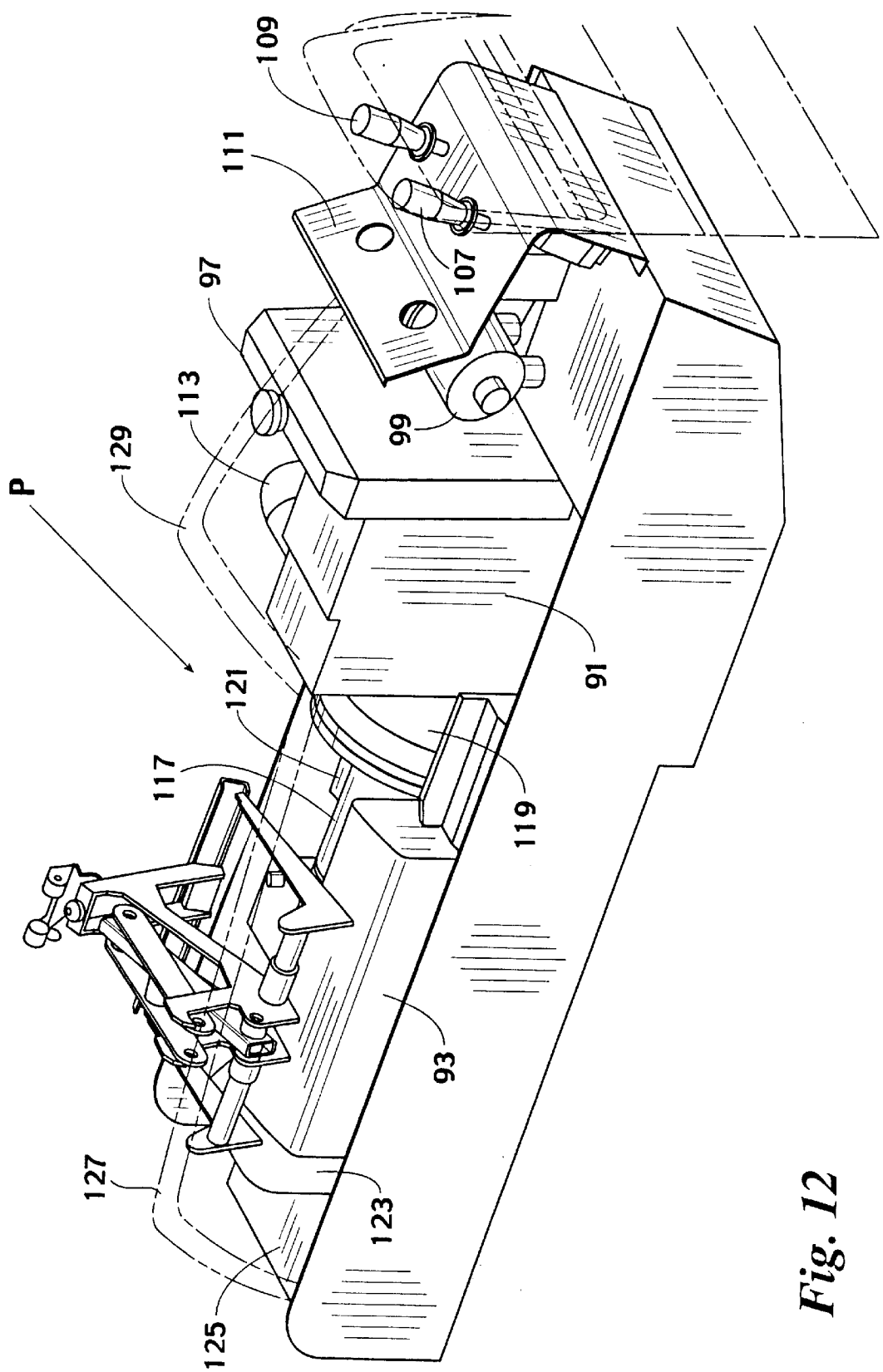
FIG. 12 is a right side perspective view of the power system of FIG. 11.
Figure 13:
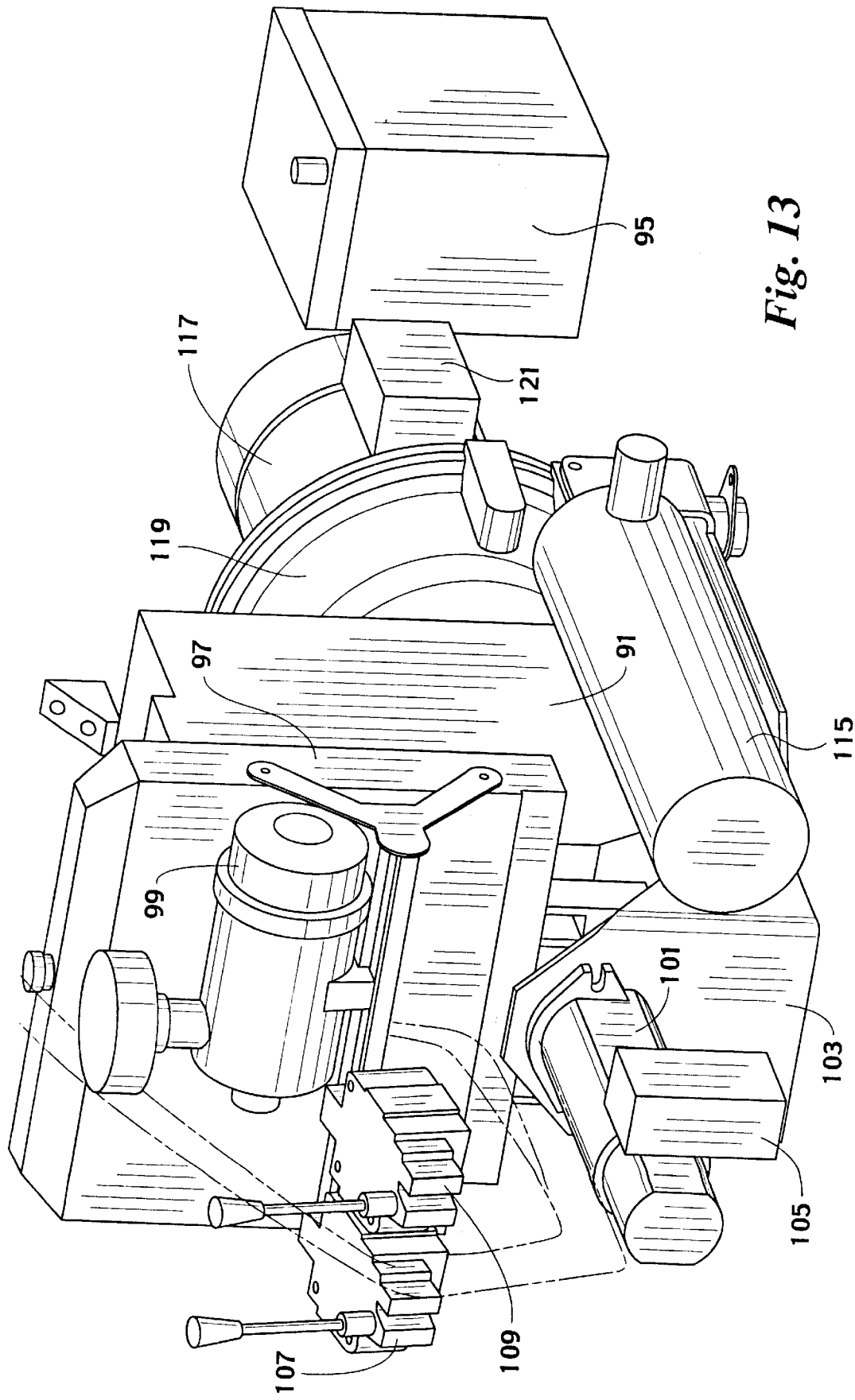
FIG. 13 is a rear perspective of the power system of FIG. 11.
Figure 14:
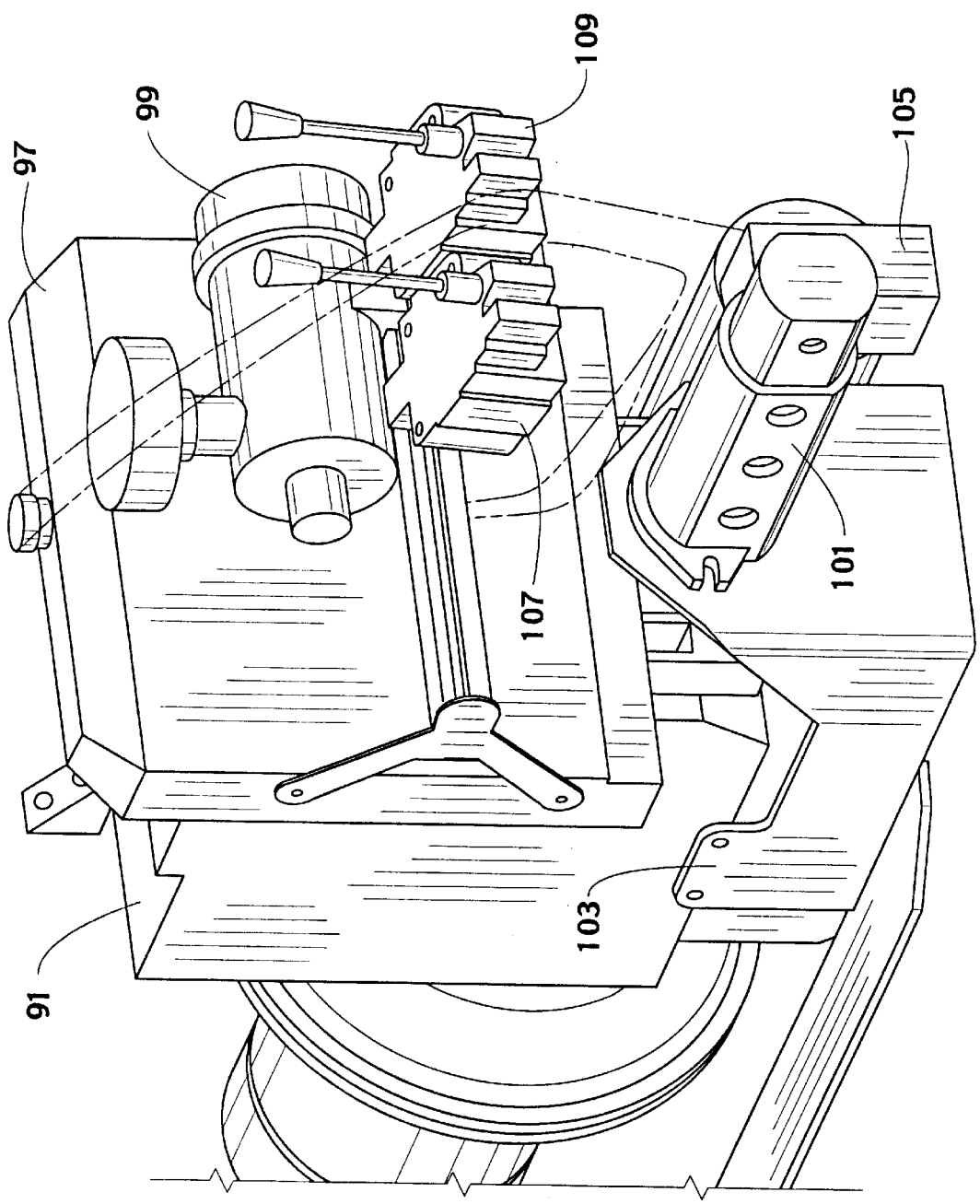
FIG. 14 is a rear perspective of the power system of FIG. 11.

Looking at FIGS. 8–10, the chassis C consists of a tubular frame essentially arranged in rectangular sections extending in the longitudinal direction of the machine M, the right hand rectangular section 47 generally supporting the power supply system P of the machine M, the middle rectangular section 49 generally supported by the hydraulic reservoir 31 and the left hand rectangular section 51 generally supporting the jaw assembly J of the machine M. As shown, the rear of the right hand rectangular section 47 of the chassis C is divided into forward and rear sections. The rear section includes the engine mounts 53. Two pairs of oppositely directed latching members 55 and a pair of centrally located ears 57 with holes 59 are fixed to the left hand rectangular section 51 for purposes hereinafter explained. The pairs of latching members and ears 57 are transversely aligned in relation to the longitudinal or travel direction of the machine M. The chassis C also has a front bumper 61 along the front portion of its right hand rectangular section 47. As seen in FIGS. 1–5 and 8–10, the chassis C also supports an operator pendant 63 which is pivotally connected in a pendant bracket 65 for 180 degree rotation from the operable condition illustrated to a storage condition in which the pendant 63 is shielded and protected by the walls of the bracket 65. The pendant 63 will generally be carried within the bracket 65 during transit of the machine M and is preferably maintained in the transit position by a gas spring which will allow the pendant 63 to rotate into the operating position shown.

PIPE LIFT ROLLER ASSEMBLIES

Figure 1:
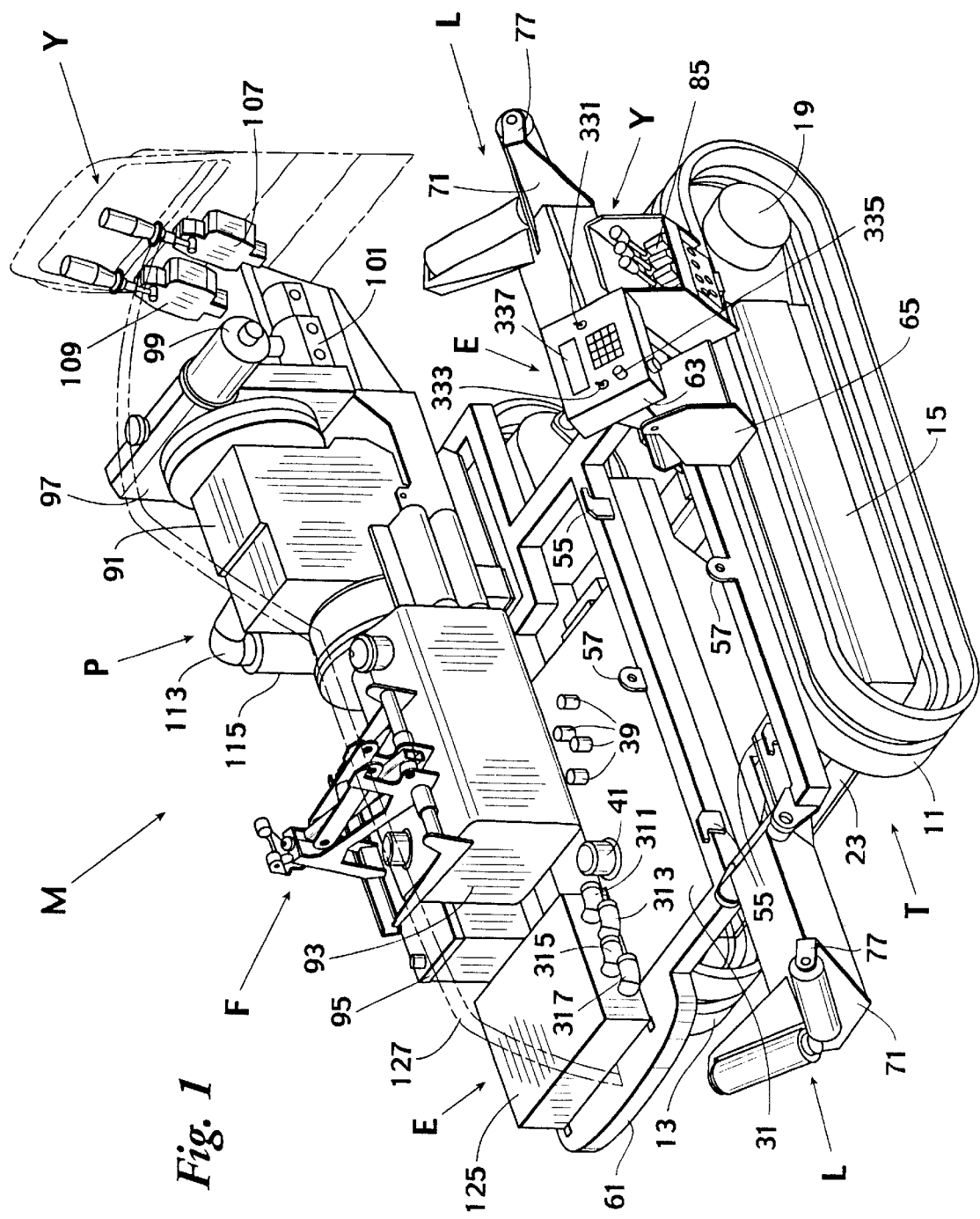
FIG. 1 is a perspective view of a preferred embodiment of the welding machine.
Figure 2:
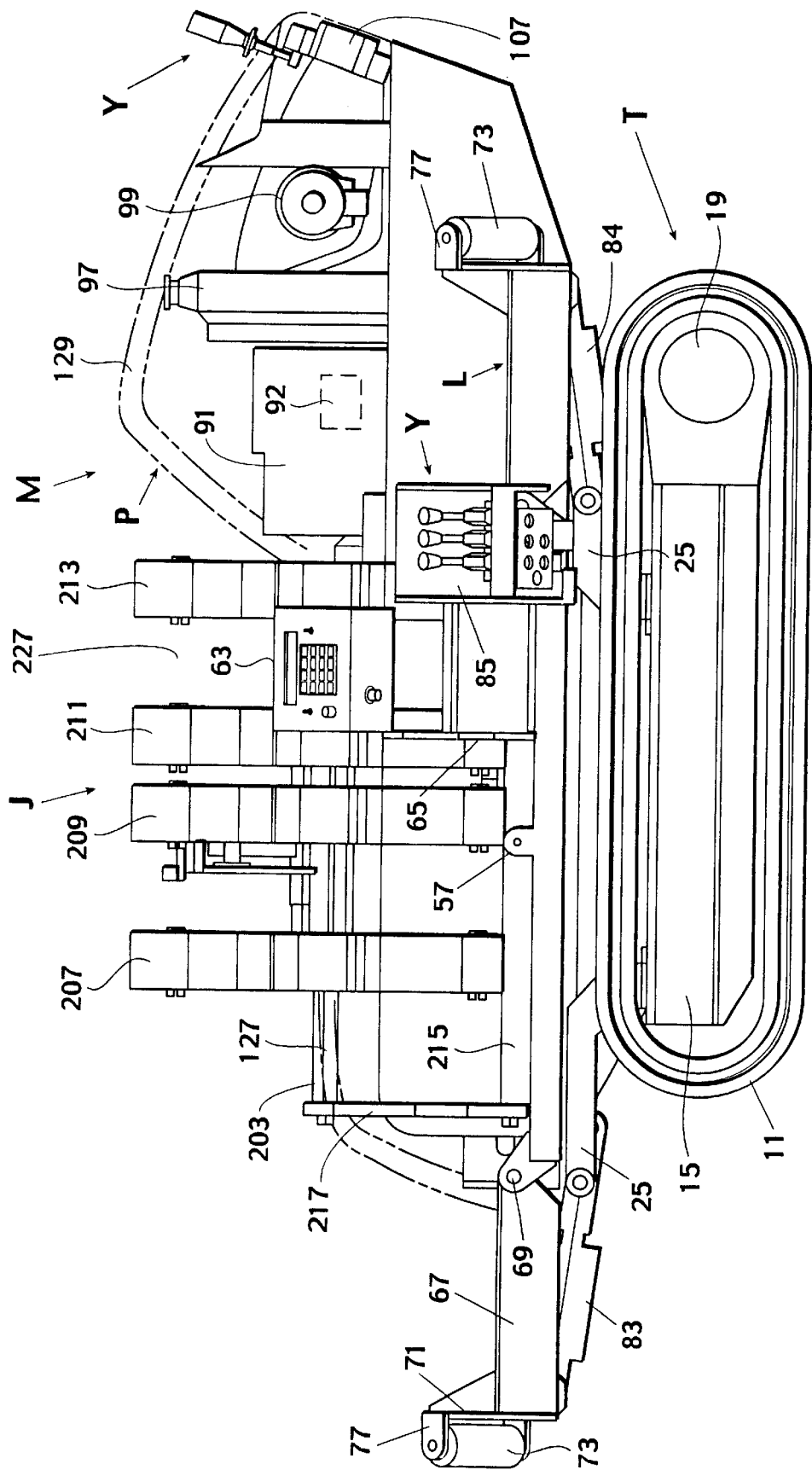
FIG. 2 is a side elevation view of the machine of FIG. 1.
Figure 3:
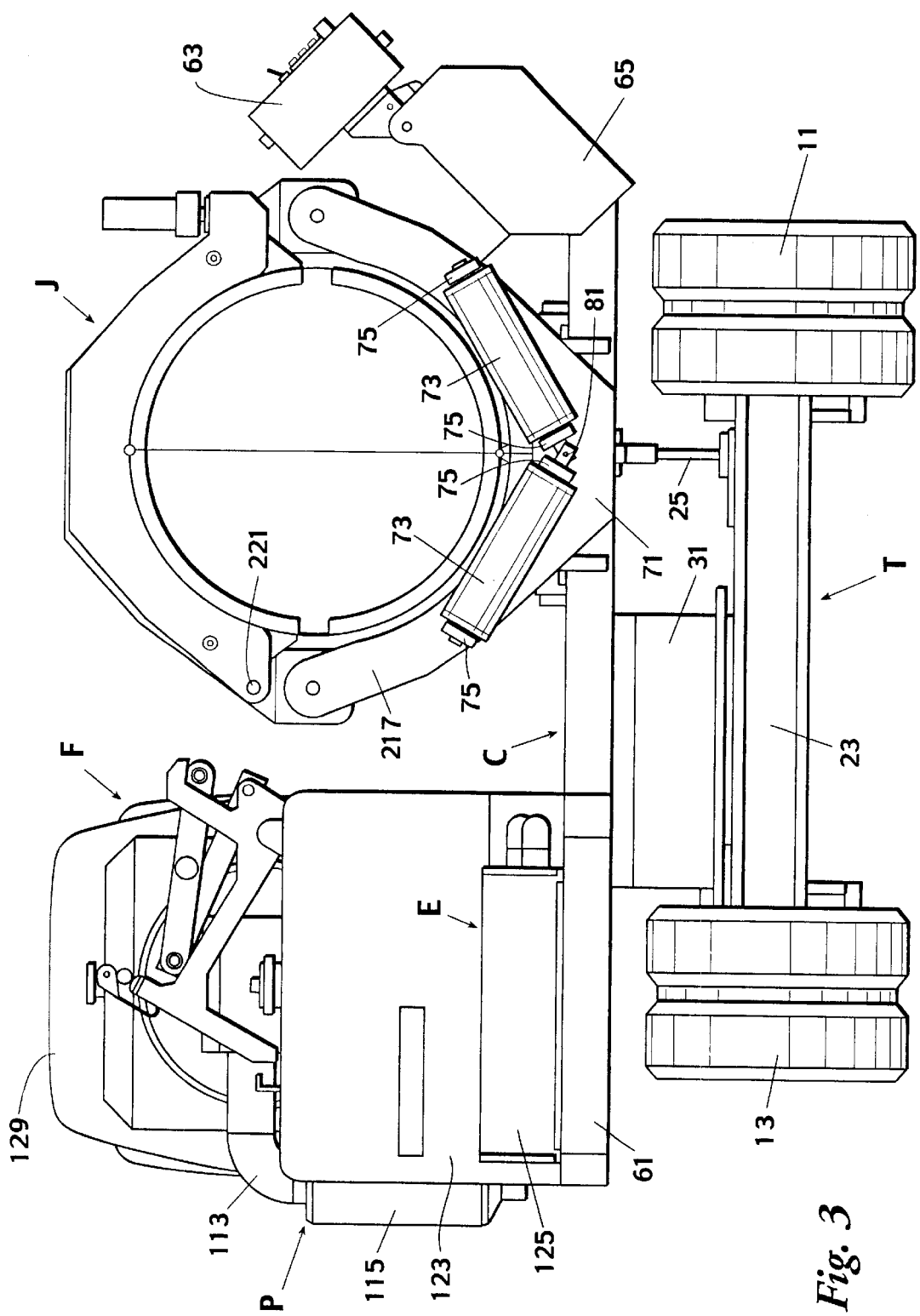
FIG. 3 is a front elevation view of the machine of FIG. 1.
Figure 4:
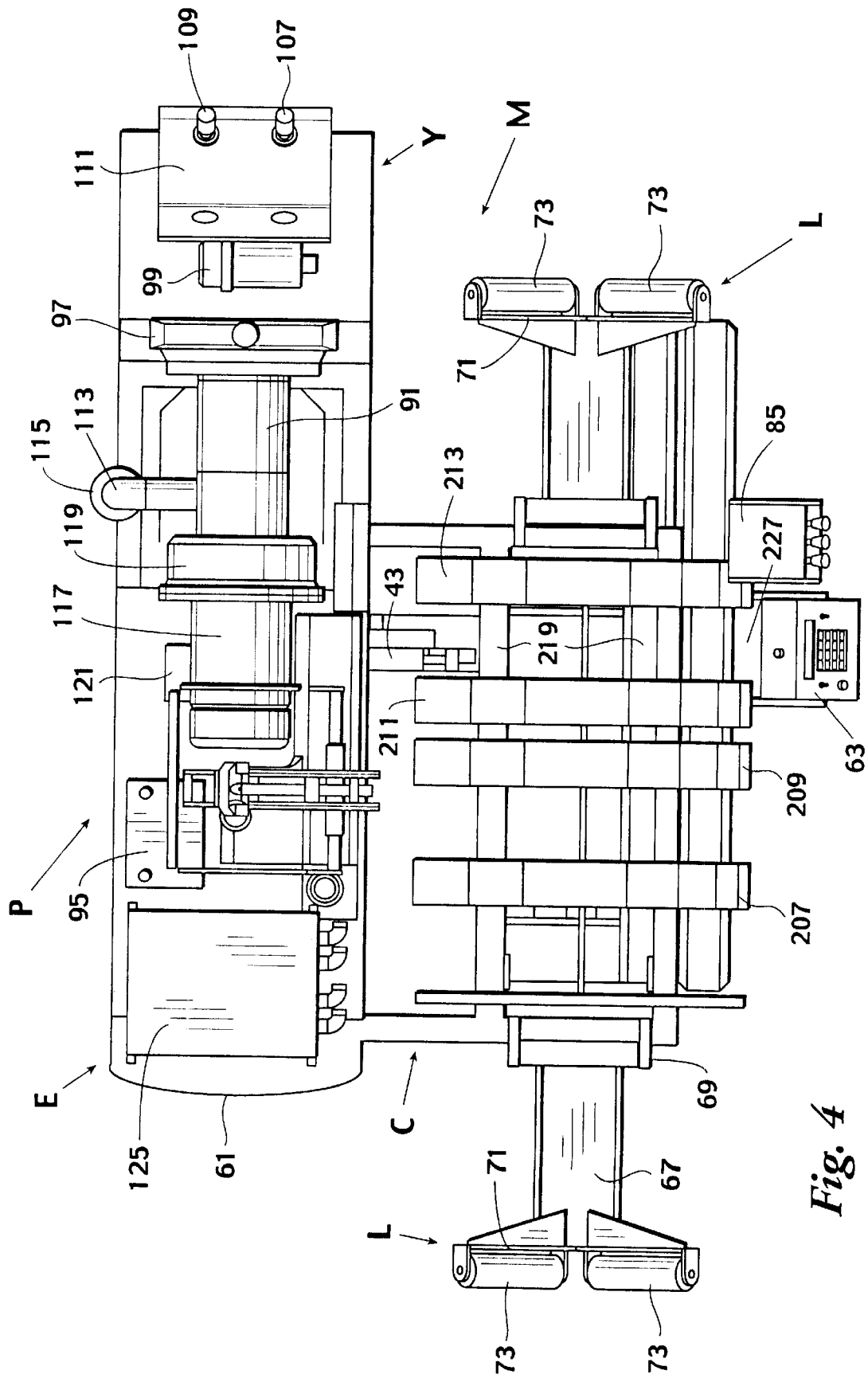
FIG. 4 is a top plan view of the machine of FIG. 1.

Continuing in FIGS. 1–5 and 8–10, the pipe lift roller assemblies L, which facilitate manipulation of the pipe sections to be welded to a proper elevation in relation to the machine M and the jaw assembly J, have longitudinal members 67 which are pivotally mounted to the chassis C by hinge pins 69. Vertical U-shaped plates 71 are welded to the free ends of the longitudinal members 67. A pair of rollers 73, preferably sections of pipe cut to a desired length and having nylon bearings 75 on their ends, are mounted in a V arrangement between ears 77 on each of the plates 71. As can best be seen in FIG. 3, shafts 79 extending through the roller bearings 75 are connected at the bottom of each V by a pin 81 extending through apertures in flatted ends of the shafts 79. The level of each of the V aligned rollers 73 of the pipe lifts L is independently changed by operation of an hydraulic cylinder 83 or 84 which is pivotally pinned between the plate 71 and the undercarriage mounting bracket 25, as is best seen in FIGS. 2 and 8. An hydraulic pipe lift valve assembly 85 is mounted on the chassis C adjacent the operator pendant 63 for operator control of the cylinders 83 and 84.

POWER SUPPLY SYSTEM

The power supply system P is illustrated in greater detail in FIGS. 11–14. A diesel engine 91 with an engine alternator 92 is served by a fuel tank 93 and battery 95 which also provides power to the control circuits of the electric operating system E. A radiator 97 and an air filter 99 are located behind the engine 91. An hydraulic pump 101 is mounted rearwardly of the radiator 97 in alignment with the engine crank shaft on an engine mount bracket 103. The hydraulic pump 101 shown is a quad pump having a manifold 105 connected between its third and fourth stages. Four hoses (not shown) extend from the reservoir connections 39 to the pump 101. Left and right control valves 107 and 109 which operate the left and right tracks 11 and 13, respectively, are mounted on the rearmost portion of the power supply system P on an operator's station 111 which includes the engine instrument panel (not shown). An exhaust pipe 113 extends from the engine 91 to a muffler 115. A generator 117 is aligned on the engine crank shaft in front of the bell housing 119. An electrical junction box 121 is mounted on the generator 117. A vertical plate 123, best seen in FIGS. 3–5, separates a main electrical control box 125 from the fuel tank 93. The front portion of the power supply system P is covered by a front shroud or hood 127 and the rear portion of the power supply system P is covered by a rear shroud or hood 129.

FACING ASSEMBLY

Figure 15:
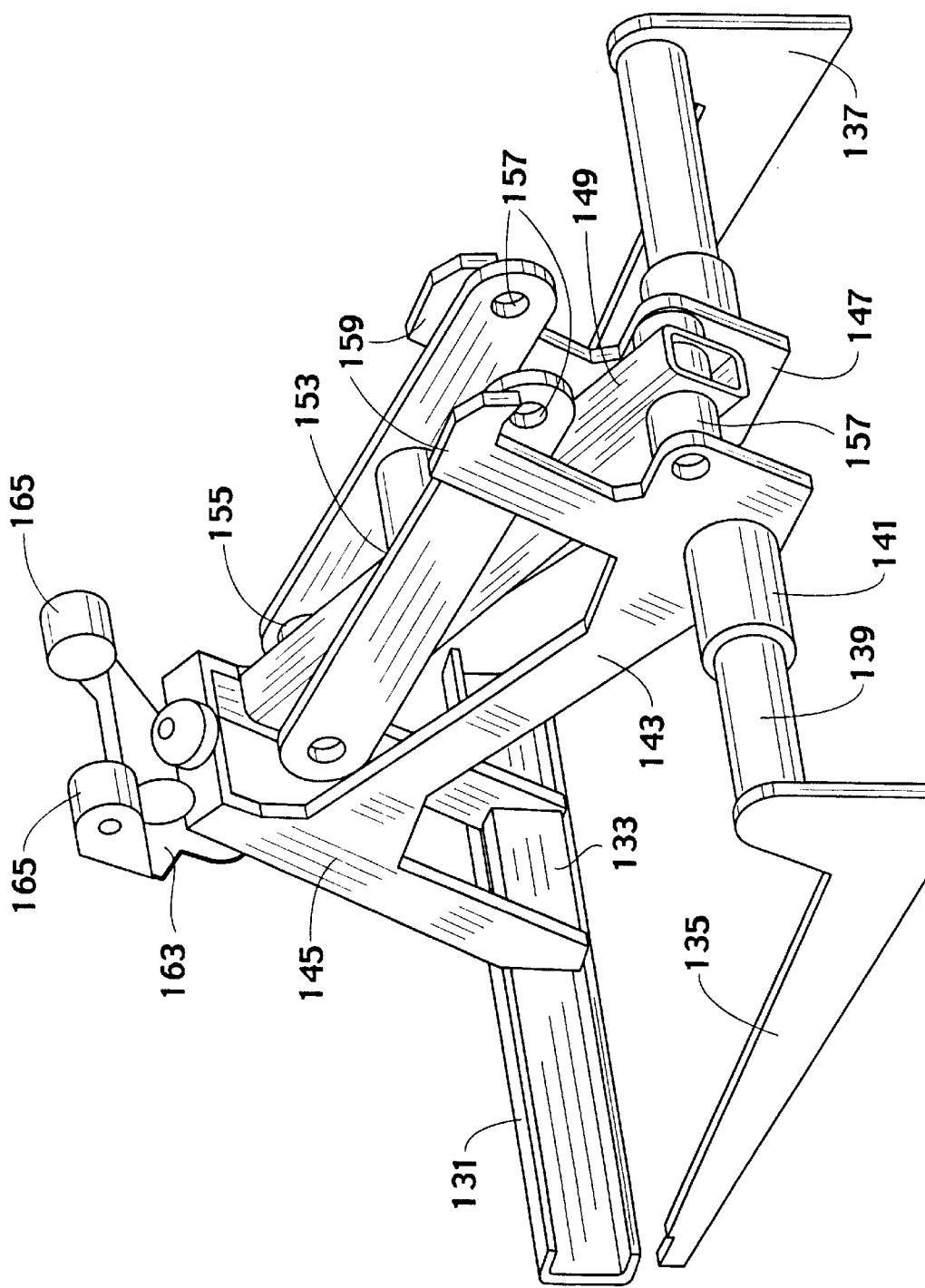
FIG. 15 is a perspective view of a preferred embodiment of the pivot mechanism of the machine of FIG. 1.
Figure 16:
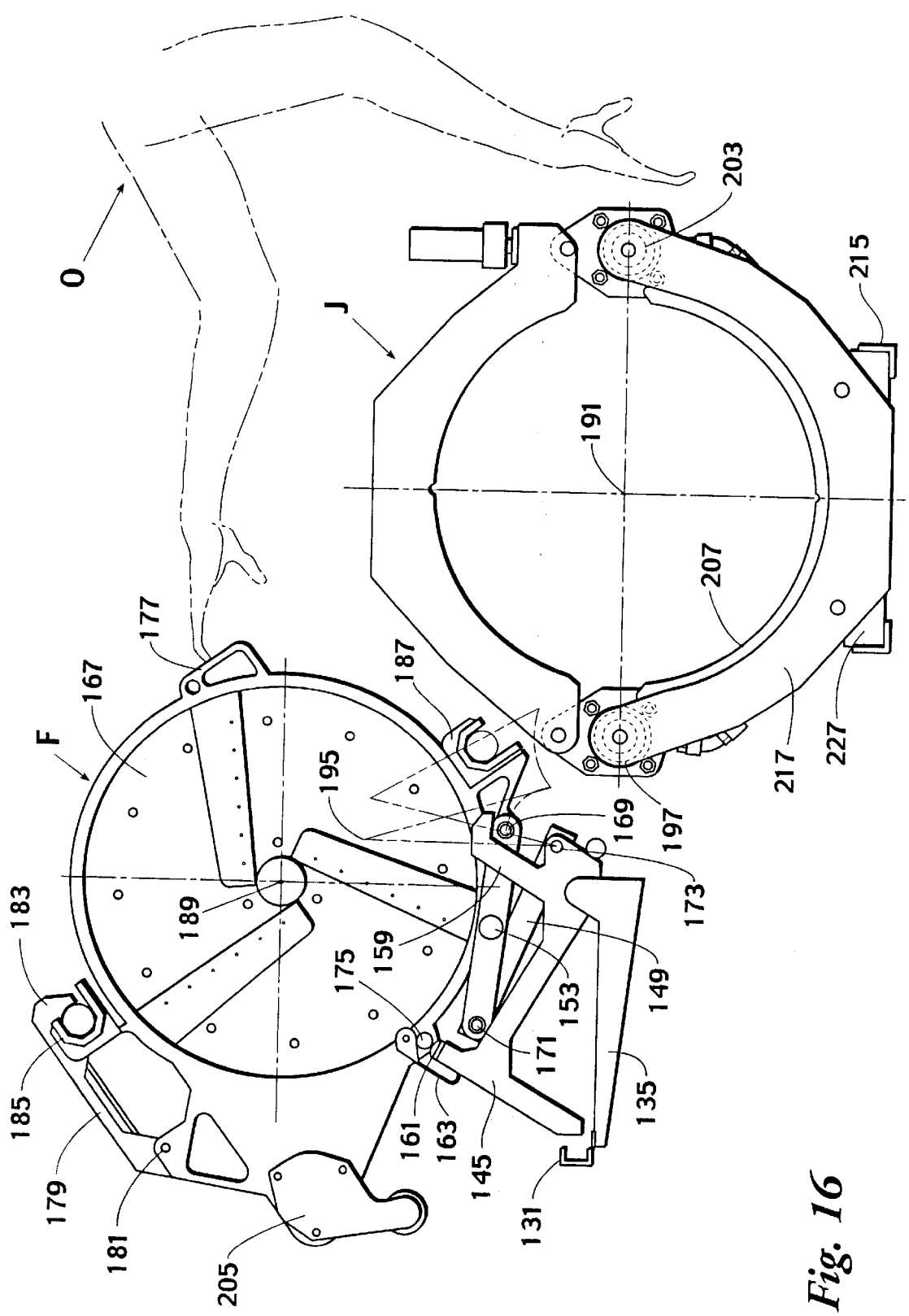
FIG. 16 is a front elevation illustrating the operation of the pivot mechanism of FIG. 15.
Figure 17:
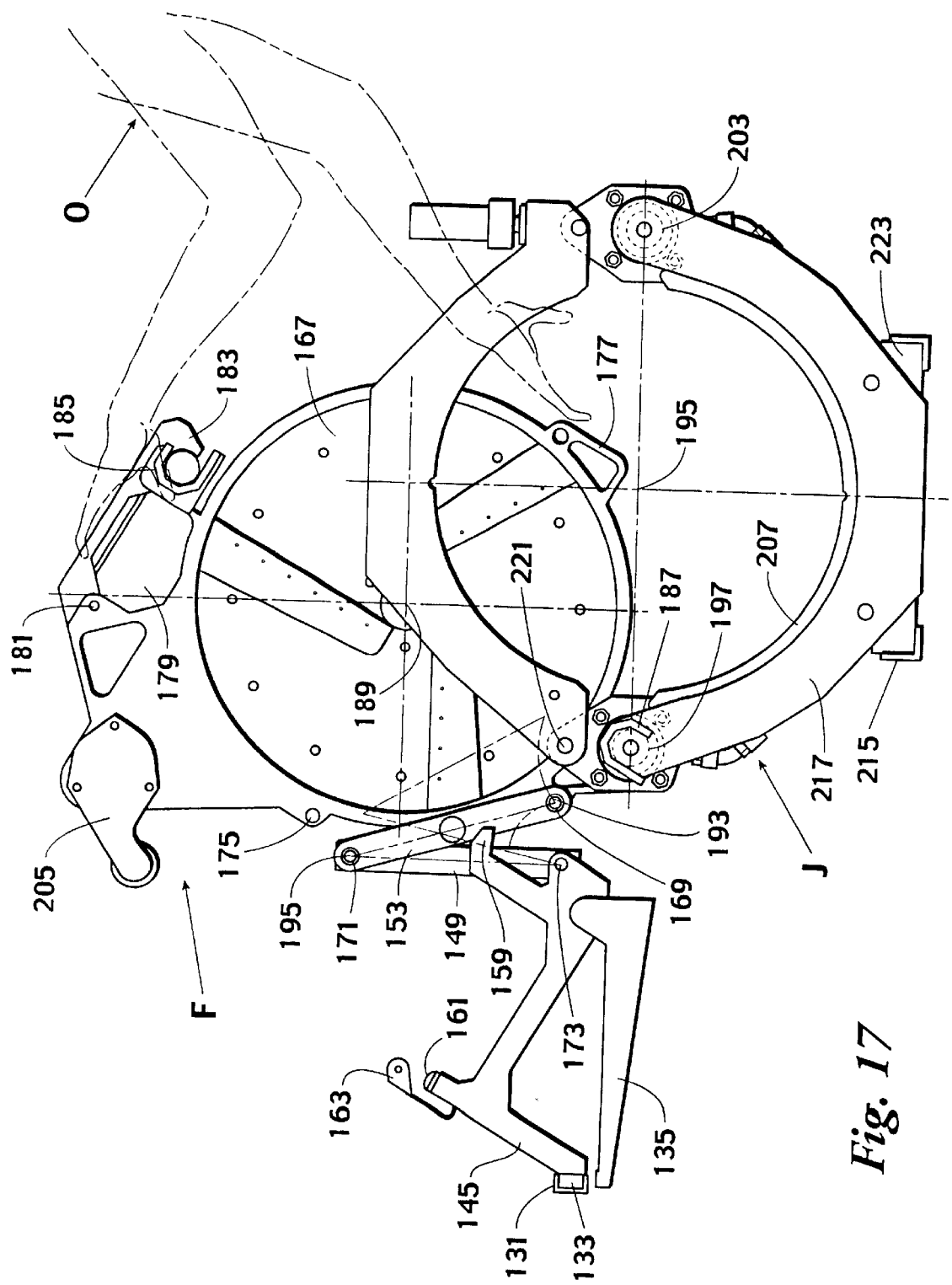
FIG. 17 is a front elevation illustrating the operation of the pivot mechanism of FIG. 15.
Figure 18:
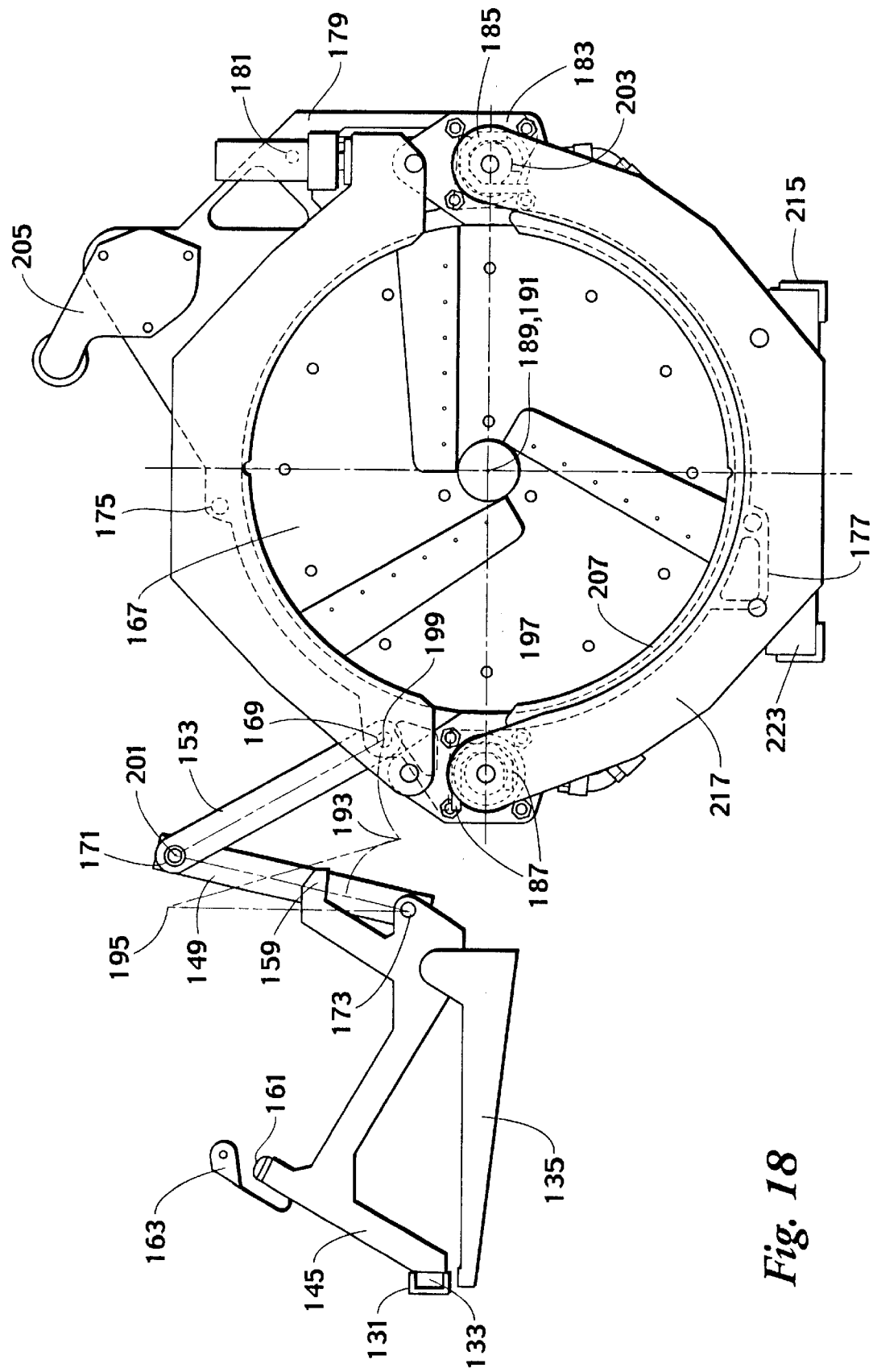
FIG. 18 front elevation illustrating the operation of the pivot mechanism of FIG. 15.

A pivot mechanism for the facing assembly F is mounted on the front shroud or hood 127, as can best be seen in FIGS. 1–5, 11 and 12. The pivot mechanism is shown in greater detail in FIG. 15. The pivot mechanism consists of a horizontal section of U-shaped channel 131 fixed on its side to the front hood 127 and extending parallel to the longitudinal axis of the tracks 11 and 13 with the open side of the channel 131 facing toward the left side of the machine M. A cam follower 133 is slidably engaged for travel within the channel 131. A pair of spaced apart vertical plates 135 and 137 are fixed to the front hood 127 with a rod 139 fixed therebetween and aligned in parallel relationship with the channel 131. A sleeve 141 is mounted in sliding engagement on the rod 139. A bracket 143 is fixed to the cam follower 33 and the sleeve 141 for forward and rearward motion parallel to the longitudinal axis of the machine M. The bracket 143 consists essentially of a pair of parallel plates 145 and 147 in a tilted T configuration with the base of the T mounted on the sleeve 141 and the lower end of the top of the T fixed to the cam follower 133. A facer linkage is connected between the parallel plates 145 and 147. A tubular member 149 of the linkage is pivotally mounted at one end at the bottom of the T by a pin (not shown) which extends through the plates 145 and 147 and a sleeve 151 which extends through the tubular member 149. An H-bar 153 is pivotally connected to the other end of the tubular member 149 by another pin (not shown) which extends through one end of the H-bar 153 with the free end of the tubular member 149 between the H bar uprights. The cross member of the H-bar 153 is seated on the tubular member 149 when the linkage is in a closed condition. Thus, the tubular member 149 limits the downward motion of the H bar 153 in the linkage closed condition. Furthermore, the pin connecting the H bar 153 to the tubular member 149 is longer than the distance between the plates 145 and 147, so that the pin can engage on the edge of the vertical portion of the T-shaped plates 145 and 147. Thus, the downward motion of the tubular member 149 is limited by the engagement of the pin with the bracket 143 when the linkage is in the closed condition. Holes 157 are also provided in the free end of the H-bar 153 for insertion of a removable pin (not shown) to connect the facer to the linkage, as will hereinafter be explained. A pair of L-shaped detents 159 project upwardly from the bottom of the T on each of the plates 145 and 147. A pin (not shown) that is inserted into the holes 157 through the H bar 153 to secure the facer to the linkage is longer than the distance between the detents 159 so that, when the facer is mounted on the linkage and the linkage is in its closed condition supporting the facer for transport, the detents 159 will engage with the pin (not shown) to prevent the linkage and the facer from rolling over should the machine M traverse a hill so steep as to urge the facer linkage. The free or upper end of the cross portion of the bracket 143 is provided with a bumper 161 on which the facer will be seated when the linkage is in the closed condition. This portion of the bracket 143 is also provided with a latch 163 made of sheet metal with nylon rollers 165 mounted on the upper portion of the latch 163 and aligned on an axis parallel to the longitudinal axis of the machine M for a purpose hereafter explained. The operation of the pivot mechanism of the facing assembly F can best be understood in reference to FIGS. 16, 17 and 18. The facer 167 is seated in the pivot mechanism and its removable mounting pin (not shown) inserted through the H-bar 153 and its facer 167 at the first pivot point 169. The linkage, shown in its closed condition in FIG. 16, has its middle pin (not shown) resting on the bracket plates 145 and 147. The middle pin also provides a second pivot point 171. The cross member of the H-bar 153 is seated on top of the tubular member 149. The connection of the tubular member 149 to the bracket plates 145 and 147 provides the third pivot point 173 of the linkage. In the closed condition of the linkage shown in FIG. 16, the facer 167 is seated on the bumper 161 and is mounted for rotation about the first pivot point 169. In this position, the rollers 65 of the latch 163 ride above a top rest button 175 provided on the facer 167 to prevent the facer from tipping in a clockwise direction. The facer 167 is provided with a first handle 177 which is positioned at approximately 3 o'clock when looking at the facer 167 from the front. A second handle 179 is located between approximately 10 and 11 o'clock on the facer 167. The second handle 179 is pivotally connected to the facer 167 about a pin 181 and has a latching portion 183 at its free end which extends around and cooperates with a guide rod bracket 185 for reasons to be hereinafter explained. An identical guide rod bracket 187 is also provided on the facer 167 at a point diametrically opposite the first bracket 185. As shown, the guide rod brackets 185 and 187 are substantially one-half octagons in cross section and are mounted by bolts (not shown) in conforming seats provided in the facer 167. The first bracket 183 is aligned with its opening transverse to the facer diameter and on its clockwise side when viewing the facer 167 from the front of the machine M. The second bracket 187 has its opening aligned with the facer diameter with the opening away from the facer 167. To use the facer 167, it is necessary to transfer it to a position in which its center axis 189 is in alignment with the center axis 191 of the jaw assembly J of the machine M. Looking at FIGS. 16 and 17, the movement of the facer 167 from the linkage-closed position to an intermediate position is illustrated. As shown, the operator O grasps the first handle 177 of the facer 167 and pulls the facer 167 toward the operator O. Initially, the first pivot point 169 will be moved along an arcuate path to a point 193 during which motion the second pivot point 171 will have rotated from approximately a 9 o'clock position to a 12 o'clock position 195. The downward motion of the facer 167 in moving to the intermediate position shown in FIG. 17 is limited by the engagement of the second guide rod bracket 187 on one of the guide rods 197 of the jaw assembly J. In this position, the first handle 177 of the facer 167 will have moved to approximately between 4 and 5 o'clock and the upper handle 179 will have shifted to approximately 12 o'clock. The operator O then releases the first handle 177 and grasps the second handle 179, continuing to pull the facer 167 toward the operator O to continue the movement of the facer 167 into its use or linkage-opened position, as is shown in FIG. 18. As this motion continues, the first pivot point 169 of the linkage moves arcuately from the intermediate point 193 on its path to the final point 199 on its path. During this motion, the second pivot point 171 of the linkage will move substantially horizontally from its intermediate position 195 to its final position 201. During the motion of the linkage from the intermediate to the final position, the second guide rod bracket 187 on the facer 167 remains engaged with the J assembly guide rod 197 until the first bracket 185 on the facer 167 engages with a second guide rod 203 which is diametrically opposite and parallel to the first guide rod 197. While the guide rod brackets 183 and 185 are semi-octagonal in configuration, they function as V-blocks with only two sides of each bracket 183 and 185 coming into contact with their respective guide rods 203 and 197. The two surface seating of the diametrically opposed guide rod brackets 185 and 187 on the diametrically opposed guide rods 203 and 197, respectively, biased by the torque of the facer 167 during the facing process, assures the accurate registration of the center axes 189 and 191 of the facer 167 and the jaw assembly J, respectively. Since the guide rod brackets 185 and 187 are replaceable, down time of the machine M resulting from misalignment of the axes 189 and 191 of the facer 167 and the jaw assembly J as a result of wear to the guide rod brackets 185 and 187 is minimized, replacement of each bracket 185 and 187 being possible without detachment of the facer 167 from the linkage. In the operating or linkage-open position, the latch 183 of the second handle 179 on the facer 167 engages with the guide rod 203 to lock the facer 167 in position with respect to the jaw assembly J. Preferably, the latch 183 is spring loaded to hold it in its closed position on the guide rod 203. After use of the facer 167, the operation of the linkage to return the facer 167 to its linkage-closed position is simply the reverse of the procedure hereinbefore described. Looking back to FIG. 16, a third handle 205 is located at approximately 8 to 9 o'clock on the facer 167 to provide additional maneuverability for the operator O when the facer 167 is used independently of the linkage. All that is necessary to disconnect the facer 167 from the linkage for independent use or transport is to remove the pin at the first pivot point 169 between the H-bar 153 and the facer 167. The operation of the facer 167 in facing the ends of the pipes is thoroughly explained in U.S. Pat. No. 3,729,360 and that disclosure is herein incorporated by reference. The McElroy Rotating Planar-Block facer with three cutter blades on a rotating block chain driven by a hydraulic motor is suitable for the purposes of this invention.

JAW ASSEMBLY

Figure 5:
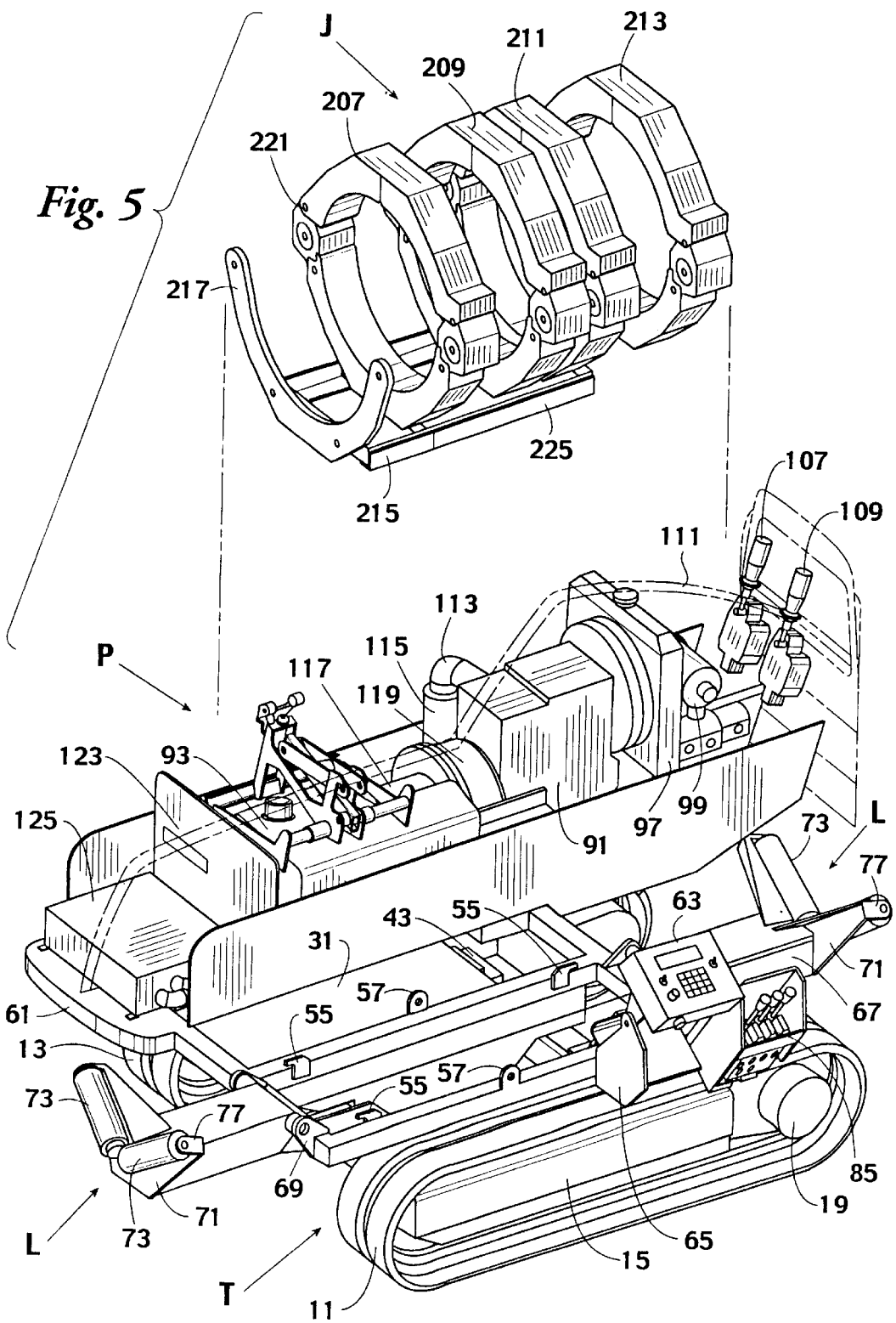
FIG. 5 is an assembly perspective view of the machine of FIG. 1.
Figure 5A:
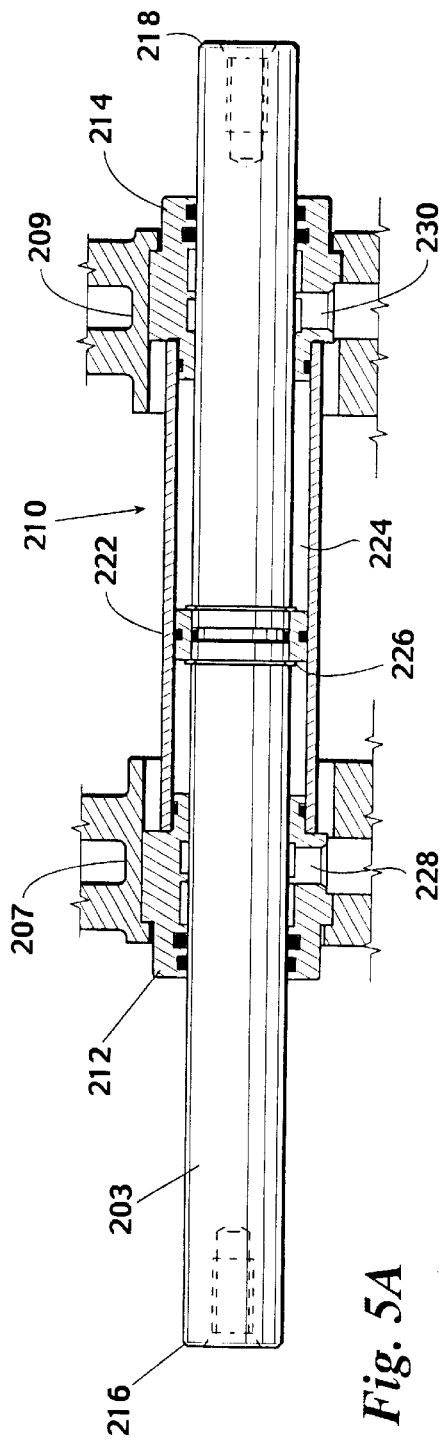
FIG. 5A is a side elevational view of a preferred embodiment of the carriage of the machine of FIG. 1.

Looking again at FIGS. 2–5 and 16–18, the configuration of the jaw assembly J can be understood. A basic explanation of the structure and operation of jaw assemblies for pipe welding machines is given in U.S. Pat. No. 3,729,360 entitled "Portable Thermoplastic Pipe Fusion Apparatus" and U.S. Pat. No. 4,352,708 entitled "Defined Force Fusion Machine for Jointing Plastic Pipe." The present jaw assembly J includes a front moving jaw 207 and a rear moving jaw 209 moved in unison by a moving jaw carriage 210, a front fixed jaw 211 and a rear fixed jaw 213. All of the jaws 207, 209, 211 and 213 are substantially identical. A skid 215 has a vertical yoke plate 217 fixed to and extending upwardly from its front end. The front fixed jaw 211 is fixed to and extends upwardly from the rear end of the skid 215. The guide rods 197 and 203 are fixed between the yoke plate 217 and the front fixed jaw 211. The moving jaws 207 and 209 are connected to form a carriage 210 mounted for reciprocating motion on the guide rods 203 and 197. As can best be seen in FIG. 4, the rear fixed jaw 213 is fixed to the front fixed jaw 211 by spacers 219 aligned with the guide rods 197 and 203 so as to be removable from the jaw assembly J if the assembly J is used separately of the machine M. Removal of the rear fixed jaw 213 results in an assembly J that is much lighter and easier to handle and also facilitates the use of the assembly J to fuse a section of pipe to a T junction which makes gripping the pipe between two jaws impossible. As can best be seen in FIGS. 3 and 5, the upper and lower portions of each of the jaws 207, 209, 211 and 213 are connected by a pivot pin 221 and on their opposite sides by eye bolts connected by pivot pins identical in diameter. Thus, the direction of opening of each of the jaws 207, 209, 211 and 213 can be reversed by pulling the pins 221 and inverting and repinning the upper portion of each of the jaws to the opposite side of its lower portion. In addition, the front end of the skid 215 includes a transverse member 223 engagable with the front or rear latching members 55 on the chassis C shown in FIG. 8. Holes 225 are also provided through the sidewalls of the skid 215 for alignment with the holes 59 through the ears 57 on the chassis C. Thus, the skid 215 is readily reversible on the chassis C by removal of the locking pins (not shown) from the holes 59 and 225 in the ears 57 and the skid 215, disengagement of the skid 215 from one pair of latching members 55, 180 degree rotation of the skid 215, re-engagement of the skid 215 with the opposite pair of latching members 55 and reinsertion of the locking pins (not shown) through the holes 59 and 225. Thus, the skid 215 can be supported on the frame or chassis C with the first or moving jaws 207 and 209 forward of the second or fixed jaws 211 or 213 in a first mounting position and with the second or fixed jaws 213 and 211 forward of the first or moving jaws 209 and 207 in a second mounting position. Depending on the desired orientation of the skid 215 on the chassis C, the hinging of the upper portions of the jaws 207, 209, 211 and 213 can be selected by use of the jaw pins 225 to assure that the operator O can access the jaw assembly J without reaching over the machine M. The moving jaw carriage 210 is shown in greater detail in FIG. 5A. The guide rod 203 is fixed at one end 216 to the vertical yoke plate 217 and at the other end 218 to the front fixed jaw 211. Bearings 212 and 214 slide on the guide rod 203. The bearings 212 and 214 are connected by a cylinder 222 and are sealed to the guide rod 203 to define an hydraulic chamber 224 around the guide rod 203 which is divided by a piston 226. The hydraulic fluid source is connected to the chamber 224 on each side of the piston 226 by ports 228 and 230. The other guide rod 197 supports an identical arrangement. The moving jaw carriage 210 is hydraulically reciprocated on the guide rods 197 and 203 by the hydraulic system Y in a manner hereinafter described.

TRAPEZOIDAL SKID JAW ASSEMBLY

A specially preferred embodiment of the reversible jaw assembly is illustrated in FIGS. 36–41. Looking first at FIGS. 36 and 37, to accommodate the preferred skid arrangement, the frame F of the machine M shown in FIGS. 8–10 is modified to include a base 701 with upwardly extending parallel sidewalls 703. The parallel sidewalls 703 support spaced apart parallel rods 705 and 707 which are rigidly fixed to the sidewalls 703. In addition, the sidewalls 703 have two pairs of apertures 709 and 711 which are oppositely aligned and symmetrically displaced between the rods 705 and 707. As shown, the central portion of the base 701 has a large opening 713, preferably substantially symmetrically located between the axes of the oppositely aligned apertures 709 and 711. The base 701 is reinforced by end cross members 715 and 717 fixed to the base 701 and to the ends of the sidewalls 703. A rod 719 L-shaped at one end to form a handle 721 is slidably insertable through either pair of aligned apertures 709 or 711. Seats 723 are fixed to one of the sidewalls 703 proximate each aligned pair of apertures 709 and 711 so as to support the handle 721 of the rod 719 inserted through the adjacent pair of apertures 709 or 711.

Turning to FIGS. 38–40, the preferred embodiment of the skid 731 includes a pair of parallel spaced apart angle irons having one wall 733 forming the base portion of the skid 731 and upright sidewalls 735. The sidewalls are spaced apart by cross members 737 and 739 at a distance such that the sidewalls 735 may be snugly nestled between the sidewalls 703 on the machine frame F. As shown, one of the cross members 737 is provided with mounts 741 for connecting the jaw assembly hereinbefore described to the skid 731. As can best be seen in FIG. 39, the sidewalls 735 of the angle iron are cut at an angle so as to take on a trapezoidal configuration with the lower parallel side of the trapezoid being along the base 733 of the angle irons. The length of the angle irons is such that, when the skid 731 is nestled on the base 701, the center of the angled edges 743 and 745 will be substantially tangent to one pair of aligned apertures 709 or 711 while the other angled edge 745 or 743 will be substantially tangent to the more distant opposite rod 707 or 705 fixed to the frame base sidewalls 703.

Figure 41:
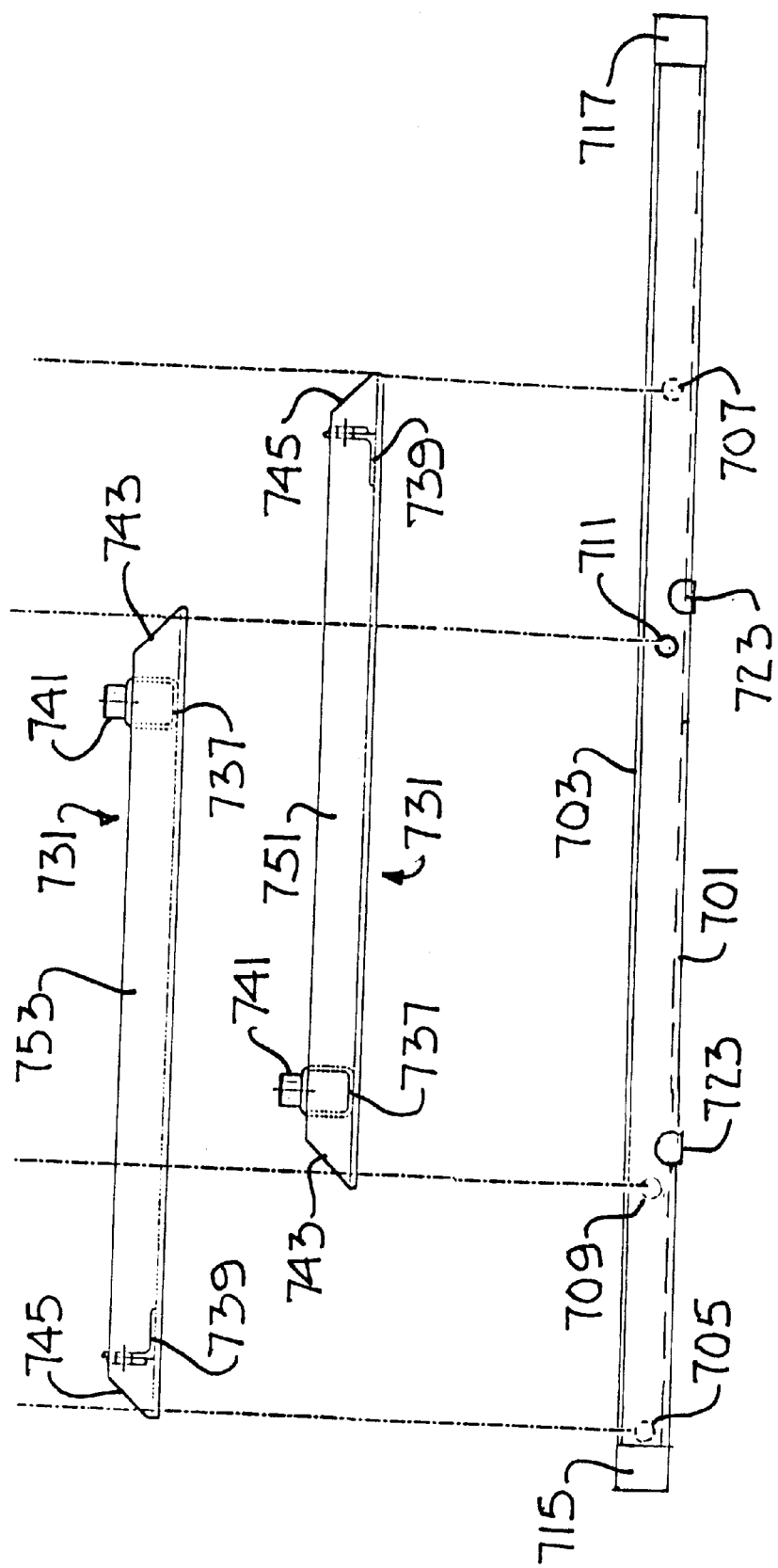
FIG. 41 is a side elevation view illustrating first and second mounting positions of the skid of FIGS. 38, 39 and 40 on the modified frame of FIGS. 36 and 37.

The reversibility of this preferred embodiment of the skid 731 is best seen in reference to FIG. 41 which illustrates the modified base 701 of the machine M and the skid 731 disposed for mounting in forward 751 and reverse 753 positions on the base 701 of the machine M. As shown, in the first or forward position 751, one angular edge 743 of the skid 731 will be tangent to the forward aperture 709 when the other angular edge 745 of the skid 731 slides into tangential abutment against the rear fixed rod 707. Conversely, in the second or rearward position 753, the other angular edge 745 of the skid 731 will be tangent to the rearward aperture 711 when the one angular edge 743 of the skid 731 slides into tangential abutment against the forward fixed rod 705.

Thus, in operation of the trapezoidal skid jaw assembly, assuming the skid 731 is mounted in the forward position on the machine M, the handle 721 on the rod 719 is rotated out of its seat 723 and withdrawn from the forward apertures 709 in the machine M. The skid 731 is then slid in a forward direction to clear the rod 707 at its rear. The skid 731 can then be removed and rotated 180 degrees and again nestled in position on the base 701. The skid is then slid forward until the edges 745 come into tangential abutment with the forward rod 715 on the machine frame F. The rod 719 is then inserted through the rearward apertures 711 in the machine M. The edges 743 of the skid 731 should then be substantially tangent to the rod 719. The handle 721 is then rotated into its seat 723 to lock the rod 719 in place. The pivot positions of the jaws of the jaw assembly are then reversed as hereinbefore described to complete the transition.

HEATER

Figure 18A:
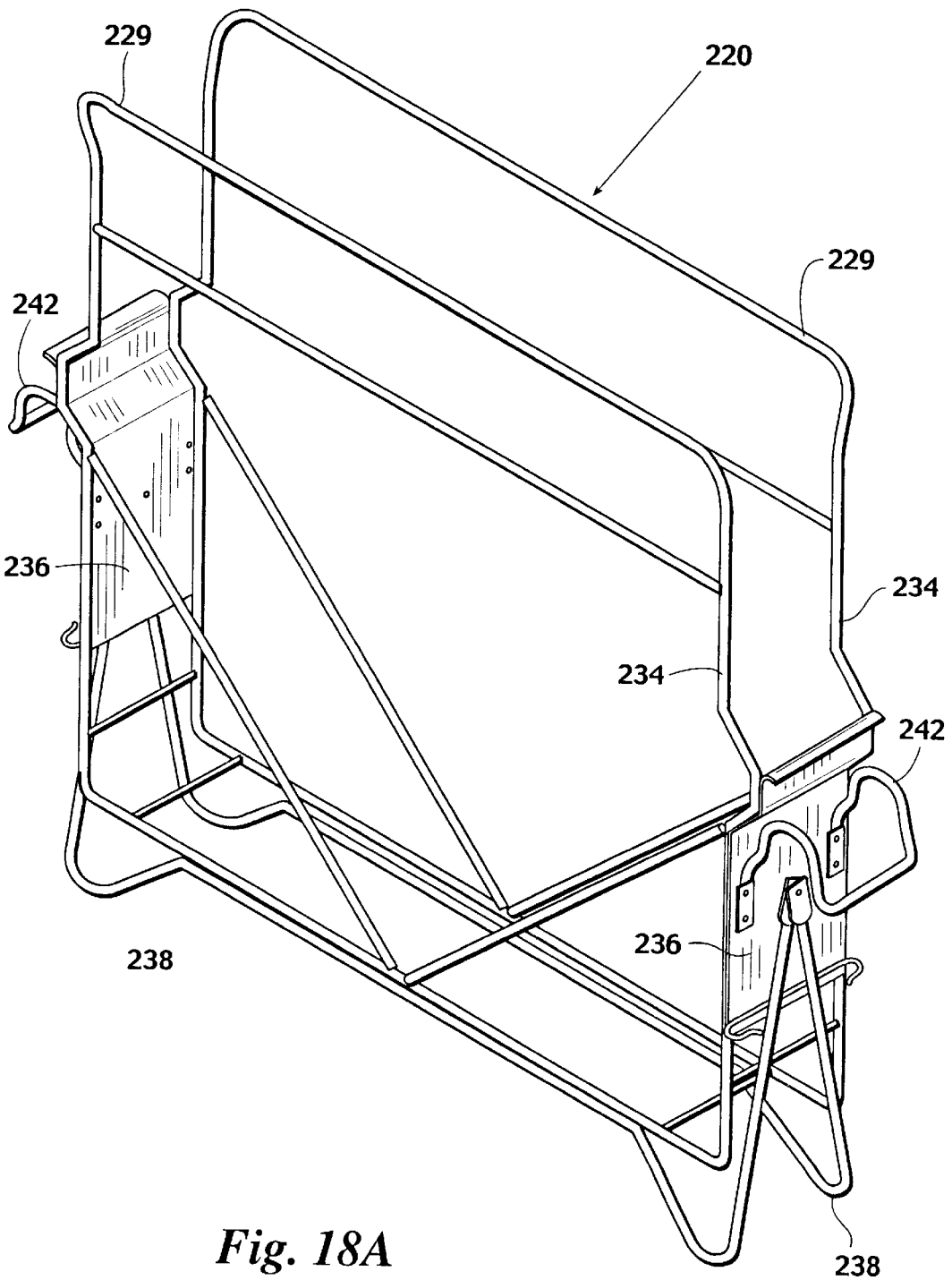
FIG. 18A is a perspective view of a preferred embodiment of the frame for supporting the heater of the machine of FIG. 1.
Figure 20:
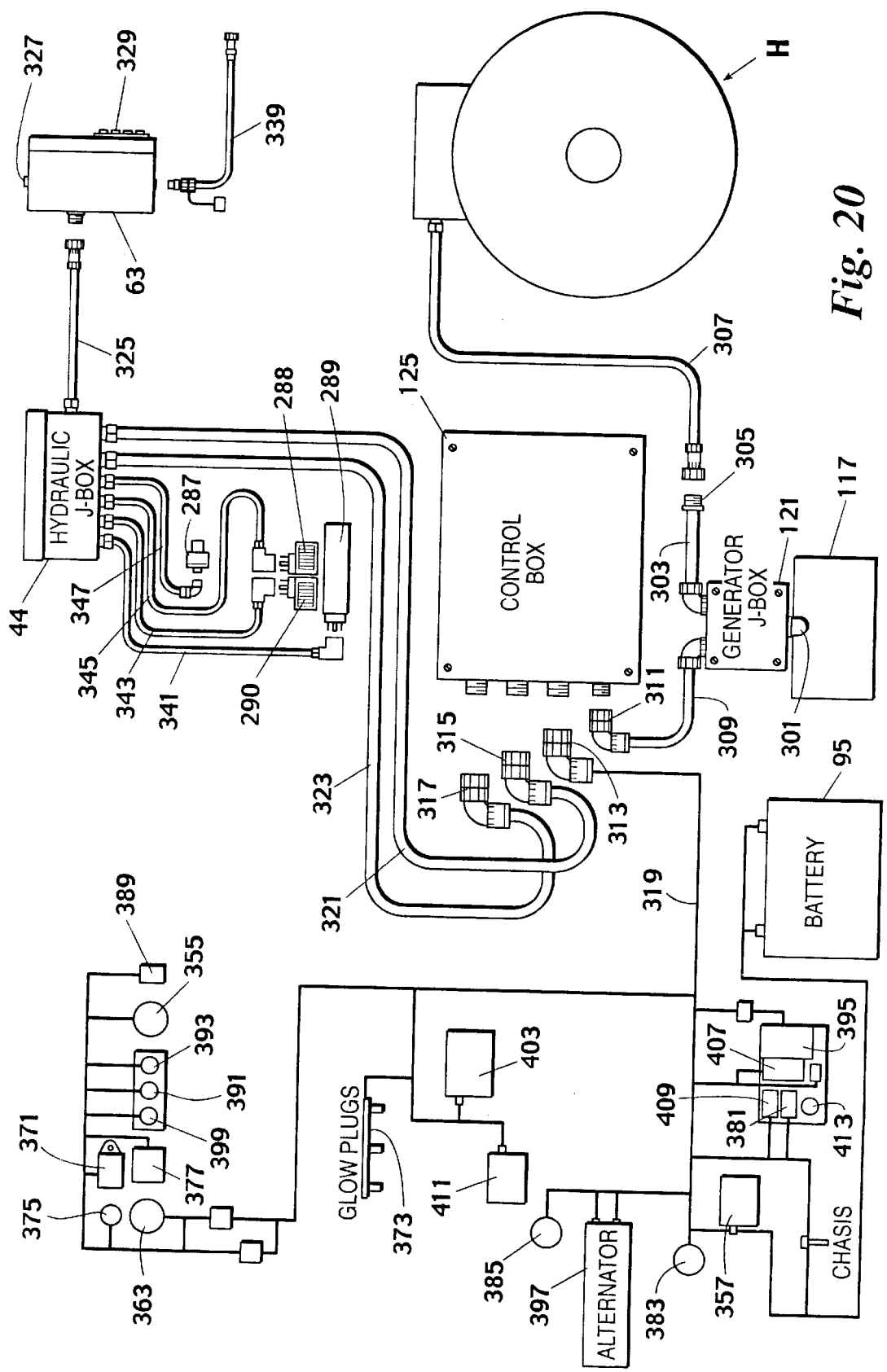
FIG. 20 is a schematic diagram illustrating the electrical system of the machine of FIG. 1.
Figure 21:
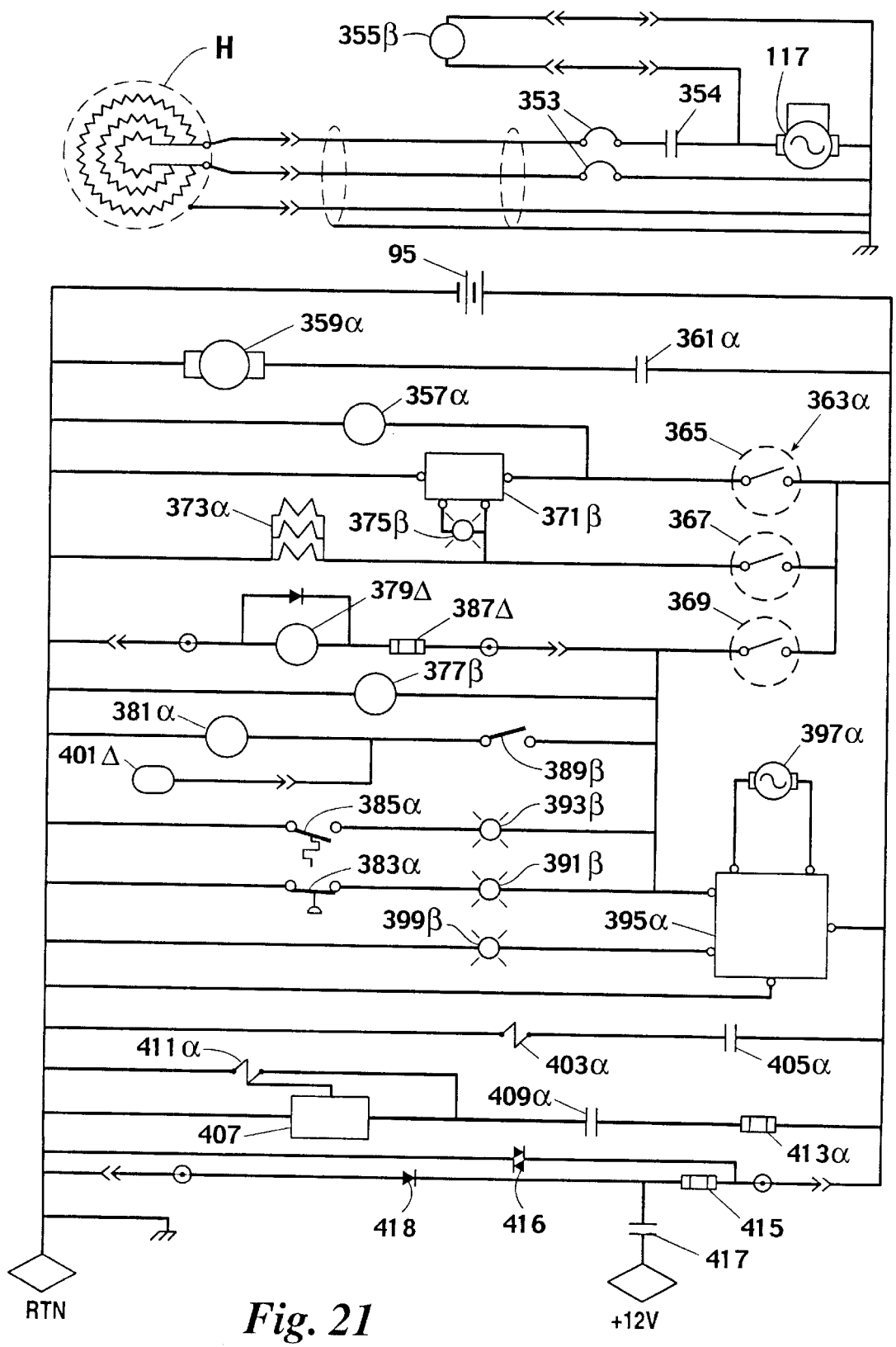
FIG. 21 is a schematic diagram illustrating a preferred embodiment of the portion of the electrical system of the machine of FIG. 1.

The heater H is shown in FIGS. 20 and 21 in block and schematic form. Typical heaters suitable for the purposes of this invention are described in greater detail in U.S. Pat. No. 3,846,208 entitled "Combination Pipe Fusion Unit" and U.S. Pat. No. 4,227,067 entitled "Heater Adapter for Making Polyethylene Pipe Connections." Looking at FIGS. 2 and 4, a frame 220 shown in FIG. 18A for supporting the heater bag (not shown) in which the heater H is stored is insertable in the space 227 between the front and rear fixed jaws 211 and 213 and is supported by the spacers 219 connecting the rear fixed jaw 213 to the front fixed jaw 211. The frame 220 consists of a pair of horizontal bag supports 229 integrally extending across a pair of parallel U-shaped base members 234. The parallel base members 234 and bag supports 229 are spaced apart by a pair of side plates 236. A pair of legs 238 of elongated W shape are pivotally connected to the plates 236 so as to be expandable into a broader base area for increased stability of the frame 220 on the ground. A pair of inverted U-brackets 242 are fixed to the plates 236 for seating on the spacers 219. The heater bag (not shown) has a collar into which the supports 229 are inserted as the bag is dropped into the frame 220 and the heater H rests on the top edge of the side plates 236.

HYDRAULIC SYSTEM

Figure 19:
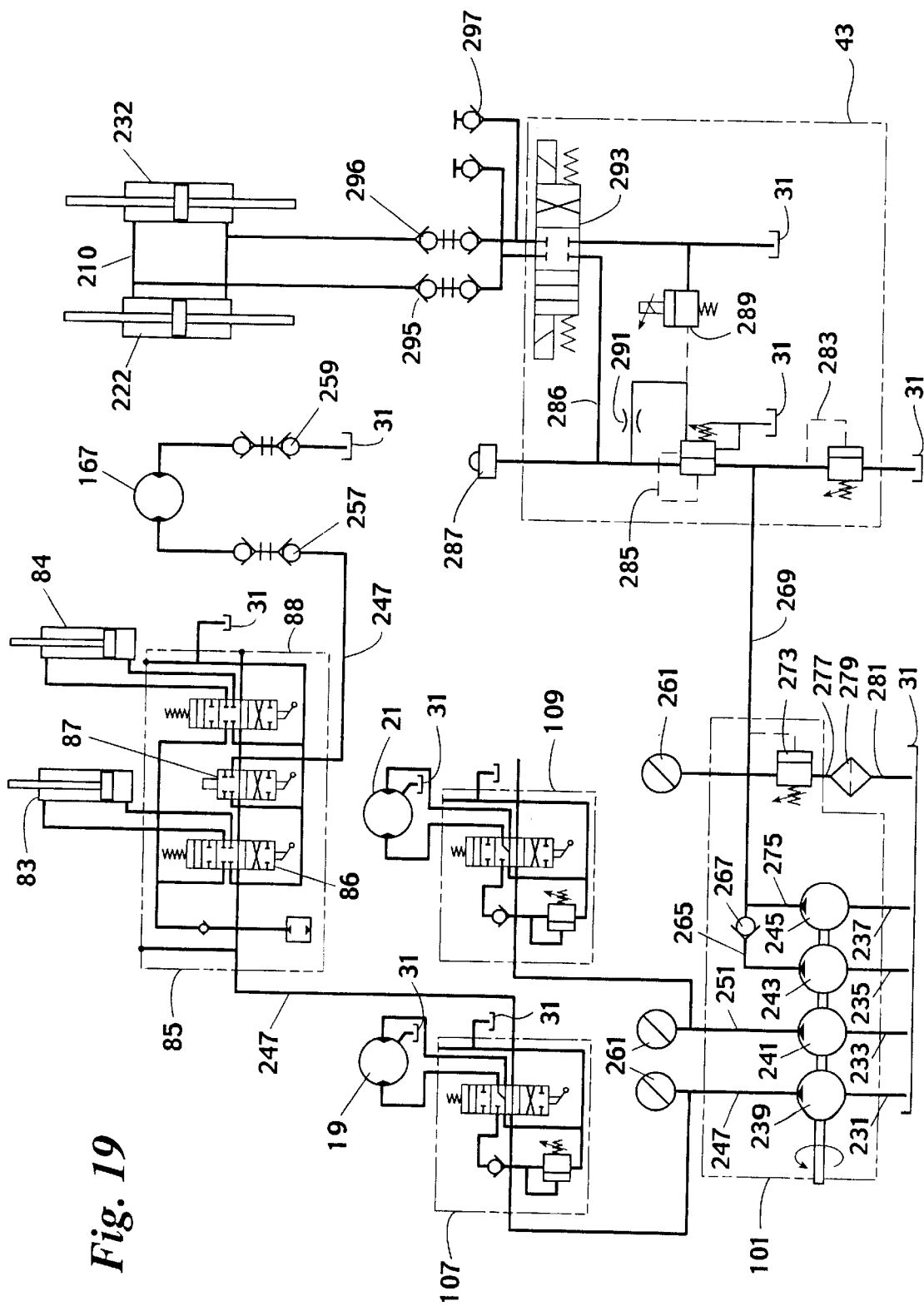
FIG. 19 is a schematic diagram illustrating a preferred embodiment of the hydraulic system of the machine of FIG. 1.

Turning to FIG. 19, the hydraulic system Y of the machine M is illustrated. Four lines 231, 233, 235 and 237 connect the left track section 239, the right track section 241, the high volume low pressure carriage section 243 and the low volume high pressure carriage section 245 of the quad gear pump 101, such as a CASAPPA PLP20, 8-03S1-LOC/OC/ 20.8-LOC/OC/20.4-LOC/BA/10.1-LOB/BA-S+VEP/ FC38GR.1-1, to the reservoir 31. The left track section 239 of the pump 101 is connected through a line 247 to the single spool monoblock valve with power beyond 107, such as a WALVOIL SD5/1-P(KG3)/28L/AE valve, which is in turn connected across the left track hydraulic drive motor 19. The right track section 241 of the pump 101 is connected by a line 251 to the single spool monoblock valve with no power beyond 109, such as a WALVOIL SD5/1-P(KG3)/28L/AET valve, which is in turn connected across the right track hydraulic drive motor 21. The valves 107 and 109 as well as the drive motors 19 and 21 are connected by return lines to the reservoir 31 to complete the continuous flow of hydraulic fluid when the left and right tracks 11 and 13 are being operated. The line 247 extending to the left track valve 107 is serially connected to the three spool monoblock valve 85, such as a WALVOIL SD5/3-P(SV)/18L/416L/18L/AET valve, which is in turn connected across the pipe lift cylinders 83 and 84 at the front and rear of the chassis C and the facer motor 167. The pipe lift valve 85 is also connected by a return line to the reservoir 31 so as to complete the path of hydraulic fluid flow when the left track 11 is not in use and the pipe lift cylinders 83 and 84 are being operated. The line 247 is also serially connected through the pipe lift valve 85 to a first quick disconnect 257. A second quick disconnect 259 is connected by a return line to the reservoir 31. The motor of the facer 167 is insertable between the quick disconnects 257 and 259 and hydraulic fluid will flow through the motor of the facer 167 to the return 31 to maintain continuous flow of the hydraulic system when the left track motor 19 and the pipe lifters 83 and 84 are not in use. The left and right track valves 107 and 109 permit the operator to choose forward or reverse rotation of the tracks 11 and 13, respectively. Looking at FIGS. 1 and 19, the left spool 86 of the pipe lift valve 85 controls the operation of the front pipe lift cylinder 83, the center spool 87 controls the operation of the facer 167 and the right spool 88 controls the operation of the rear pipe lift cylinder 84. As long as the engine 91 is running, hydraulic flow is continuous from the reservoir 31 through the left track pump section 239, the left track valve 107, the pipe lift valves 86 and 88, the facer valve 87 and back to the reservoir 31, as well as through the right track pump section 241 through the right track valve 109 and back to the reservoir 31. Pressure gauges 261 and 263 are connected in the left and right track pump section lines 247 and 251 for use in setting up the system for operation. The high volume low pressure carriage section 243 of the pump 101 is connected by a line 265 through a check valve 267 and another line 269 to the carriage control manifold 43. The line 265 leading into the check valve 267 is also connected to an unloading valve 273. The low volume high pressure carriage section 245 of the pump 101 is also connected to the unloading valve 273 and to the input line 269 by a line 275. The unloading valve 273 is thence connected by an outlet line 277 to a filter unit 279 and thence by a line 281 back to the reservoir 31. In the operation of this part of the system Y, if the carriage 210 of the moving jaws 207 and 209 is idle, the hydraulic system Y maintains a constant pressure on the carriage control manifold 43. When the pump 101 comes up to pressure, the unloading valve 273 passes the high volume path oil back to the reservoir 31 through the filter 279. The low volume section 245 of the pump then maintains the pressure on the manifold 43 and seats the check valve 267. Looking at the carriage control manifold 43, a high pressure relief valve 283 connects the input line 269 to the reservoir 31. The input line 269 also extends through a pressure reducing valve 285, such as a Sun PVDB-LAN, to a pressure transducer 287, such as a SQD PTA6093. A servo valve 289, such as a FEMA 85820 PPC valve, is responsive to a DC current derived from the pressure transducer 287 to meter the flow of oil back to the reservoir 31 and controls the pressure reducing valve 285 which controls the pressure applied to the carriage 210. The manifold reduced pressure outlet line 286 is then connected to a directional control valve 293 with a return to the reservoir 31. A directional control valve 293 is connected to quick disconnects 295 and 296, to and from which the carriage cylinders 222 and 232 may be readily connected and disconnected by quick disconnect 297 for removal or reversal of the carriage jaw assembly J from or on the machine M.

ELECTRICAL SYSTEM

The electrical system E of the machine M is illustrated in block form in FIG. 20. The generator 117 is connected by a cable 301 to the generator junction box 121. From the junction box 121, another cable 303 extends to one side of a connector 305. The other side of the connector 305 is connected by a cable 307 to the heater H. The junction box 121 is also connected by another cable 309 through a connector 311 to the main electrical control box 125. Three other connectors 313, 315 and 317 are also mounted on the control box 125. One connector 313 connects a cable 319 which extends to the engine 91 and the engine instrument panel at the operator's station 111 for connection of a multitude of electrical components which will be denoted hereinafter in the electrical schematic diagrams of FIGS. 21–24 by the symbol a if they are on the engine 91 and by the symbol β if they are on the instrument panel at the operator's station 111. The control box 125 is connected through the other two connectors 315 and 317 by cables 321 and 323, respectively, to the hydraulics junction box 44. The hydraulics junction box 44 is in turn connected by a cable 325 to the operator pendant 63. As seen in FIGS. 1 and 20, externally, the operator pendant 63 has an emergency stop switch 327, a key pad 329, two toggle switches 331 and 333, a rotary encoder 335 and an LCD display 337. The operator pendant 63 is also adapted for connection by a cable 339 to an external peripheral device such as a printer (not shown). Internally, the operator pendant 63 houses a variety of electrical components which will be identified hereafter in the electrical schematic diagrams of FIGS. 21–24 by the symbol y. The hydraulic junction box 44 is also connected by four separate cables 341, 343, 345 and 347 to the carriage pressure control valve 289, two carriage control valve solenoids 288 and 290 and the carriage pressure transducer 287, respectively. The internal components of the control box 125 are identified hereafter in the electrical schematic diagrams of FIGS. 21–24 by the symbol Δ.

The controls for the engine 91 are illustrated in the electrical schematic diagram of FIG. 21. The generator 117 is connected through a protection device such as a breaker 353 and a normally open contact 354 of a heater control relay 356 to the heater H and back to the generator 117. The voltage across the generator 117 is indicated by a voltmeter 355. The system battery 95 is preferably a 12 volt lead/acid battery. The starter motor 359 is connected across the battery 95 through another normally open starter solenoid relay contact 361. The starter solenoid relay 357 is connected across the battery 95 through a four-way key switch 363 which has start, glow plug, off and run positions. The switch contacts 365, 367 and 369 illustrate which switch contacts close in the start, glow plug and run positions. When the key switch 363 is in the start position, the circuit to the starter solenoid relay coil 357 is closed and the contact 361 connecting the starter motor 359 closes. The glow plug timer 371 is also connected across the battery 95 by the key switch 363 in the start position. The glow plug 373 is connected across the battery 95 by the key switch 363 in the glow plug position and a glow lamp 375 indicates the status of the glow plug 373. An hour meter 377 is connected across the battery 95 when the key switch 363 is closed in the start, run and glow plug positions. When the glow lamp 375 is out, the key switch 363 can be turned from the glow plug position to the start position. The start, run and glow plug positions of the key switch 363 also connect a control circuit relay coil 379, a throttle relay coil 381, an oil pressure switch 383 and a water temperature switch 385 across the battery 95. The control circuit relay coil 379 is protected by a fuse 387. The operation of the throttle relay coil 381 is controlled by a throttle speed switch 389. The oil pressure switch 383 and water temperature switch 385 are each series connected with indicating lights 391 and 393, respectively. The control circuit relay coil 379, throttle relay coil 381, oil pressure switch 383 and water temperature switch 385 are also connected across the battery 95 along with a voltage regulator 395 and alternator 397. A charge indicator light 399 connected between the regulator 395 and the battery return line indicates when charging is taking place. The throttle speed switch 389 is open for low speed operation and closed for high speed operation. An input terminal of a microprocessor 401 in the main electrical control box 125 detects the position of the throttle speed switch 389. A throttle speed solenoid 403 having pull in and holding currents is connected across the battery 95 by a contact 405 of the throttle relay coil 381. A timer 407 connected across the battery 95 by a contact 409 of the fuel shut-off relay 467 applies an approximately 40 amp pull in current and then an approximately 0.8 amp holding current to a fuel shut off solenoid 411 connected across the timer 407. A fuse 413 protects this circuit. Thus, the engine 91 can be shut off by operation of the key switch 363 to open the starter solenoid contact 409 or by the operation of the fuel shut off solenoid 411 resulting in cutting off the fuel supply to the engine 91. The remainder of the control circuit is protected by a fuse 415 and a contact 417 of the control circuit relay coil 379 which are series connected to the positive terminal of the battery 95 as well as by the surge suppressor 416 and the reverse voltage protection diode 418.

Figure 22:
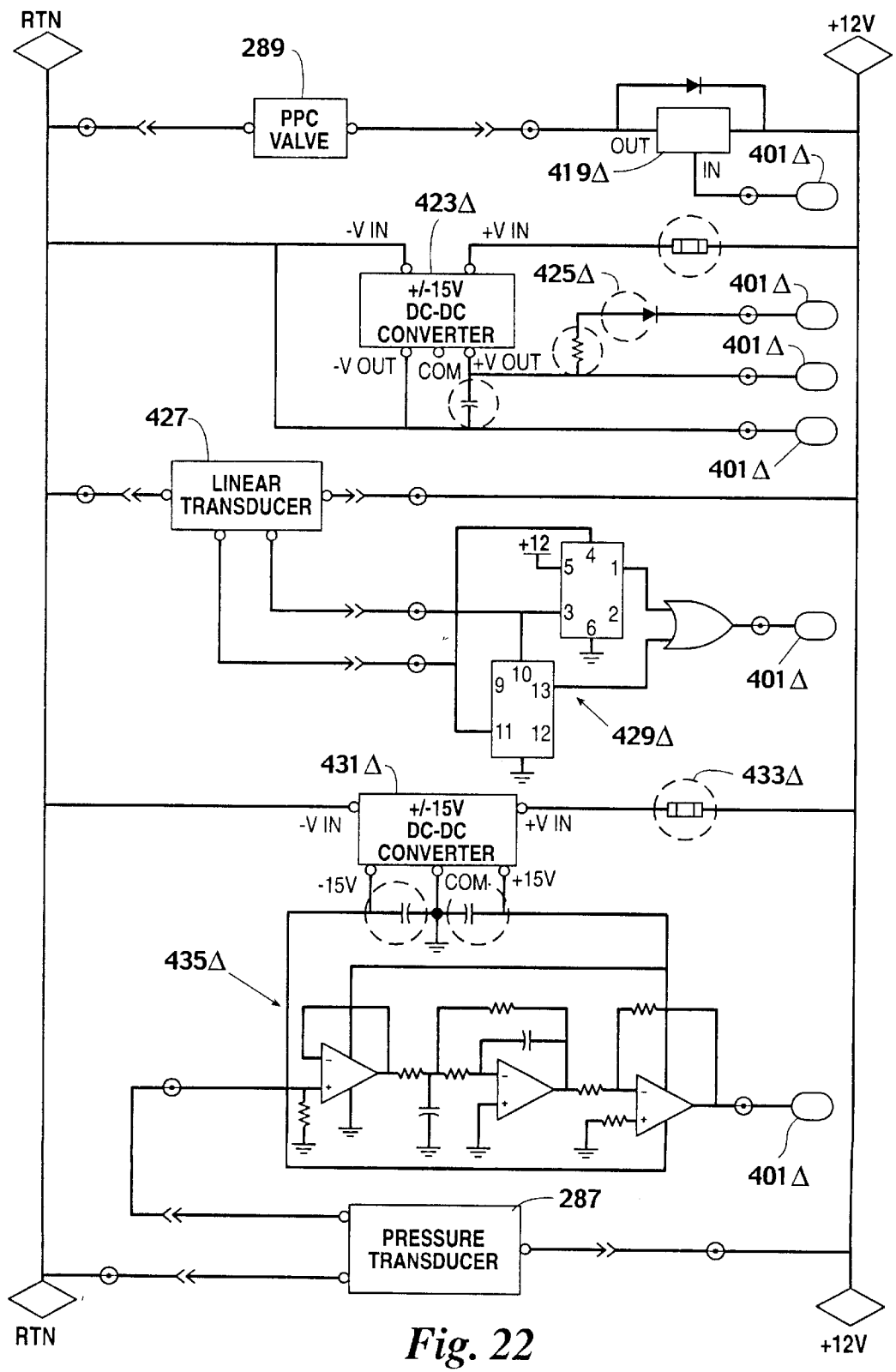
FIG. 22 is a schematic diagram illustrating a preferred embodiment of the portion of the electrical system of the machine of FIG. 1.

The hydraulic system controls are illustrated in FIG. 22. The FEMA PPC servo valve 289 is connected across the battery 95 through a current control device 419 located in the main electrical control box 125. The device 419 is also connected to the control box microprocessor 401 which provides a control voltage to the device 419 indicative of the pressure desired at the carriage 210, as is hereinafter explained. The output of the carriage pressure transducer 287 is compared with the voltage desired to determine when the desired pressure is obtained. The voltage applied to the current control device 419 by the microprocessor 401 is selected by use of the encoder 335 in the operator pendant 63 as will hereinafter be explained. A +/−12 volt dc-dc converter 423 converts 12 volts to 24 volts to power the devices contained in the main electrical control box 125. The converter 423 is connected to a plus 24 volt terminal and a ground terminal of the control box microprocessor 401 and also through an LED 425 which indicates when power to the control box microprocessor 401 is on. For reasons to be hereafter explained, the hydraulic control system Y may also include a linear transducer 427 connected across the battery 95 and mounted on the jaw assembly carriage 210 to measure the travel distance of the carriage 210 if the machine M is operated in an automatic mode. A digital converter 429 counts the transducer pulses to determine the relative position of the carriage 210 on its travel path and provides a signal to the control box microprocessor 401 usable to determine when to stop and start the carriage 210 and how far the carriage 210 is to move. A +/−15 volt dc/dc converter 431 is also connected across the battery 95 through a protective fuse 433. The converter 431 powers a low pass filter 435 which provides a signal derived from the output of the carriage pressure transducer 287 which is connected across the battery 95 to a terminal of the control box microprocessor 401.

Figure 23:
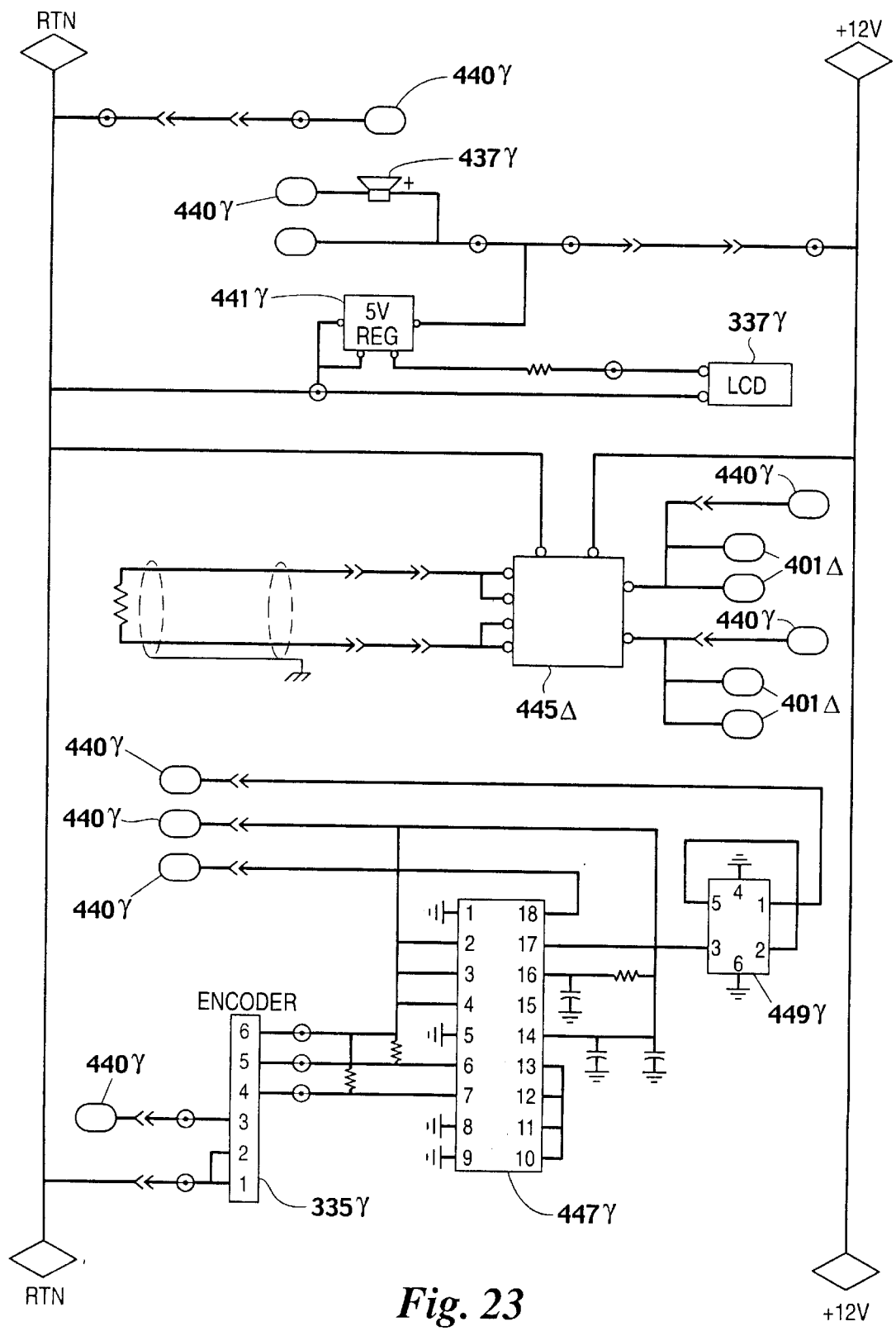
FIG. 23 is a schematic diagram illustrating a preferred embodiment of the portion of the electrical system of the machine of FIG. 1.

Continuing on to FIG. 23, an audio alert device 437 mounted in the operator pendant 63 is connected between terminals in a microprocessor 440 in the operator pendant 63 and to the positive side of the battery 95. One terminal of the microprocessor 440 is also connected to the battery return or ground. A 5 volt regulator 441 serving the back light of the LCD 337 in the operator pendant 63 is also connected across the battery 95. An RTD module 445 is connected across the battery 95 and to several contacts in the control box microprocessor 401 and the operator pendant microprocessor 440. The module 445 senses the temperature in the heater H and provides signals to the microprocessors 401 and 440 as is hereafter explained. The return line of the battery 95 is also connected to the rotary encoder 335 with the output terminal of the encoder 335 being connected to the operator pendant microprocessor 440. The encoder 335 is connected to the integrated circuit decoder chip 447. The decoder chip 447 has an output to a port of the operator pendant microprocessor 440. It also has an output which extends through a flip-flop switch 449 to another port of the operator pendant microprocessor 440. Finally, an output of the encoder 335 is connected with an output of the decoder chip 447 to another port of the operator pendant microprocessor 440. The encoder 335 is toggled to select a desired carriage operating pressure at which the encoder 335 is to be set.

Figure 24:
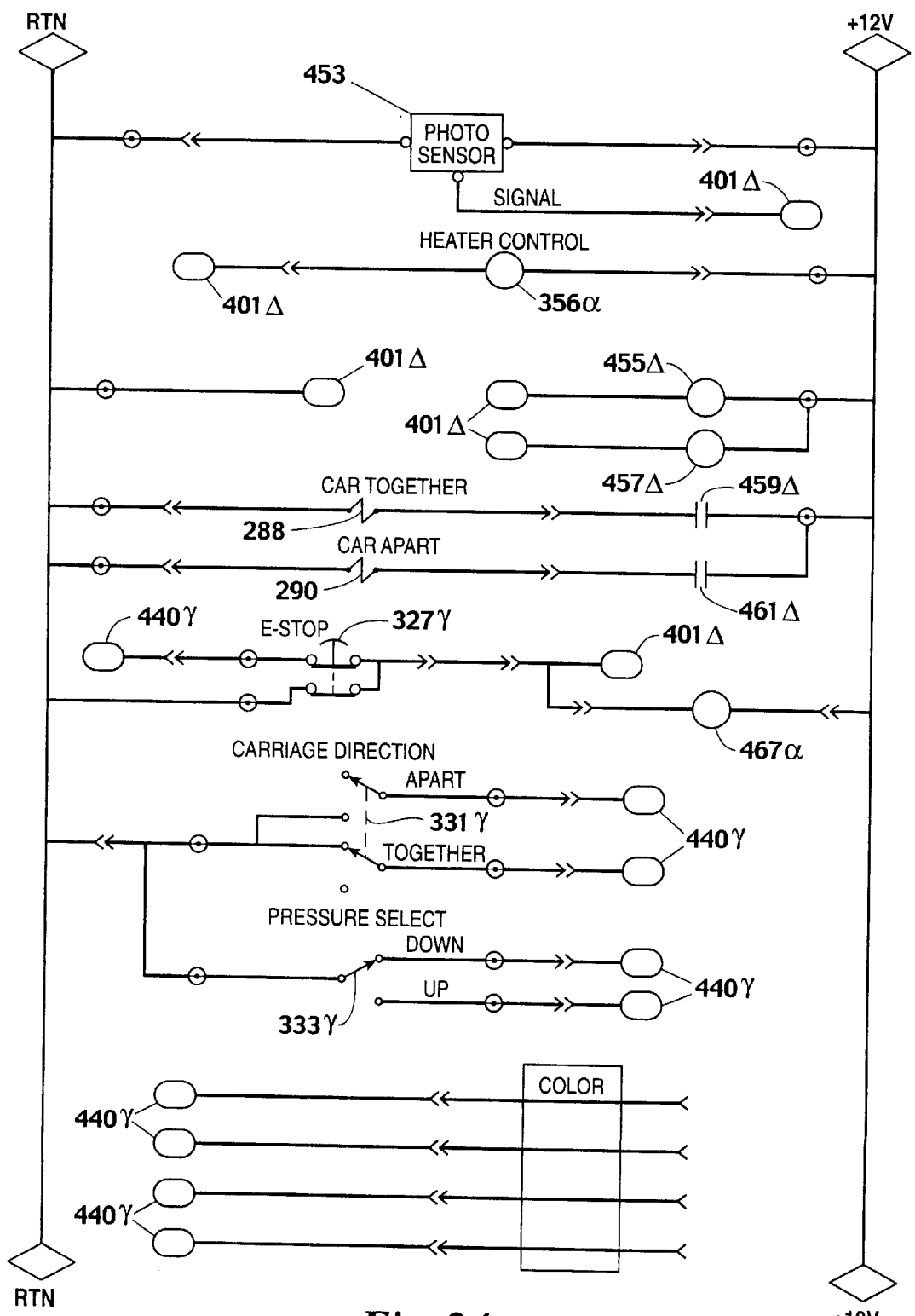
FIG. 24 is a schematic diagram illustrating a preferred embodiment of the portion of the electrical system of the machine of FIG. 1.

Looking now at FIG. 24, the control system E may also include a photo sensor 453 connected across the battery 95 to determine whether the heater H, the facer 167 or any other object has been inserted into the path of the carriage 210. The photo sensor 453 provides a signal to the control box microprocessor 401 to indicate the presence of such an object. The heater control relay 356 is connected between a port of the control box microprocessor 401 and the positive side of the battery 95. A pair of relay coils 455 and 457 are connected between the positive side of the battery 95 and a pair of ports at the control box microprocessor 401. The contacts 459 and 461 connect carriage together and carriage apart solenoids 288 and 290, respectively, across the battery 95. The right toggle switch 331 on the operator pendant 63 is connected between the battery return line and two inputs to the operator pendant microprocessor 440. When the toggle switch 331 is flipped to the "apart" position, the carriage apart relay coil 457 causes its contact 461 to close and the carriage 210 will move for its full travel distance or until the operator O moves the toggle switch 331 or the microprocessor 440 automatically stops movement of the carriage 210. When the toggle switch 331 is in the "together" position, the carriage together coil 455 closes its contact 459 to cause the carriage 210 to move in a closing direction, again until either the operator O or the microprocessor 440 terminates motion. The left toggle switch 333 of the operator pendant 63 is also connected between the battery return line and inputs to the operator pendant microprocessor 440. The left toggle switch 333 is the pressure select switch enabling the operator O to control the pressure applied to the carriage 210 at various stages of operation of the machine M. The signal at the ports of the operator pendant microprocessor 440 are delivered to the FEMA PPC valve 289 via the control box microprocessor 401. Serial ports are also provided in the operator pendant microprocessor 440 for program downloading or report downloading via the cable 339 to the operator pendant 63. Finally, the emergency stop switch 327 connects the engine kill relay coil 467 across the battery 95 and also connects ports on the operator pendant microprocessor 440 and the control box microprocessor 401. The engine kill relay 467 is energized when the key switch 363 is on.

SOFTWARE

The control system of the machine M includes three computer units. All operation and user interface controls reside in the main or operator pendant microprocessor 440 which is preferably a Z-World BL 1600 with 512K battery-backed SRAM and 512K EPROM. The control box microprocessor 401, preferably a Z-world PK2120 with 32K battery-backed SRAM and 32K EPROM, is physically connected to input and outputs of the machine M. It is responsible for reading inputs, including pressure transducer and digital inputs, and writing digital and analog pressure control valve outputs. The RTD module 445, preferably a Dataforth SCM9B-1412, is responsible for acquiring heater temperature readings. These three computers 440, 401 and 445 are connected to a two-wire RS-485 communications network. The operator pendant microprocessor 440 sends commands in ASCII format and polls the control box microprocessor 401 and the RTD module 445 via a half-duplex protocol.

The software of the machine M permits selection of any of three operational modes for the machine M including a semi-automatic mode, an automatic mode and a data logging mode. Preferably, the latter modes are enabled only upon entry of an enabling password. Typically, the pipe welding process requires application of at least three different pressures to the pipe. The first is the facing pressure P1 which the carriage 210 must exert in holding the pipe ends against the facer 167 to trim the pipe ends to be welded. The second is the soak pressure P2 which the carriage 210 must exert in holding the faced pipe ends against the heater H to bring them to a molten condition. The third is the fuse pressure P3 that must be exerted by the carriage 210 in holding the molten pipe ends together during the fusion process. In some applications, it is also necessary to apply a unique heat pressure P4 greater than the soak pressure P2 which the carriage 210 will exert on the faced pipe ends at the initiation of the heat cycle and a cool pressure P5 less than the facing pressure P3 which the carriage 210 will exert on the faced pipes.

The control box microprocessor 401 and the operator pendant microprocessor 440 are operational whenever the key switch 363 is in the glow plug, start or run positions. In the semi-automatic mode, the LCD 337 displays the screen 501 shown in FIG. 25 on the operator pendant LCD 337. The screen 501 includes a timer status 502, a date 503, real time in hours, minutes and seconds 504, a pressure display definition prompt 505, a pressure calculation prompt 506, a direct pressure set prompt 507, a programmed pressure selection indicator 508, a label toggle switch 509, a menu 510, the desired temperature 511 of the heater H, a pressure adjustment knob or encoder dial lock indicator 512, a real time carriage pressure monitor 513, a carriage control direction indicator 514 and a heater temperature indicator 515. The timer 502 allows the operator O to time all or a portion of the pipe fusing process and is reset by a single press of the "O" key on the keyboard 329. The pressure display definition prompt 505 allows any of a number of pressures up to six to be displayed for selection. The pressure calculation prompt 506 permits calculation of the recommended fusion pressure, including drag pressure, and assignment of that pressure to any one of the six displayed pressure selection positions 508. The direct pressure set prompt 507 allows the operator to enter or type in the desired pressure using the keypad 329. The operator O can also change the carriage pressure by depressing the rotary encoder knob 335 to unlock the dial and then rotating the encoder dial. The pressure adjustment knob lock indicator 512 indicates by the symbol "X" that the pressure cannot be varied. The symbol "X" is removed when the rotary encoder pressure adjustment knob 335 is depressed. The pressure selector toggle switch 333 allows the operator to select among the preprogrammed pressures 508. The real time carriage pressure readout 513 constantly advises the operator of the carriage pressure in real time. The desired heater temperature 511 allows the operator O to key in the desired operating temperature of the heater H and commands the operator pendant microprocessor 440 to set and maintain that temperature through the heater temperature control components. The heater temperature readout 515 allows the operator to observe the heater temperature in real time. The on screen pressure and temperature readouts 513 and 515 eliminate the need for conventional pressure and temperature gauges. The carriage direction indicator 514 enables the operator O to reverse the carriage control direction by use of two key strokes, the position of the arrow indicating the status of the carriage direction. The label toggle switch 509 provides visual indication as to the identity of the pressure selected. For example, P1 may be indicated as the "facing" pressure, P2 as the "soak" pressure and P3 as the "fuse" pressure. The menu 510 allows the operator O to access the other modes of operation of the machine M including the automatic mode and the data logging mode.

Figure 26:
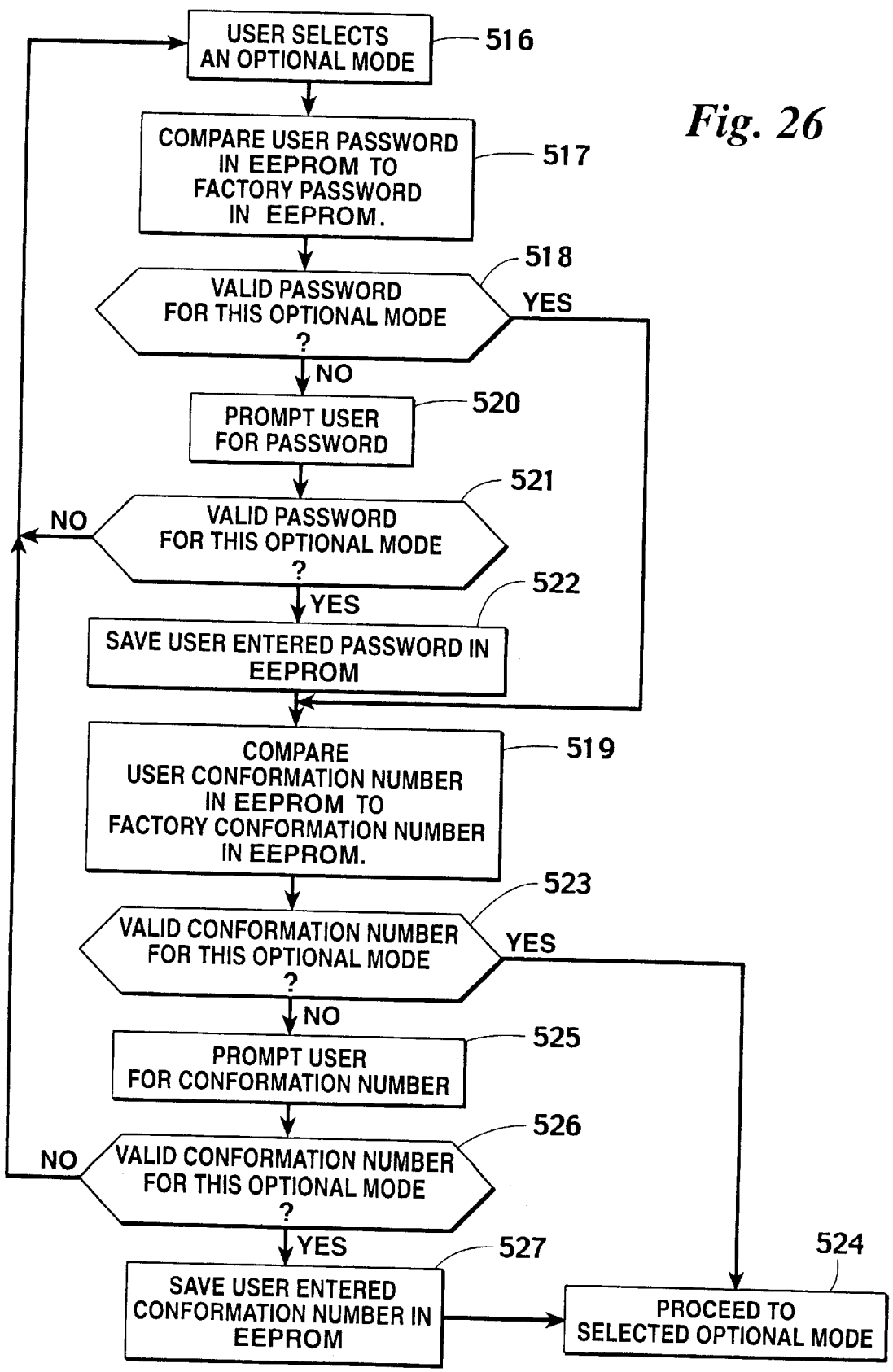
FIG. 26 is a flow diagram illustrating the enabling and accessing procedures for optional data logging and automatic modes of the machine of FIG. 1.

The flow diagram for enabling and accessing the optional data logging and automatic modes is shown in FIG. 26. After the operator uses the menu 510 to "select-an-optional-mode" 516, the system "compares the user password in EEPROM to the factory password in EEPROM" 517. The system then inquires if this is the "valid password for this optional mode" 518. If the answer to this inquiry is "YES", the system "compares user confirmation number in EEPROM to factory confirmation number in EEPROM" 519. If the answer to the inquiry 518 is "NO", then the system "prompts the user for password" 525. If the user types in a "valid password for this operational mode" 521, then the system "saves user entered password in EEPROM" 522 and "compares user confirmation number in EEPROM to factory confirmation number in EEPROM" 519. Otherwise, the system returns to "user selects an optional mode" 516. After the system "compares user confirmation number in EEPROM to factory confirmation number in EEPROM" 519, the system inquires if this is the "valid confirmation number for this optional mode" 523. If the answer to this inquiry is "YES", the system "proceeds to selected optional mode" 524. If the answer to the inquiry 523 is "NO", then the system "prompts the user for confirmation number 525. If the user types in a "valid confirmation number for this operational mode" 526, then the system "saves user entered confirmation number in EEPROM" 527 and "proceeds to optional mode" 524.

Thus, the owner of a machine M can enable and disable the optional data logging and automatic modes by entering factory programmed passwords into the system. Each of these modes has its own unique password and no two machines or modes would have similar passwords. The passwords cannot be modified in the field as they are factory installed. The first time an optional data logging or automatic mode is selected from the main menu 510, the machine owner will be prompted for a password and a confirmation number. If the correct password and confirmation number are entered, the optional mode will be enabled as explained above for subsequent use without any re-entry of the password. Once so enabled, the optional mode for which the password has been entered cannot be disabled by turning off the machine M. To disable an optional mode, the machine owner must enter the enabling password into the system. The same password is thus usable to enable and disable a machine M.

Figure 27:
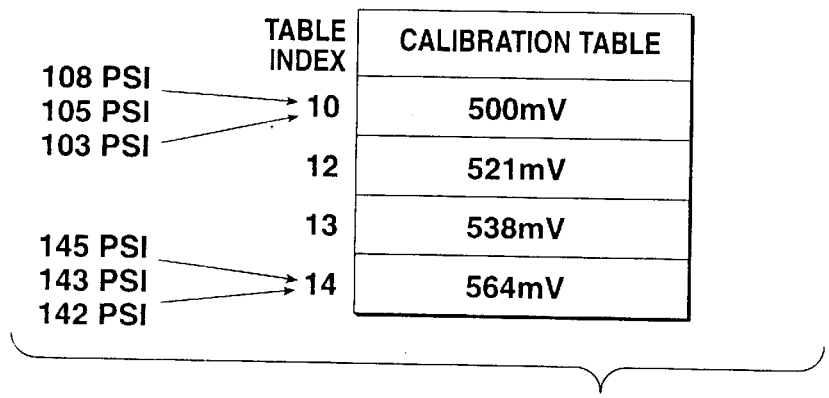
FIG. 27 is a graphic representation of a microprocessor calibration array for the machine of FIG. 1.
Figure 28:
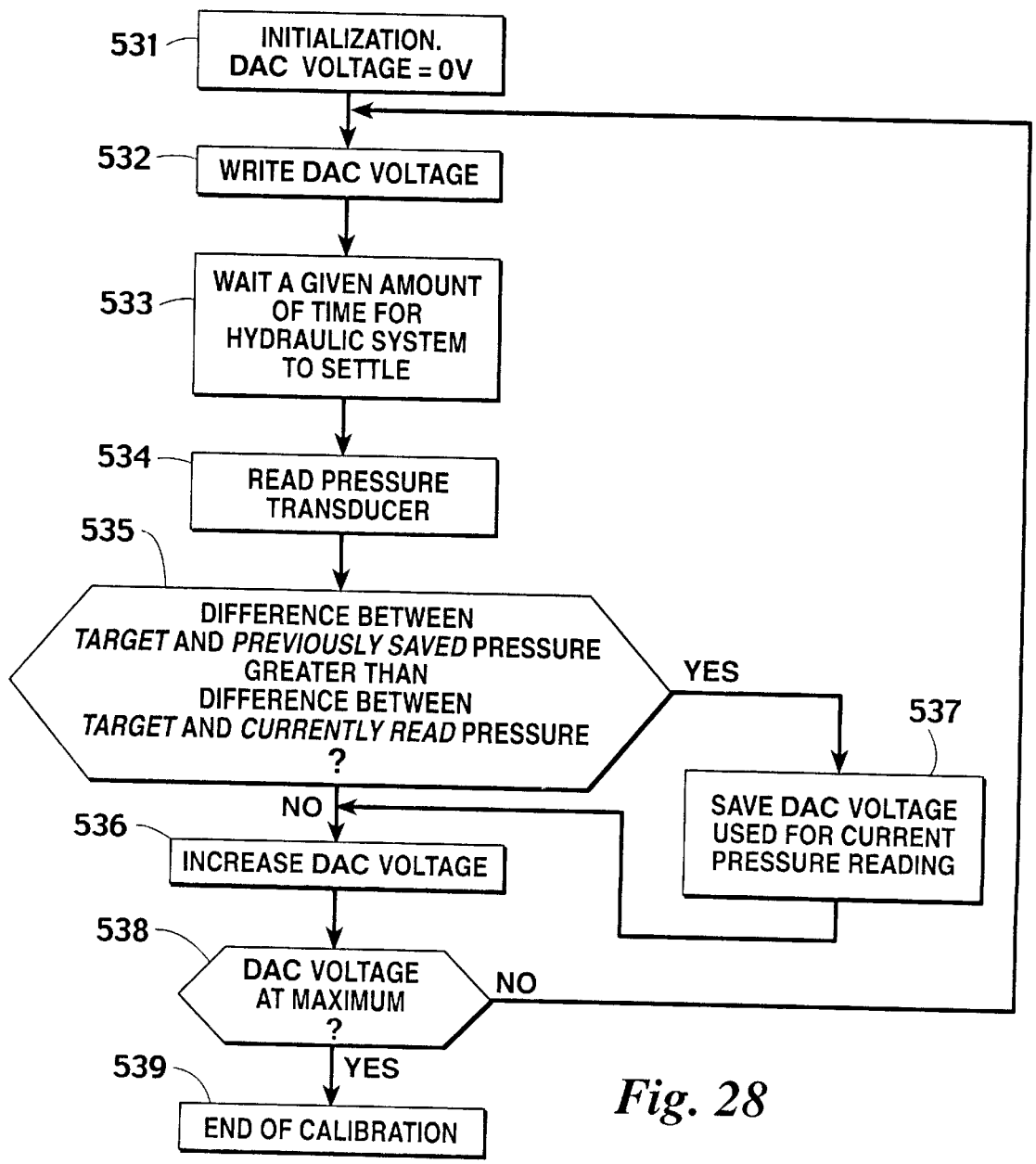
FIG. 28 is a flow diagram for the pressure calibration process for the machine of FIG. 1.

Each machine M has a unique pressure calibration table which is maintained in battery backed SRAM for instant access. The calibration table contains digital to analog converter DAC voltages required to produce desired pressure readings at the transducer 287. When a certain pressure is required at the carriage 210, the software looks up the corresponding DAC voltage and sends it to the pressure control valve 289. The calibration table contains two subtables, one for DAC voltages used for stepping to a higher pressure than the current pressure level and one for stepping to a lower pressure than the current pressure level. Calibration is accomplished by writing a DAC voltage and waiting for a time interval to read the pressure transducer 287. The voltage is then increased by a given increment and the process repeated until the maximum pressure or DAC voltage is obtained. During calibration, the software attempts to find the most ideal DAC voltages that produce the pressure readings closest to their targets. The pressure increments will be determined by the resolution of the digital to analog converter and the accuracy of the pressure transducer 287. The DAC voltage increment is chosen to produce a sufficient pressure transducer resolution for the software to build the calibration table. Increments of 20 psi have been found to be suitable. The calibration subtables are represented by two arrays and the number of array elements is equal to the maximum system pressure transducer reading divided by the pressure increments. For example, if the maximum system pressure is 2,000 psi and the pressure increments are 20 psi, there will be 100 elements in each array. During calibration, the software reads the pressure transducer 287 to determine the array element at which the DAC value is to be saved. The index to the array element is determined by dividing the pressure transducer reading by the pressure increment. A typical array is illustrated in FIG. 27. In the array illustrated and assuming 10 psi increments, at 500 millivolts a range of pressures from 103 to 108 psi resulted, giving a table index of 10, while at 564 millivolts a range of pressures from 142 to 145 psi was obtained, providing a table index of 14. The flow diagram for pressure calibration is provided in FIG. 28. At "initialization" 531, the DAC voltage equals zero volts. The system "writes the DAC voltage" 532 and "waits a given amount of time for hydraulic system to settle" 533. The pressure transducer 287 is then "read" 534 and the system inquires as to whether "difference between target and previously saved pressure is greater than difference between target and currently read pressure" 535. If the answer is "NO", then the DAC voltage is "increased" 536. If the answer to the inquiry is "YES", then the DAC voltage is "saved and used for current pressure reading" 537 before proceeding to an "increase of the DAC voltage" 536. After "increasing the DAC voltage" 536 the system inquires as to whether the "DAC voltage is at a maximum" 538. If the response to this inquiry is "YES", this is the "end of calibration". If the answer to the inquiry is "NO", then the system returns to the step of "writing the DAC voltage" 532.

The operator pendant microprocessor 440 continuously monitors the pressure adjustment knob of the encoder 335. If the operator O turns the pressure adjustment knob 335, the software reads its position and computes an offset into the calibration table to locate a DAC voltage. This voltage is written to the pressure control valve 289 and the reading of the pressure transducer 287 is displayed giving real time pressure readings to the operator O at the pressure monitor position 513 on the display screen 501. The pressure adjustment knob 335 allows the operator O to increase the pressure in small increments. However, the operator O may key in a desired pressure for large changes. The calibration table also permits an on demand pressure setting feature which allows the operator O to recall a stored pressure setting instantly.

Figure 29:
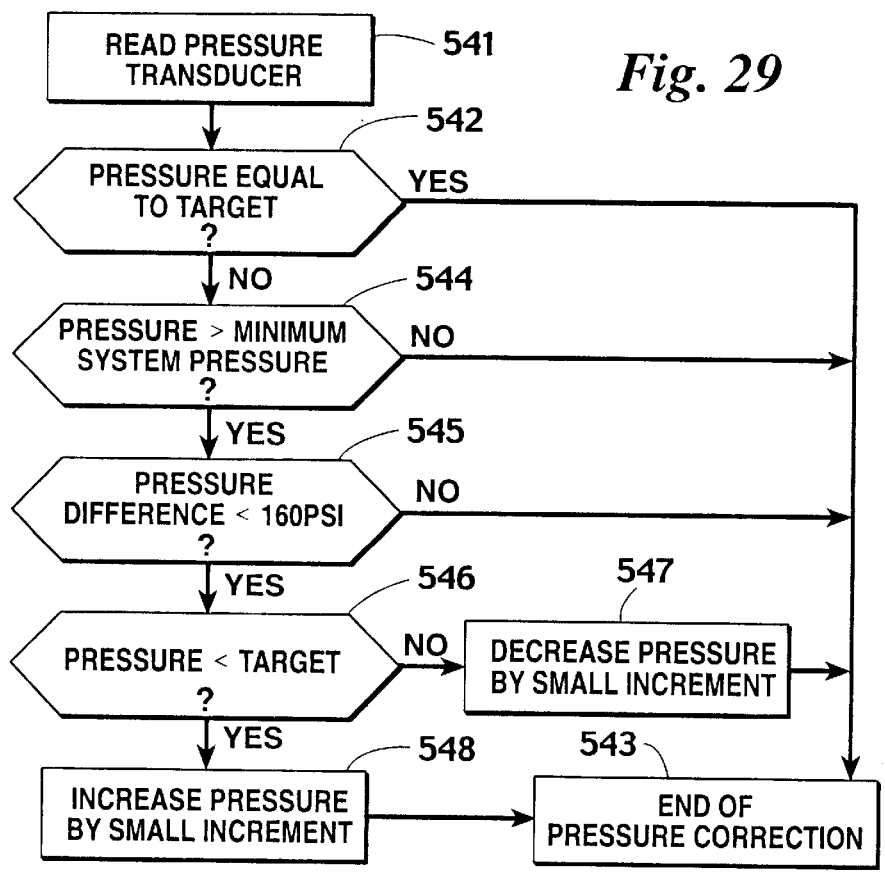
FIG. 29 is a flow diagram illustrating the automatic pressure control operation of the microprocessor of the machine of FIG. 1.

During operation of a machine M from an hydraulic fluid temperature at a cold start condition through increased fluid temperatures due to system warm up or other factors, the preset hydraulic pressure may change. In order to maintain constant pressure on the carriage 210, the operator pendant microprocessor 440 monitors the pressure transducer 287 and makes corrections at given intervals. The reading of the pressure transducer 287 is compared to the target setting and as the difference in pressure warrants a correction, the microprocessor 440 makes incremental corrections of sufficient magnitude to prevent large pressure fluctuations that would contribute to oscillation. This automatic pressure control operation of the microprocessor 440 is illustrated in the flow diagram of FIG. 29. The pressure transducer 287 is "read" 541 and then inquiry is made as to whether the "pressure is equal to the target" 542. If the answer to this inquiry is "YES", the system proceeds directly to the "end of pressure correction" 543. If the answer to this inquiry is "NO", the system next inquires as to whether the "pressure is greater than the minimum system pressure" 544. If the answer to this inquiry is "NO", the system again proceeds to the "end of pressure correction" 543. If the answer to this inquiry is "YES", the system proceeds to inquire as to whether the "pressure difference is less than 160 psi" 545. If the answer to this inquiry is "NO", the system again proceeds to the "end of pressure correction" 543. If the answer to this inquiry is "YES", the system proceeds to inquire as to whether the "pressure is less than the target" 546. If the answer to this inquiry is "NO", the system proceeds to "decrease the pressure by small increment 547 and then proceeds to the "end of pressure correction" 543. If the answer to this inquiry is "YES", the system proceeds to "increase the pressure by small increment 548 and again proceeds to the "end of pressure correction" 543.

Referring again to FIG. 25, the operator pendant microprocessor 440 allows the operator O to input six pressures either by dialing in the pressure using the pressure adjustment knob 335, by entering the pressure directly by using the keypad 329 or by using the calculator 506 to compute a recommended pressure. Furthermore, the operator O may assign the six pressures for different functions by putting them in order at the programmed pressure selector display 508, for example in the order necessary to face, heat, soak, fuse and cool in the welding process. To access the desired pressure, the operator O simply shifts the pressure or left toggle switch 333 upwards or downwards to go from one pressure setting to the next. Furthermore, the operator O can label each of these pressures by use of the toggle switch label display 509. The reversal of the carriage directional control switch 331 by use of the two key press operation of the carriage direction indicator 514, enables the operator O to use the operator pendant 63 on either side of the carriage without disorientation.

By entering the desired heater temperature at the desired heater temperature display 511 by use of the keypad 329, the operator O allows the microprocessor 440 to set and maintain the correct heater temperature. The operator pendant microprocessor 440 monitors the heater temperature RTD 445 continuously and turns on the elements of the heater H when the temperature falls below the set point and turns off the elements when the temperature rises above the set point.

Preferably, the operator pendant key pad 329 is multifunctional in that all of the keys can be assigned for multiple functions under program control depending on the context of the operation. For example, while the numeric keys are used to enter numbers in most cases, they may also be used to access menu items when a menu is presented to the operator O.

The operator O may use the calculator 506 to determine the heat, soak, fuse and cool pressures to use in the system operation. The calculator will compute the pressure if the operator O inputs data with respect to pipe diameter and thickness, inter facial pressure and drag pressure. Use of the calculator of the microprocessor 440 for this purpose is more accurate than nomographic determination of these pressures.

Figure 30:
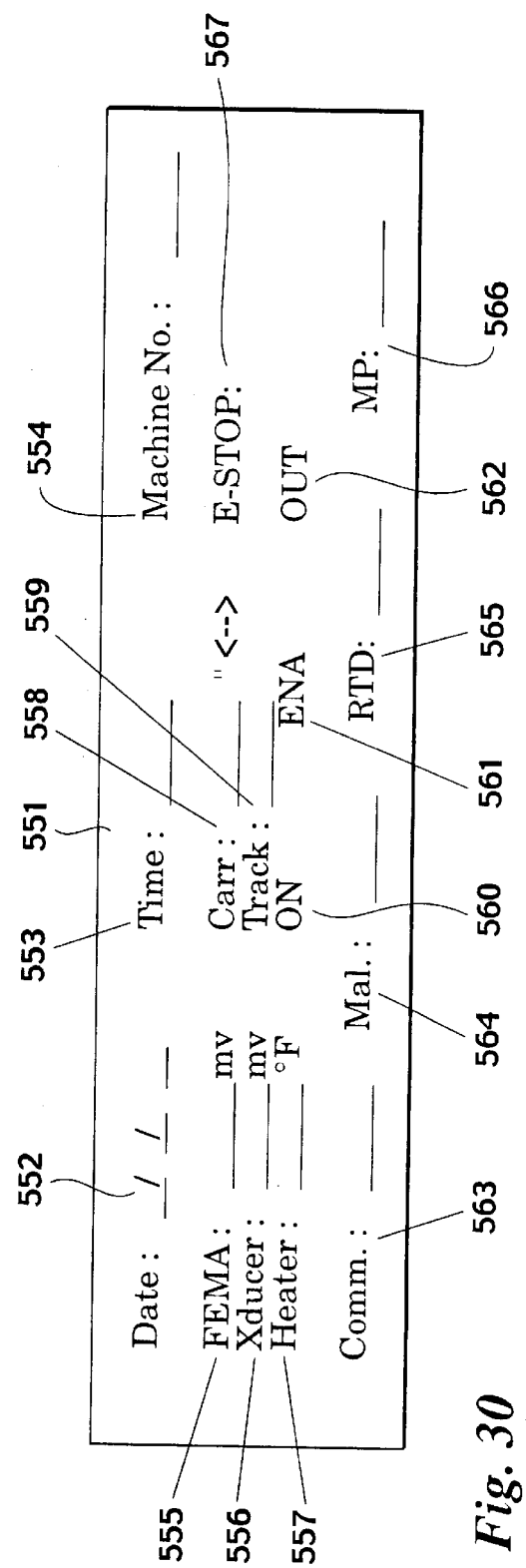
FIG. 30 is a graphic demonstration of a display screen shown on the operator pendant of the machine of FIG. 1 for diagnostic purposes.

Diagnostic information can be accessed at all times to monitor criteria indicative of the internal status of the control system. Thus, if the operator O suspects that a part of the machine control is not operating properly, the menu 510 will route access to the diagnostic information, a typical display of which is illustrated in FIG. 30. The display screen 551 shown on the operator pendant LCD 337 indicates the date 552, time 553 and machine number 554. It also indicates the milivoltage 555 at the FEMA PTC valve 289, the milivoltage 556 at the pressure transducer 287, the temperature 557 of the heater H, the position in inches and direction of motion 558 of the carriage 210, whether the heater H is on or off 560, whether the engine 91 is in high speed mode which enables the heater H or in low speed mode which disables the heater H and, in the automatic mode of the machine M, whether the heater H is in or out of place 562 on the carriage 210. The screen 551 also indicates whether there is communication 563 between the pendant microprocessor 440 and the control box microprocessor 401, whether malfunctions 564 are in reception or in transmission whether the RTD 445 is converting temperature to a digital signal 565, whether the control box microprocessor 401 is operational 566 and whether the emergency stop button 327 has been operated 567.

In addition to the above described functions, the data logging mode allows the operator to record machine and employee information, record pipe material and size information, record interfacial pressures, drag pressure, and recommended fusion pressures, record heater temperature, log pressure profiles during fusion, view recorded data on screen after fusion, view pressure profiles on screen after fusion, print recorded data and pressure profiles to a printer and upload recorded data and pressure profiles to a personal computer for further analysis and archive.

The data logging mode begins logging data as soon as the operator O presses a designated log key. Although the operator pendant microprocessor 440 scans the pressure transducer 287 every 60 milliseconds, it only saves data changes instead of recording every data point read at 60ms intervals. When the log key is pressed, the operator pendant microprocessor 440 saves the joint information including pipe size, employee number, joint and job numbers, etc. to report memory. It then saves the first data record and initializes the second data record. Each record is made up of two elements. The first element is the time stamp, preferably at 100 millisecond resolution, and the second element is the pressure reading in PSI. Every 100 milliseconds, the operator pendant microprocessor 440 updates the time stamp of the second data record and checks the pressure reading. If the current pressure reading is different than the pressure recorded in the second data record, then third and fourth data records are created to record the change in pressure. This process is repeated until the operator terminates the data logging, or the report memory is full or the maximum recording time of 65,500 milliseconds is exceeded. The flow diagram of FIG. 31 illustrates the data logging process. When the operator O presses the log key, the microprocessor 440 "assigns new report memory space" 571. It then "copies the pipe and joint information to report memory" 572. It then "sets up first and second data records" 573 beginning at a time stamp of zero milliseconds. It then inquires as to whether "100 milliseconds has passed" 574. If the answer to this inquiry is "NO", it continues to inquire as to whether "100 milliseconds has passed" 574. If the answer to this inquiry is "YES" it "reads the pressure transducer" 575. It then inquires as to whether the "pressure has changed since it was last saved" 576. If the answer to this inquiry is "YES", it "creates two new data records and saves new pressure reading" 577 and then "updates the time stamp for current data records" 578. If the answer to the "pressure change since last saved" inquiry 576 is "NO", it passes immediately to the "update time stamp for current data record" 578. After each update 578, it returns to the "100 milliseconds passed" inquiry 574 for repetition of the process.

Typically, the data logging mode printout shows the following information:

1. Date and Time:
2. Joint Number:
3. Job Number:
4. Employee No.:
5. Machine ID:
6. Machine Model:
7. Piston Area:
8. Pipe Material:
9. Pipe Size:

Interfacial Pressures:

12. Heat:
13. Soak:
14. Fuse:
15. Cool:

Recommended Gauge Pressures:

18. Heat:
19. Soak:
20. Fuse:
21. Cool:

Recorded Data:

24. Drag Pressure:
25. DataLogger Probe:
26. External Probe:

Typically, the data logging mode report also includes two graphs of the pressure profile during fusion, illustrated in FIGS. 32 and 33. The front end plot of FIG. 32 expands the front end of the pressure profile to reveal the heat and soak profile in more detail than the summary plot of FIG. 33. The summary plot shows the entire pressure profile from the time the operator O starts logging until the time the operator O stops logging data. Looking at the summary plot of FIG. 33, when the operator O presses the log key, the system reads the pressure $P_0$ at the time $T_0$ and proceeds with the flow chart process of FIG. 31. The $P_0$–$T_0$ reading provides an initial data point and every 100 milliseconds the system extends the line from the $P_0$–$T_0$ data point until a pressure change is noted at data point $P_0$–$T_1$. The system then begins two new data records beginning at the data point $P_1$–$T_1$ and executes another straight line plot until another pressure change occurs at a data point $P_1$–$T_2$. This process is continued throughout the operation of the system.

The automatic mode automates the fusion procedure and allows the operator O to record machine and employee information, record pipe material and size information, record recommended fusion parameters, record actual fusion parameters, view recorded data on screen after fusion, print recorded data to printer and upload recorded data to a personal computer for further analysis and archive. In the event operator intervention is required, the automatic mode prompts the operator O with an audible buzzer 437 and displays the appropriate message on the screen 337. The automatic mode interacts with the operator O with step-by-step instructions, and performs automatic pipe fusion. The automatic mode begins by prompting the operator O to enter joint information and select a pipe and enter its size. It then prompts the operator O to prepare the pipe for fusion, which includes facing the pipe, cleaning the heater H and installing the heater H. After the pipe is prepared, the operator O presses a key to start the fusion process. The operator pendant microprocessor 440 starts the fusion process by closing the carriage 210 to bring the two pipe ends against the heater H. After the pipe ends contact the heater H, the microprocessor 440 begins to count down from the programmed heat time under heat pressure. At the end of the heat cycle, the microprocessor 440 drops carriage pressure to drag pressure and locks the carriage to enter the soak cycle. Near the end of the soak cycle count down, the microprocessor 440 sets a high carriage pressure with the carriage locked and prompts the operator O to standby to remove the heater H. At the end of the soak cycle, the carriage opens automatically for heater removal. The operator O must remove the heater H within a given amount of time. The carriage closes to bring the melted pipe ends together. Once the pipe ends make contact, the microprocessor 440 begins counting down for fuse cycle. Some jointing procedures call for a cool cycle with a lower interfacial pressure than the fuse cycle. At the end of the fusion, the operator O is given an opportunity to view the joint report on the screen, and print the joint report to an optional printer. After that, the operator O may choose to fuse another joint using the same parameters, or select another pipe material.

The automatic mode printout typically shows the following information:
1. Date and Time:
2. Joint Status:
3. Machine ID:
4. Machine Model:
5. Employee No.:

-continued

The automatic mode printout typically shows the following information:
6. Job Number:
7. Joint Number:
8. Pipe Material:
9. Pipe Size:

Target        Actual

12. Heater Temp.:
13. Heat Time:
14. Heat Pressure:
15. Soak Time:
16. Soak Pressure:
17. Open/Close:
18. Fuse time
19. Fuse Pressure:
20. Cool time:
21. Cool Pressure:
22. Drag Pressure:

The target column shows the time and fusion pressures recommended by the pipe manufacturer. The actual column shows the actual time and pressures used in the automatic fusion.

In the automatic mode, the pipe and fusion parameters are preprogrammed. In the field, the operator O selects from a list of preprogrammed pipe materials and pipe size, and the computer looks up the corresponding fusion parameters for the selected pipe. While the automatic mode comes with a factory installed list of parameters, the owner of the machine may replace the factory installed parameters by downloading custom parameters via a PC serial port. The parameter download protocol is similar to that for uploading reports to the PC as is hereinafter described in relation to both the data logging and automatic modes. However, instead of the PC requesting data from the operator pendant microprocessor 440, the operator pendant microprocessor 440 requests data from the PC in the case of parameter downloading.

The data logging and automatic mode reports can be uploaded to an IBM PC compatible computer for further analysis and archive. A companion program that runs on the PC can transfer data stored in the battery-backed SRAM of the operator pendant microprocessor 440 to the PC hard drive. The optional RS-232 serial cable 339 connects the serial port of the PC to the serial printer port of the operator pendant microprocessor 440. The data transfer is based on a polling protocol, in which the PC requests data from the operator pendant microprocessor 440. The microprocessor 440 responds by sending the requested data blocks to the PC. To minimize data transmission error, the data blocks are marked with a data block prefix and a checksum suffix. If the PC received a data block with the incorrect prefix or checksum, the PC will resubmit the request for the same data block.

Figure 34:
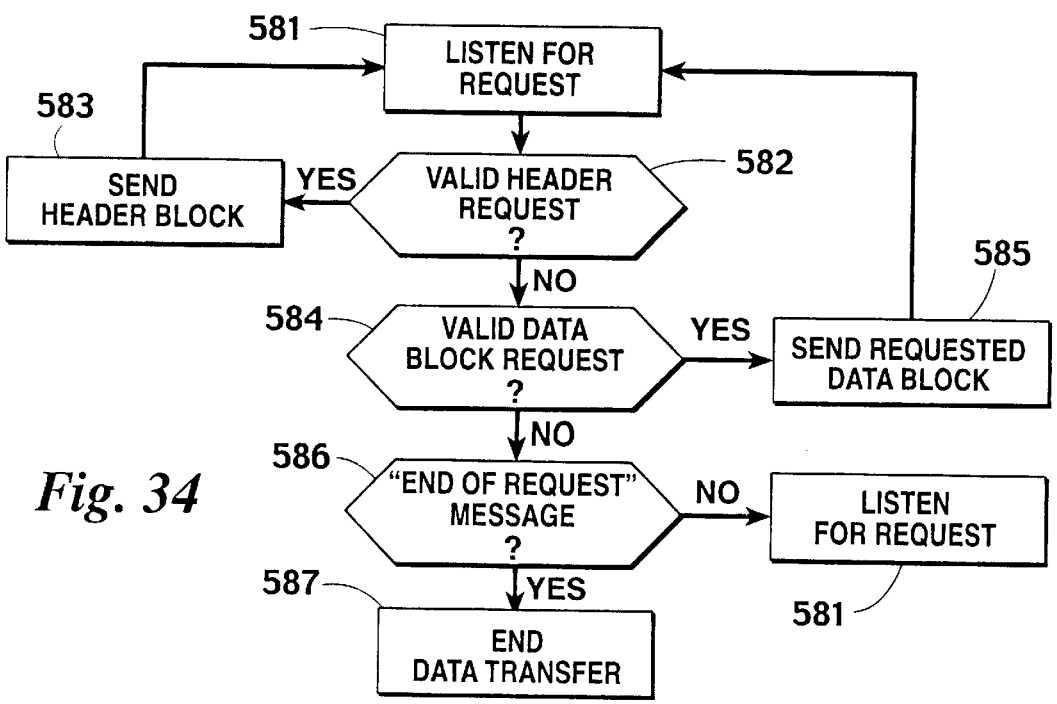
FIG. 34 is a flow diagram illustrating of the report upload process of the machine in FIG. 1 in the data logging and automatic modes.

The report upload flow diagram is illustrated in FIG. 34. The microprocessor 440 "listens for request" 581 from the PC. It then inquires as to whether the request made is a "valid header request" 582. If the answer to this inquiry is "YES", the microprocessor 440 then "sends the header block" 583 to the PC and "resumes listening for the request" 581. If the answer to the "valid header request" 582 is "NO", the microprocessor next inquires whether that is a "valid data block request" 584. If the answer is "YES", the microprocessor 440 "sends the requested data block" 585 to the PC and resumes "listening for requests" 581. If the response to the inquiry is "NO", the microprocessor 440 inquires as to whether an "end of request message" 586 has been received. If the response to this inquiry is "NO", the system returns to "listen for request" 581. If the answer to this inquiry is "YES", the microprocessor 440 will "end data transfer" 587.

Figure 35:
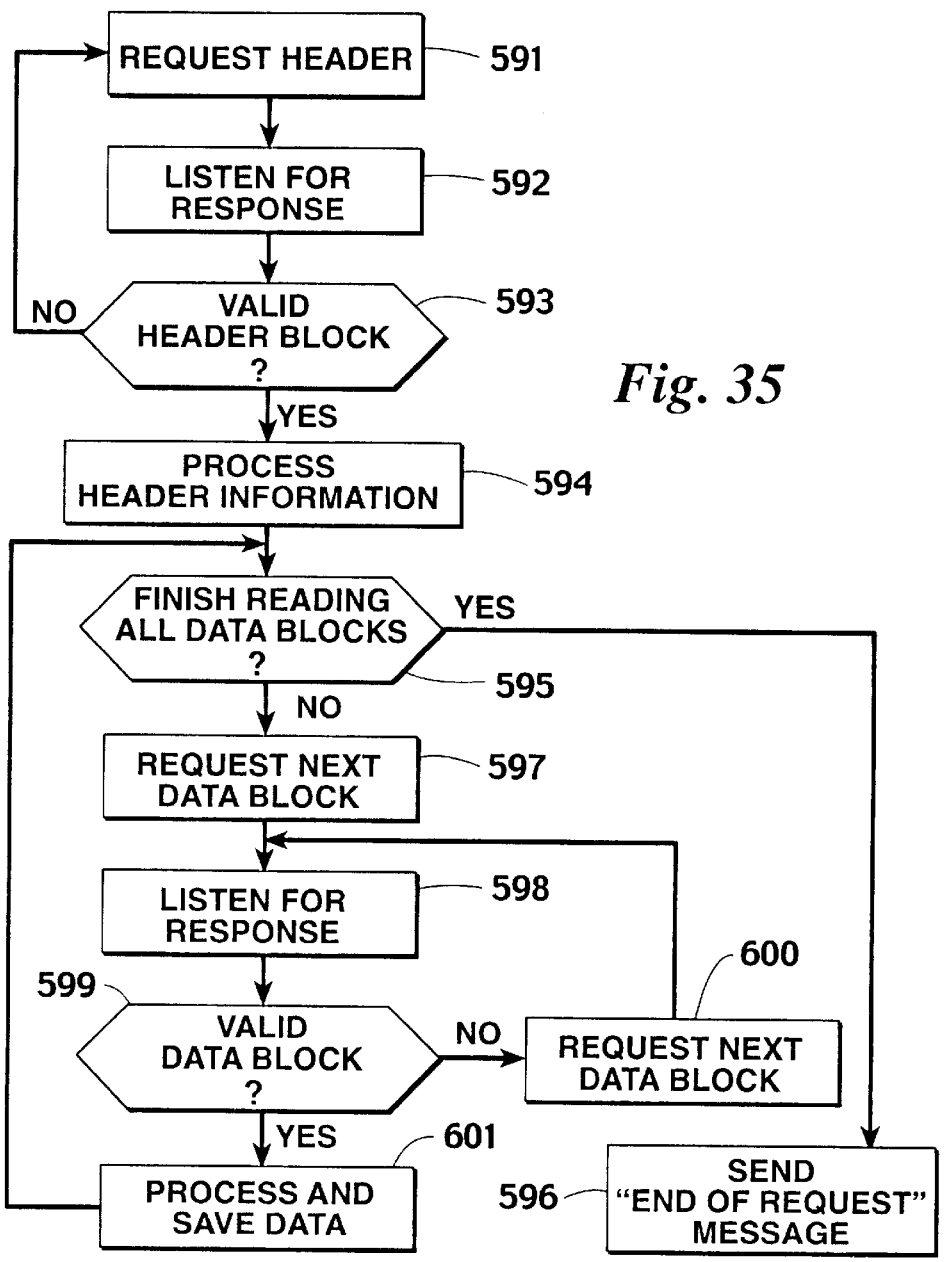
FIG. 35 is a flow diagram illustrating of the report download process of the machine in FIG. 1 in the data logging and automatic modes.

The report download flow diagram is illustrated in FIG. 35. In this process, the operator pendant microprocessor 440 will first "request a header" 591 from the PC. It then "listens for the response" 592, and inquires as to whether the response is a "valid header block" 593. If the answer to this inquiry is "NO", the system returns to "request headers" 591. If the answer to this inquiry is "YES", the microprocessor 440 will "process header information" 594. The microprocessor 440 will then inquire as to whether it is "finished reading all data blocks" 595 and if the answer to this inquiry is "YES", it "sends an end of request message" 596 to the PC. If the answer to this inquiry is "NO", the microprocessor 440 "requests the next data block" 597 and again "listens for response" 598. The microprocessor 440 then inquires as to whether the information received from the PC is a "valid data block" 599. If the answer to this inquiry is "NO", the microprocessor 440 will "request the next data block" 600 and "return to listen for response" 598. If the answer to this inquiry is "YES", the microprocessor 440 "processes and saves the data" 601 and then returns to the "finish reading all data blocks" inquiry 595.

OPERATIONAL

Figure 25:
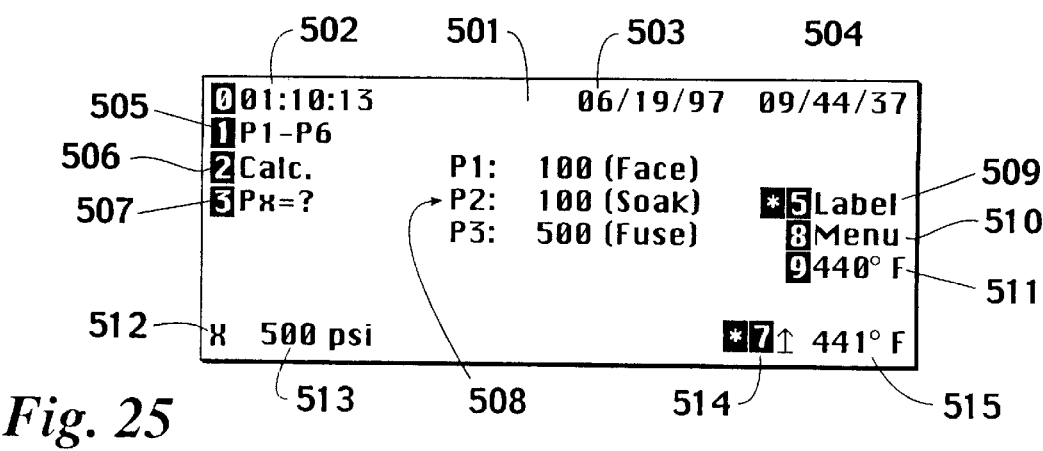
FIG. 25 is a graphic representation of a typical display on the operator pendant of the machine of FIG. 1.

The machine M, already calibrated by the manufacturer, is transported to the pipeline site, preferably by a pickup truck or trailer. In the normal mode of operation, the switch 353 is set to the glow plug position 367 until the glow plug indicator light 375 goes off. The switch 363 is then turned to the start position 365 in which the engine 91 is started. The operator O selects low throttle speed by flipping the throttle speed switch 389 to the "open" condition. The hydraulic pump 101 operates immediately upon starting of the engine 91. The operator O maneuvers the machine M from the transport vehicle by use of the left and right track control valves 107 and 109 at the operator's instrument panel 111. Once the machine is in position, the facer 167, which was transported resting on the guide rods 197 and 203, is rotated on the linkage to the linkage closed position illustrated in FIG. 16. The heater frame 220 along with the heater H and bag are removed from their transport position on the jaw spacers 219 and set in a convenient ground condition. The carriage skid 215 is aligned on the chassis C, if necessary, by removal of the pins through the skid ears 57, disengagement of the skid 215 from the latches 55, 180 degree rotation of the skid 215, reengagement of the skid 215 with the opposite latches 55 and reinsertion of the pins in the skid ears 57. If the skid 215 is rotated, the jaw pins are removed and the upper portions of the jaws 207, 209, 211 and 213 repinned for opposite hand rotation to that previously selected. Sizing rings are mounted on the inside surface of the jaws 207, 209, 211 and 213 to reduce the jaw opening to a diameter suitable for the size of the pipes to be joined. The operator O then uses the valves 86 and 88 of the pipe lift valve assembly 85 to position the roller assemblies L at an initially desired level. The operator O then further utilizes the track control valves 107 and 109 to finally position the machine M in longitudinal alignment with the axes of the pipes to be joined. The pipe lift control valves 86 and 88 are then further used if necessary to assist in manipulating the pipe to its desired level in the machine M. With the pipes extending at least one inch inwardly of the fixed 207 and 209 and moving 211 and 213 jaws, the jaws 207, 209, 211 and 213 are locked to secure the pipes in proper alignment. The throttle speed is then increased to high by closing the throttle speed switch 389. In the high speed position, the circuit for the heater H is closed and the heater H begins to warm up. The operator O then selects the "facing", "soaking" and "fusing" pressures. The "fusing" pressure can be determined by use of the calculation algorithm by entering appropriate pipe size, wall thickness and other manufacture information in response to prompts in the calculation loop of the system. When all necessary pressure, time and temperature selections have been made and the heater H reaches the desired fusion temperature as is indicated at the display position 515 on the operator pendant LCD as illustrated in FIG. 25, the operator O and the machine M are ready to perform the fusion operation.

With the moving jaws 211 and 213 spaced apart from the fixed jaws 207 and 209, the operator rotates the facer 167 to the linkage fully opened position with the facer brackets 185 and 187 seated on the guide rods 203 and 197. Facer operation is then initiated by use of the facer control valve 87. This is usually done at maximum speed but the operator O may change the valve position if a lower speed is desired. The operator O then toggles the carriage control switch 331 to the "together" position, at facing pressure, to bring the pipes against the facer 167. If the facer 167 is not turning freely to trim the pipe edges, the operator O may reduce the pressure applied by the carriage 210. The operator O continues operation of the facer 167 to trim the pipe until the operator O is satisfied that the pipe ends have been sufficiently trimmed so as to lie in parallel planes. The operator O then moves the carriage switch 331 to its "stop" position and moves the facer valve 87 to its "stop" position to terminate the facing process. The carriage switch 331 is then moved to the "apart" position until the moving jaws 211 and 213 are sufficiently spaced apart from the fixed jaws 207 and 209 to remove the facer 167. The operator O then switches the carriage switch 331 to the stop position and removes the facer 167 by rotating the facer 167 back to the linkage fully closed condition. The operator O then inspects the pipe to be assured that a clean and satisfactory surface has been put on the ends of the pipes. The operator O then moves the carriage switch 331 to the "together" position at the fusion pressure so as to abut the pipes and permit an alignment check to assure that there are no gaps between the pipes, that the pipes are not off axis and the pipes will not slip. If the operator O is not satisfied with the mating of the pipes, the facing process will be repeated until a satisfactory result is achieved. When the result is satisfactory, the operator O will place the carriage switch 331 in its "apart" position to space the pipes apart sufficiently for insertion of the heater H. The operator O will then place the carriage switch 331 in its "stop" position and will check the heater temperature reading 515 on the display of the operator pendant 63. If the heater H is at the proper temperature, the operator O will move the carriage switch 331 to the "together" position to bring the pipe ends into contact with the heater H. The operator O will then select the "soak" pressure which may be typically, but not necessarily, selected as 30 psi or may be determined as the minimal force necessary to move the carriage 210 with a pipe connected in the moving jaws 211 and 213. Thus, the "soak" pressure is the pressure at which the pipes will be maintained in contact with the heater H with minimal or zero force applied against the heater H. When the zero force condition is achieved, the operator O will change the position of the carriage switch 331 to "stop" in which both carriage solenoids 288 and 290 are deenergized and the carriage pistons are locked to maintain contact of the pipes with the heater H at substantially zero force. The operator O may then press the "0" key on the pendant 63 to initiate operation of the timer 502 so as to time the "soaking" of the pipe ends. The operator O will generally be guided by the elapsed time of the "soaking" process and also by observation of the bead formed on the perimeter of the pipes as the polyolefin melts. When the soaking process is completed to the satisfaction of the operator O, the operator selects the "fusion" pressure which is generally the highest pressure selected for operation of the carriage 210. The operator O then moves the carriage switch 331 to its "apart" position to move the pipes away from the heater H. Operating the carriage 210 at the "fusion" pressure assures that the moving jaws 211 and 213 will be spaced apart as quickly as possible from the fixed jaws 207 and 209. The operator O then removes the heater H as quickly as possible from its position between the pipes and moves the carriage switch 331 to its "together" position at the fusion pressure to bring the pipe ends together. The operator then restarts the timer 502 by using the "0" key on the pendant 63. When the timer 502 indicates that the desired fusion time has elapsed, the operator O moves the carriage switch 331 to its "stop" position, the jaws 207, 209, 211 and 213 are opened to unclamp the pipe and the pipe lifts L are operated to lift the pipe out of the jaws 207, 209, 211 and 213. With the pipe disengaged from the jaws 207, 209, 211 and 213, the operator O then moves the carriage switch 331 to the "apart" position at any desired pressure and the fusion process is complete.

In the automatic mode, the machine M is operated identically as in the normal mode until the heater H has been inserted between the pipes. At this point, the operator O presses the key pad assigned to the "auto run" mode and the system will automatically select the soaking and fusing pressures and time for the pipe identified to the system. The fusion process is then fully automatic. In this mode, the carriage audio alert 437 will sound whenever the carriage 210 is moving. When the heater H is removed from between the pipes, the sensor 453 causes the carriage switch 331 to move to its "together" position and, if the heater H is not removed by the operator O in time to permit the pipes to come together, the cycle will be automatically aborted. Furthermore, the operator pendant microprocessor 440 continually monitors the pressure applied to the carriage 210 and the temperature of the heater H and if, at any time during the process, they are not within the limits required, the microprocessor 440 will automatically abort the cycle. This is true with respect to any condition that would cause an interruption in the proper execution of the cycle, including, for example, a loss of diesel fuel or a shifting or slippage of the pipes within the jaws. When the fusion cycle is complete, the operator O continues the process as in the normal mode of operation.

In the data logging mode, when the heater H has been inserted between the pipes, the operator O will press the keypad assigned to "start logging". The system will then begin logging the carriage pressure, the heater temperature and the time as hereinbefore explained for the fusion process. When the fusion process is completed, the operator O will press the keypad assigned to "stop logging" to terminate use of the data logging mode.

Thus, it is apparent that there has been provided, in accordance with the invention, a machine and method that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For use with a machine for end-to-end welding of polyolefin pipes, a pipe gripping assembly comprising:
   a skid;
   a first jaw fixed to said skid for securing a first pipe in alignment with a longitudinal axis;
   a carriage slidably mounted on said skid for reciprocal movement along said longitudinal axis;
   a second jaw fixed to said carriage for securing a second pipe in longitudinal alignment with respect to the first pipe;
   means on said skid cooperable with a frame of the machine for aligning and supporting said skid on the frame with said first jaws forward of said second jaws in a first mounting position and with said second jaws forward of said first jaws in a second mounting position;
   means for securing said skid to the frame in a selected one of said first and second mounting positions; and
   means for pivotally engaging upper and lower portions of said first and second jaws at a first point external of the pipe in a first jaw arrangement and at a second point external of the pipe and diametrically opposite said first point in a second jaw arrangement.

2. For use with a machine for end-to-end welding of polyolefin pipes, the machine having a base mounted thereon with parallel side walls, two spaced-apart parallel rods rigidly fixed to and between the side walls and two pairs of spaced-apart, oppositely aligned apertures symmetrically displaced between the rods through the side walls, a pipe gripping assembly comprising:
   a skid having parallel side walls nestable on the base parallel to and between the base side walls, said skid side walls being trapezoidal and of length such that angular ends of said skid side walls are between and substantially tangent to one pair of oppositely aligned base side wall apertures and one of the rods in a first mounting position and between and substantially tangent to the other pair of oppositely aligned base side wall apertures and the other of the rods in a second mounting position;
   a first jaw fixed to said skid for securing a first pipe in alignment with a longitudinal axis;
   a carriage slidably mounted on said skid for reciprocal movement along said longitudinal axis;
   a second jaw fixed to said carriage for securing a second pipe in longitudinal alignment with respect to the first pipe;
   a rod insertable through the one pair of oppositely aligned apertures for securing said skid to the base in said first mounting position and through the other pair of oppositely aligned apertures for securing said skid to the base in said second mounting position; and
   means for pivotally engaging upper and lower portions of said first and second jaws at a first point external of the pipe in a first jaw arrangement and at a second point external of the pipe and diametrically opposite said first point in a second jaw arrangement.

3. For use with a machine for end-to-end welding of polyolefin pipes, a pipe gripping assembly comprising:
   a base mounted on the machine;
   parallel side walls extending upwardly from said base;
   two spaced-apart parallel rods rigidly fixed to and between the side walls;
   two pairs of spaced-apart, oppositely aligned apertures symmetrically displaced between the rods through the side walls;

a skid having parallel side walls nestlable on said base parallel to and between said base side walls, said skid side walls being trapezoidal and of length such that angular ends of said skid side walls are between and substantially tangent to one pair of said oppositely aligned base side wall apertures and one of said rods in a first mounting position and between and substantially tangent to the other pair of said oppositely aligned base side wall apertures and the other of said rods in a second mounting position;

a first jaw fixed to said skid for securing a first pipe in alignment with a longitudinal axis;

a carriage slidably mounted on said skid for reciprocal movement along said longitudinal axis;

a second jaw fixed to said carriage for securing a second pipe in longitudinal alignment with respect to the first pipe;

a rod insertable through said one pair of said oppositely aligned apertures for securing said skid to said base in said first mounting position and through the other pair of said oppositely aligned apertures for securing said skid to said base in said second mounting position; and means for pivotally engaging upper and lower portions of said first and second jaws at a first point external of the pipe in a first jaw arrangement and at a second point external of the pipe and diametrically opposite said first point in a second jaw arrangement.

4. For use with a machine for end-to-end welding of polyolefin pipes, the machine having a base mounted thereon with parallel side walls, a pair of opposing apertures through the side walls and two pairs of opposing latching members rigidly fixed to the side walls and symmetrically displaced on opposite sides of the apertures, a pipe gripping assembly comprising:

a skid having parallel side walls nestlable on the base parallel to and between the base side walls, said skid side walls having opposing apertures centered thereon and a cross-member rigidly fixed therebetween and spaced apart from said opposing skid wall apertures by a distance such that, when said skid apertures are aligned with the base apertures, said cross-member engages with one of the pairs of latching members in a first mounting position and with the other of the pairs of latching members in a second mounting position;

a first jaw fixed to said skid for securing a first pipe in alignment with a longitudinal axis;

a carriage slidably mounted on said skid for reciprocal movement along said longitudinal axis;

a second jaw fixed to said carriage for securing a second pipe in longitudinal alignment with respect to the first pipe;

a pair of pins insertable into aligned skid and base apertures for securing said skid to the base in said first and second mounting positions; and means for pivotally engaging upper and lower portions of said first and second jaws at a first point external of the pipe in a first jaw arrangement and at a second point external of the pipe and diametrically opposite said first point in a second jaw arrangement.

5. For use with a machine for end-to-end welding of polyolefin pipes, a pipe gripping assembly comprising:

a base mounted on the machine;

parallel side walls extending upwardly from said base;

a pair of opposing apertures through said side walls;

two pairs of opposing latching members rigidly fixed to said side walls and symmetrically displaced on opposite sides of said apertures;

a skid having parallel side walls nestlable on said base parallel to and between said base side walls, said skid side walls having opposing apertures centered thereon and a cross-member rigidly fixed therebetween and spaced apart from said opposing skid wall apertures by a distance such that, when said skid apertures are aligned with said base apertures, said cross-member engages with one of said pairs of latching members in a first mounting position and with the other of said pairs of latching members in a second mounting position;

a first jaw fixed to said skid for securing a first pipe in alignment with a longitudinal axis;

a carriage slidably mounted on said skid for reciprocal movement along said longitudinal axis;

a second jaw fixed to said carriage for securing a second pipe in longitudinal alignment with respect to the first pipe;

a pair of pins insertable into said aligned skid and base apertures for securing said skid to said base in said first and second mounting positions; and means for pivotally engaging upper and lower portions of said first and second jaws at a first point external of the pipe in a first jaw arrangement and at a second point external of the pipe and diametrically opposite said first point in a second jaw arrangement.

* * * * *